(12) United States Patent
Cheng et al.

(10) Patent No.: US 11,304,182 B2
(45) Date of Patent: Apr. 12, 2022

(54) CONTROL CHANNEL CONFIGURATION AND TIMING FOR AUTONOMOUS UPLINK

(71) Applicant: Qualcomm Incorporated, San Diego, CA (US)

(72) Inventors: Peng Cheng, Beijing (CN); Chirag Patel, San Diego, CA (US); Vinay Chande, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 16/341,224

(22) PCT Filed: Dec. 7, 2016

(86) PCT No.: PCT/CN2016/108811
§ 371 (c)(1),
(2) Date: Apr. 11, 2019

(87) PCT Pub. No.: WO2018/103002
PCT Pub. Date: Jun. 14, 2018

(65) Prior Publication Data
US 2021/0289488 A1    Sep. 16, 2021

(51) Int. Cl.
*H04W 72/04* (2009.01)
*H04W 74/08* (2009.01)
*H04L 5/00* (2006.01)

(52) U.S. Cl.
CPC ....... *H04W 72/0413* (2013.01); *H04L 5/0048* (2013.01); *H04W 74/0808* (2013.01); *H04W 72/044* (2013.01)

(58) Field of Classification Search
CPC combination set(s) only.
See application file for complete search history.

(56) References Cited

U.S. PATENT DOCUMENTS

| | | | |
|---|---|---|---|
| 10,624,119 | B2 | 4/2020 | Damnjanovic et al. |
| 2011/0300854 | A1* | 12/2011 | Shan ..................... H04L 1/1864 455/422.1 |

(Continued)

FOREIGN PATENT DOCUMENTS

| | | |
|---|---|---|
| CN | 101453293 A | 6/2009 |
| CN | 102612852 A | 7/2012 |

(Continued)

OTHER PUBLICATIONS

International Search Report and Written Opinion—PCT/CN2016/108811—ISA/EPO—dated Jul. 6, 2017.

(Continued)

*Primary Examiner* — Yee F Lam
(74) *Attorney, Agent, or Firm* — Holland & Hart LLP/Qualcomm

(57) ABSTRACT

Methods, systems, and devices for wireless communication are described. Various autonomous uplink control channel configurations may be used for unscheduled uplink transmissions. For example, a user equipment (UE) may initiate an unscheduled uplink transmission and may identify an autonomous uplink control channel configuration for the uplink transmission. The UE may transmit control information and data during an initial transmission time interval of a transmission opportunity according to the control channel configuration, where the control channel configuration may include a number of different waveforms and payload configurations. For example, an autonomous uplink control channel configuration may include control information frequency division multiplexed or time division multiplexed with data and transmitted in one or more frequency interlaces. In some cases, the control channel configuration may include a symbol period for a clear-to-send signal, and (Continued)

one or more symbol periods used a guard period before the data transmission.

130 Claims, 27 Drawing Sheets

(56) References Cited

U.S. PATENT DOCUMENTS

| | | | |
|---|---|---|---|
| 2012/0014371 A1 | 1/2012 | Weng et al. | |
| 2015/0049712 A1 | 2/2015 | Chen et al. | |
| 2015/0131536 A1* | 5/2015 | Kaur | H04L 27/0006 |
| | | | 370/329 |
| 2016/0037352 A1 | 2/2016 | Wei et al. | |
| 2016/0073344 A1* | 3/2016 | Vutukuri | H04W 72/14 |
| | | | 370/252 |
| 2016/0095110 A1* | 3/2016 | Li | H04W 72/1215 |
| | | | 370/329 |
| 2016/0255648 A1* | 9/2016 | Frenne | H04W 72/042 |
| | | | 370/329 |
| 2016/0278074 A1 | 9/2016 | Yang et al. | |
| 2017/0041829 A1* | 2/2017 | Dai | H04W 28/06 |
| 2017/0048041 A1* | 2/2017 | Yi | H04L 5/0048 |
| 2017/0163388 A1* | 6/2017 | Wiemann | H04L 1/1854 |
| 2017/0215179 A1* | 7/2017 | Choi | H04L 1/1671 |
| 2017/0215206 A1* | 7/2017 | Cheng | H04W 16/14 |
| 2017/0273071 A1* | 9/2017 | Nogami | H04W 72/1242 |
| 2017/0331577 A1* | 11/2017 | Parkvall | H04B 7/0848 |
| 2018/0049165 A1* | 2/2018 | Byun | H04L 5/0053 |
| 2018/0115983 A1 | 4/2018 | Harada et al. | |
| 2018/0139773 A1* | 5/2018 | Ma | H04L 5/0042 |
| 2018/0270860 A1* | 9/2018 | Bhorkar | H04W 72/0406 |
| 2019/0037598 A1* | 1/2019 | Hamidi-Sepehr | |
| | | | H04W 72/0413 |
| 2019/0044663 A1* | 2/2019 | Rosa | H04L 1/1809 |
| 2019/0174554 A1* | 6/2019 | Deenoo | H04W 56/001 |
| 2019/0223204 A1* | 7/2019 | Kim | H04B 1/00 |
| 2019/0230596 A1* | 7/2019 | Falconetti | H04W 52/12 |
| 2020/0059321 A1* | 2/2020 | Koorapaty | H04L 27/2613 |
| 2020/0336987 A1* | 10/2020 | Mukherjee | H04W 52/146 |

FOREIGN PATENT DOCUMENTS

| | | |
|---|---|---|
| WO | WO-2016072218 A1 | 5/2016 |
| WO | WO-2016164465 | 10/2016 |

OTHER PUBLICATIONS

Supplementary European Search Report—EP16923590—Search Authority—The Hague—dated Jun. 15, 2020.

\* cited by examiner

US 11,304,182 B2

CONTROL CHANNEL CONFIGURATION AND TIMING FOR AUTONOMOUS UPLINK

CROSS REFERENCES

The present application is a 371 national phase filing on International Application No, PCT/CN2016/108811 to Cheng et al., entitled "CONTROL CHANNEL CONFIGURATION AND TIMING FOR AUTONOMOUS UPLINK", filed Dec. 7, 2016.

BACKGROUND

The following relates generally to wireless communication and more specifically to scheduling and control channel design for autonomous uplink.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (TDMA) systems, and orthogonal frequency division multiple access (OFDMA) systems, (e.g, a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a UE may transmit uplink communications with a prior assignment or grant of resources. In such cases, a base station may need to detect the autonomous uplink transmission and determine certain information about the transmission in order to properly receive it. Thus, efficient coordination and control channel configurations may be desirable when autonomous uplink communications are employed.

SUMMARY

The described techniques relate to improved methods, systems, devices, or apparatuses that support control channel configurations and timing for autonomous uplink transmission. Generally, the described techniques provide for various autonomous uplink control channel configurations for use with unscheduled uplink transmissions. For example, a user equipment (UE) may have data to transmit to a base station, and may initiate an unscheduled uplink transmission (e.g., without first receiving a grant of resources from the base station). Accordingly, the UE may identify, an autonomous uplink control channel configuration for the uplink transmission, and transmit control information and data during an initial transmission time interval (TTI) of a transmission opportunity (TxOP) according to the autonomous uplink control channel configuration.

The autonomous uplink control channel configuration control may include a number of different waveforms and payload configurations. For example, an autonomous uplink control channel configuration may include control information frequency division multiplexed with data and transmitted in a frequency interlace of a carrier bandwidth. The autonomous uplink control channel configuration may also include control information time division multiplexed with data and transmitted over a set of symbol periods of the initial TTI, where the control information and data may be transmitted in a frequency interlace or a set of frequency interlaces of a carrier bandwidth, Additionally or alternatively, the autonomous uplink control channel configuration may include a symbol period used for the receipt of a clear-to-send (CTS) signal from the base station followed by one or more symbols used as a guard period before the transmission of data.

A method of wireless communication is described. The method may include identifying an autonomous uplink control channel configuration for unscheduled uplink transmissions in an unlicensed radio frequency spectrum band, transmitting control information multiplexed with data according to the autonomous uplink control channel configuration in the unlicensed radio frequency spectrum band during an initial TTI of a TxOP, and transmitting additional data in the unlicensed radio frequency spectrum band during one or more subsequent TTIs of the TxOP.

An apparatus for wireless communication is described. The apparatus may include means for identifying an autonomous uplink control channel configuration for unscheduled uplink transmissions in an unlicensed radio frequency spectrum hand, means for transmitting control information multiplexed with data according to the autonomous uplink control channel configuration in the unlicensed radio frequency spectrum band during an initial TTI of a TxOP, and means for transmitting additional data in the unlicensed radio frequency spectrum band during one or more subsequent TTIs of the TxOP.

Another apparatus for wireless communication is described. The apparatus may include a processor, memory in electronic communication with the processor, and instructions stored in the memory. The instructions may be operable by the processor to cause the apparatus to identify an autonomous uplink control channel configuration for unscheduled uplink transmissions in an unlicensed radio frequency spectrum band, transmit control information multiplexed with data according to the autonomous uplink control channel configuration in the unlicensed radio frequency spectrum band during an initial TTI of a TxOP, and transmit additional data in the unlicensed radio frequency spectrum band during one or more subsequent TTIs of the TxOP.

A non-transitory computer readable medium for wireless communication is described. The non-transitory computer-readable medium may include instructions operable to identify an autonomous uplink control channel configuration for unscheduled uplink transmissions in an unlicensed radio frequency spectrum band, transmit control information multiplexed with data according to the autonomous uplink control channel configuration in the unlicensed radio frequency spectrum band during an initial TTI of a TxOP, and transmit additional data in the unlicensed radio frequency spectrum hand during one or more subsequent TTIs of the TxOP.

In some examples of the method, apparatus, and non-transitory computer-readable medium described above, identifying the autonomous uplink control channel configuration comprises: identifying a narrow bandwidth portion of the unlicensed radio frequency spectrum band, wherein the control information may be transmitted in the narrow bandwidth portion and the control information may be frequency division multiplexed with the data during the initial TTI of the TxOP. In some examples of the method, apparatus, and non-transitory computer-readable medium described above, the narrow bandwidth portion comprises a frequency interlace of a carrier bandwidth. In some examples of the method, apparatus, and non-transitory computer-readable medium described above, the autonomous uplink control channel configuration comprises fourteen modulation symbol periods, the fourteen modulation symbol periods comprising four modulation symbol periods associated with a demodulation reference signal (DMRS) and ten modulation symbol periods associated with data transmissions.

In some examples of the method, apparatus, and non-transitory computer-readable medium described above, the autonomous uplink control channel configuration comprises a payload and a waveform that correspond to an enhanced physical uplink control channel (ePUCCH). In some examples of the method, apparatus, and non-transitory computer-readable medium described above, identifying the autonomous uplink control channel configuration comprises: identifying one or more modulation symbol periods of the initial TTI, wherein the control information may be transmitted during the one or more modulation symbol periods and the control information may be time division multiplexed with the data during the initial TTI of the TxOP.

In some examples of the method, apparatus, and non-transitory computer-readable medium described above, the control information and the data in the initial TTI may be transmitted in a narrow bandwidth portion of the unlicensed radio frequency spectrum band. In some examples of the method, apparatus, and non-transitory computer-readable medium described above, the narrow bandwidth portion comprises a frequency interlace of a carrier bandwidth. In some examples of the method, apparatus, and non-transitory computer-readable medium described above, the autonomous uplink control channel configuration comprises four modulation symbol periods, the four modulation symbol periods comprising two modulation symbol periods associated with DMRS and two modulation symbol periods associated with data transmissions.

In some examples of the method, apparatus, and non-transitory computer-readable medium described above, the autonomous uplink control channel configuration comprises a payload and a waveform that correspond to a short PUCCH (sPUCCH). In some examples of the method, apparatus, and non-transitory computer-readable medium described above, transmitting the additional data comprises: transmitting the additional data during a subsequent modulation symbol period following the four modulation symbol periods.

In some examples of the method, apparatus, and non-transitory computer-readable medium described above, the control information and the data in the initial TTI may be transmitted in a plurality of frequency interlaces of the unlicensed radio frequency spectrum band. In some examples of the method, apparatus, and non-transitory computer-readable medium described above, the autonomous uplink control channel configuration comprises four modulation symbol periods, the four modulation symbol periods comprising two modulation symbol periods associated with a DMRS and two modulation symbol periods associated with data transmissions.

In some examples of the method, apparatus, and non-transitory computer-readable medium described above, the autonomous uplink control channel configuration comprises a payload and a waveform that correspond to an sPUCCH. In some examples of the method, apparatus, and non-transitory computer-readable medium described above, transmitting the additional data comprises: transmitting the additional data during a subsequent modulation symbol period following the four modulation symbol periods within the plurality of frequency interlaces.

In some examples of the method, apparatus, and non-transitory computer-readable medium described above, the autonomous uplink control channel configuration comprises two modulation symbol periods, the two modulation symbol periods comprising a first modulation symbol periods associated with a DMRS and a second modulation symbol associated with data transmissions. In some examples of the method, apparatus, and non-transitory computer-readable medium described above, transmitting the additional data comprises: transmitting the additional data during a subsequent modulation symbol period following the two modulation symbol periods within the plurality of frequency interlaces.

Some examples of the method, apparatus, and non-transitory computer-readable medium described above may further include processes, features, means, or instructions for receiving a CTS signal from a base station during a modulation symbol period of the initial TTI of the TxOP, wherein the CTS signal may be responsive to the control information.

Some examples of the method, apparatus, and non-transitory computer-readable medium described above may further include processes, features, means, or instructions for identifying a guard period between the modulation symbol period that includes the CTS signal and the data, wherein the guard period may be time division multiplexed with the control information, the CTS signal, and the data.

In some examples of the method, apparatus, and non-transitory computer-readable medium described above, transmitting the additional data comprises: transmitting the additional data during a subsequent modulation symbol period following the guard period. In some examples of the method, apparatus, and non-transitory computer-readable medium described above, the control information and the data in the initial TTI may be transmitted and the CTS signal may be received in a plurality of interlaces of the unlicensed radio frequency spectrum band.

In some examples of the method, apparatus, and non-transitory computer-readable medium described above, the autonomous uplink control channel configuration comprises an initial modulation symbol period associated with a DMRS. In some examples of the method, apparatus, and non-transitory computer-readable medium described above, the control information comprises at least one of a scheduling request (SR), an indication of a modulation and coding scheme (MCS), or hybrid automatic repeat request (HARQ) information, or a combination thereof.

Some examples of the method, apparatus, and non-transitory computer-readable medium described above may further include processes, features, means, or instructions for receiving radio resource control (RRC) signaling indicative of the autonomous uplink control channel configuration, wherein the autonomous uplink control channel configuration may be identified based at least in part on the RRC signaling. In some examples of the method, apparatus, and non-transitory computer-readable medium described above, the RRC signaling comprises an indication of at least one of a frequency domain allocation, a DMRS configuration, or an orthogonal cover code (OCC) sequence, or any combination thereof.

In some examples of the method, apparatus, and non-transitory computer-readable medium described above, the data in the initial TTI of the TxOP and the additional data in the one or more subsequent TTIs of the TxOP may be transmitted with a same modulation and coding scheme (MCS). In some examples of the method, apparatus, and non-transitory computer-readable medium described above, the data in the initial TTI of the TxOP may be transmitted with a first MCS and the additional data in the one or more subsequent TTIs of the TxOP may be transmitted with a second MCS that may be different from the first MCS. In some examples of the method, apparatus, and non-transitory computer-readable medium described above, the data transmitted in the initial TTI of the TxOP comprises an indication of a MCS for the initial TTI and the additional data transmitted in the one or more subsequent Tills of the TxOP comprise an indication of an MCS for each respective TTI of the TxOP.

Some examples of the method, apparatus, and non-transitory computer-readable medium described above may further include processes, features, means, or instructions for identifying a hybrid automatic repeat request (HARQ) identifier, an indication of a redundancy version (RV), and a new data indicator (NDI) associated with each TTI of the TxOP. Some examples of the method, apparatus, and non-transitory computer-readable medium described above may further include processes, features, means, or instructions for transmitting an indication of the identified HARQ identifier, indication of the RV, and NDI for each TTI during the initial TTI of the TxOP.

Some examples of the method, apparatus, and non-transitory computer-readable medium described above may further include processes, features, means, or instructions for identifying a NDI associated with each TTI of the TAW. Some examples of the method, apparatus, and non-transitory computer-readable medium described above may further include processes, features, means, or instructions for transmitting an indication of the identified NDI associated with each TTI during the initial TTI of the TxOP. Some examples of the method, apparatus, and non-transitory computer-readable medium described above may further include processes, features, means, or instructions for transmitting a HARQ identifier and an indication of a RV during the initial TTI of the TxOP.

Some examples of the method, apparatus, and non-transitory computer-readable medium described above may further include processes, features, means, or instructions for performing a clear channel assessment (CCA) procedure in the unlicensed radio frequency spectrum hand during a preceding TTI before the TxOP. Some examples of the method, apparatus, and non-transitory computer-readable medium described above may further include processes, features, means, or instructions for transmitting a busy signal in the unlicensed radio frequency spectrum hand upon completing the CCA procedure and for a remaining duration of the preceding TTI.

Some examples of the method, apparatus, and non-transitory computer-readable medium described above may further include processes, features, means, or instructions for monitoring the unlicensed radio frequency spectrum band for one or more modulation symbol periods of the initial TTI, wherein the control information may be transmitted after the one or more modulation symbol periods of the initial TTI. Some examples of the method, apparatus, and non-transitory computer-readable medium described above may further include processes, features, means, or instructions for determining that no cell-specific reference signal (CRS) may be received from a serving base station during the one or more modulation symbol periods of the initial TTI, wherein the control information may be transmitted based at least in part on the determination that no CRS may be received.

Another method of wireless communication is described. The method may include identifying an autonomous uplink control channel configuration for unscheduled uplink transmissions in an unlicensed radio frequency spectrum band, receiving control information multiplexed with data according to the autonomous uplink control channel configuration in the unlicensed radio frequency spectrum band during an initial TTI of a TxOP, and receiving additional data in the unlicensed radio frequency spectrum band during one or more subsequent TTIs of the TxOP.

Another apparatus for wireless communication is described. The apparatus may include means for identifying an autonomous uplink control channel configuration for unscheduled uplink transmissions in an unlicensed radio frequency spectrum band, means for receiving control information multiplexed with data according to the autonomous uplink control channel configuration in the unlicensed radio frequency spectrum band during an initial TTI of a TxOP, and means for receiving additional data in the unlicensed radio frequency spectrum band during one or more subsequent TTIs of the TxOP.

Another apparatus for wireless communication is described. The apparatus may include a processor, memory in electronic communication with the processor, and instructions stored in the memory. The instructions may be operable by the processor to cause the apparatus to identify an autonomous uplink control channel configuration for unscheduled uplink transmissions in an unlicensed radio frequency spectrum band, receive control information multiplexed with data according to the autonomous uplink control channel configuration in the unlicensed radio frequency spectrum band during an initial TTI of a TxOP, and receive additional data in the unlicensed radio frequency spectrum band during one or more subsequent TTIs of the TxOP.

Another non-transitory computer readable medium for wireless communication is described. The non-transitory computer-readable medium may include instructions operable to identify an autonomous uplink control channel configuration for unscheduled uplink transmissions in an unlicensed radio frequency spectrum band, receive control information multiplexed with data according to the autonomous uplink control channel configuration in the unlicensed radio frequency spectrum band during an initial TTI of a TxOP, and receive additional data in the unlicensed radio frequency spectrum band during one or more subsequent TTIs of the TxOP.

Some examples of the method, apparatus, and non-transitory computer-readable medium described above may further include processes, features, means, or instructions for determining whether the additional data may have been successfully received. Some examples of the method, apparatus, and non-transitory computer-readable medium described above may further include processes, features, means, or instructions for transmitting a feedback message comprising an acknowledgment or negative acknowledgment message based at least in part on the determination. In some examples of the method, apparatus, and non-transitory computer-readable medium described above, the feedback message may be transmitted using DCI format 0A, 0B, 4A, or 4B.

Some examples of the method, apparatus, and non-transitory computer-readable medium described above may further include processes, features, means, or instructions for receiving, within the control information, a scheduling request (SR) associated with a UE. Some examples of the method, apparatus, and non-transitory computer-readable medium described above may further include processes, features, means, or instructions for determining that the additional data will be transmitted from the UE based at least in part on the received SR. In some examples of the method, apparatus, and non-transitory computer-readable medium described above, identifying the autonomous uplink control channel configuration comprises: identifying one or more modulation symbol periods of the initial TTI, wherein the control information may be transmitted during the one or more modulation symbol periods and the control information may be time division multiplexed with the data during the initial TTI of the TxOP.

In some examples of the method, apparatus, and non-transitory computer-readable medium described above, the control information and the data in the initial TTI may be received in a narrow bandwidth portion of the unlicensed radio frequency spectrum band. In some examples of the method, apparatus, and non-transitory computer-readable medium described above, the narrow bandwidth portion comprises a frequency interlace of a carrier bandwidth. In some examples of the method, apparatus, and non-transitory computer-readable medium described above, the autonomous uplink control channel configuration comprises four modulation symbol periods, the four modulation symbol periods comprising two modulation symbol periods associated with a DMRS and two modulation symbol periods associated with data transmissions.

In some examples of the method, apparatus, and non-transitory computer-readable medium described above, the autonomous uplink control channel configuration comprises a payload and a waveform that correspond to an sPUCCH. In some examples of the method, apparatus, and non-transitory computer-readable medium described above, receiving the additional data comprises: receiving the additional data during a subsequent modulation symbol period following the four modulation symbol periods. In some examples of the method, apparatus, and non-transitory computer-readable medium described above, the control information and the data in the initial TTI may be received in a plurality of frequency interlaces of the unlicensed radio frequency spectrum band.

In some examples of the method, apparatus, and non-transitory computer-readable medium described above, the autonomous uplink control channel configuration comprises four modulation symbol periods, the four modulation symbol periods comprising two modulation symbol periods associated with a DMRS and two modulation symbol periods associated with data transmissions. In some examples of the method, apparatus, and non-transitory computer-readable medium described above, the autonomous uplink control channel configuration comprises a payload and a waveform that correspond to an sPUCCH. In some examples of the method, apparatus, and non-transitory computer-readable medium described above, receiving the additional data comprises: receiving the additional data during a subsequent modulation symbol period following the four modulation symbol periods within the plurality of frequency interlaces.

In some examples of the method, apparatus, and non-transitory computer-readable medium described above, the autonomous uplink control channel configuration comprises two modulation symbol periods, the two modulation symbol periods comprising a first modulation symbol periods associated with a DMRS and a second modulation symbol associated with data transmissions. In some examples of the method, apparatus, and non-transitory computer-readable medium described above, receiving the additional data comprises: receiving the additional data during a subsequent modulation symbol period following the two modulation symbol periods within the plurality of frequency interlaces. Some examples of the method, apparatus, and non-transitory computer-readable medium described above may further include processes, features, means, or instructions for transmitting a CTS signal to a UE during a modulation symbol period of the initial TTI of the TxOP, wherein the CTS signal may be responsive to the control information.

Some examples of the method, apparatus, and non-transitory computer-readable medium described above may further include processes, features, means, or instructions for identifying a guard period between the modulation symbol period that includes the CTS signal and the data, wherein the guard period may be time division multiplexed with the control information, the CTS signal, and the data. In some, examples of the method, apparatus, and non-transitory computer-readable medium described above, receiving the additional data comprises: receiving the additional data during a subsequent modulation symbol period following the guard period.

In some examples of the method, apparatus, and non-transitory computer-readable medium described above, the control information and the data in the initial TTI may be received and the CTS signal may be transmitted in a plurality of interlaces of the unlicensed radio frequency spectrum band. In some examples of the method, apparatus, and non-transitory computer-readable medium described above, the autonomous uplink control channel configuration comprises an initial modulation symbol period associated with a DMRS. In some examples of the method, apparatus, and non-transitory computer-readable medium described above, the control information comprises at least one of an SR, an indication of a MCS, or HARQ information, or a combination thereof.

Some examples of the method, apparatus, and non-transitory computer-readable medium described above may further include processes, features, means, or instructions for transmitting RRC signaling indicative of the autonomous uplink control channel configuration, wherein the autonomous uplink control channel configuration may be identified based at least in part on the RRC signaling. In some examples of the method, apparatus, and non-transitory computer-readable medium described above, the RRC signaling comprises an indication of at least one of a frequency domain allocation, a DMRS configuration, or an OCC sequence, or any combination thereof.

Some examples of the method, apparatus, and non-transitory computer-readable medium described above may further include processes, features, means, or instructions for receiving, during the initial TTI of the TxOP, an indication of a HARQ identifier, an indication of a RV, and a NDI associated with each TTI of the TxOP. Some examples of the method, apparatus, and non-transitory computer-readable medium described above may further include processes, features, means, or instructions for receiving, during the initial TTI of the TxOP, an indication of a NDI associated with each TTI of the TxOP.

Some examples of the method, apparatus, and non-transitory computer-readable medium described above may further include processes, features, means, or instructions for receiving a HARQ identifier and an indication of an RV during the initial TTI of the TxOP. Some examples of the method, apparatus, and non-transitory computer-readable medium described above may further include processes, features, means, or instructions for determining a HARQ identifier and an indication of an RV associated with each of the one or more subsequent TTIs of the TxOP, wherein determining the HARQ identifier and the indication of the RV may be based at least in part an a sequential computation associated with the HARQ identifier and the indication of the RV received during the initial TTI of the TxOP. In some examples of the method, apparatus, and non-transitory computer-readable medium described above, the control information may be received in a narrow bandwidth portion of the unlicensed radio frequency spectrum band comprising a frequency interlace of a carrier bandwidth.

In some examples of the method, apparatus, and non-transitory computer-readable medium described above, the autonomous uplink control channel configuration comprises fourteen modulation symbol periods, the fourteen modulation symbol periods comprising four modulation symbol periods associated with a DMRS and ten modulation symbol periods associated with data transmissions. In some examples of the method, apparatus, and non-transitory computer-readable medium described above, the autonomous uplink control channel configuration comprises a payload and a waveform that correspond to an ePUCCH.

DETAILED DESCRIPTION

Figure 1:
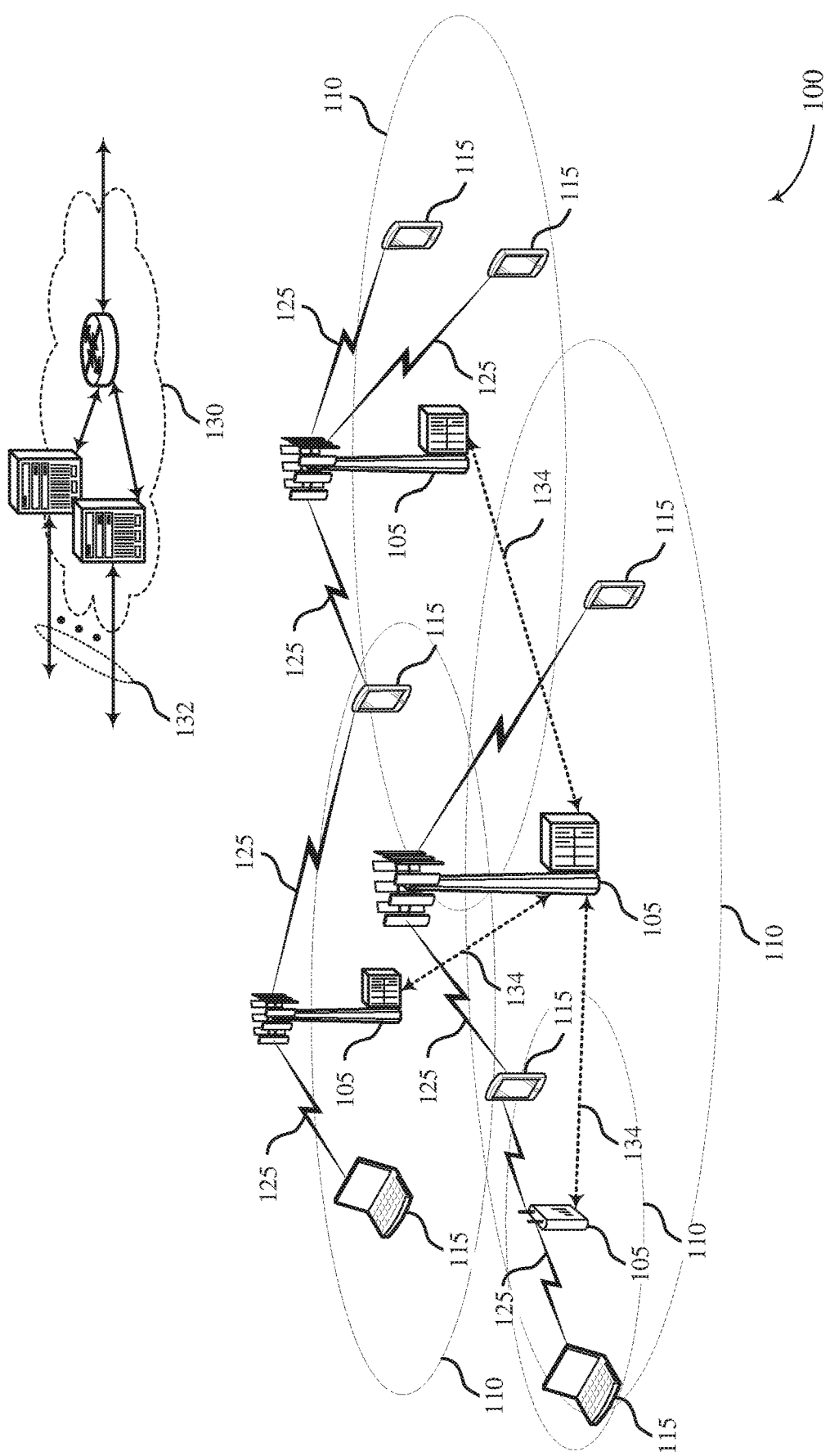
FIG. 1 illustrates an example of a system for wireless communication that supports various control channel configurations for autonomous uplink in accordance with aspects of the present disclosure.

A control channel configuration (e.g., an autonomous physical uplink control channel (A-PUCCH)) may be utilized by user equipment (UEs) autonomously transmitting uplink messages. The A-PUCCH may accordingly carry uplink control information and may be time or frequency division multiplexed with data during a transmission opportunity (TxOP). An A-PUCCH may include, for example, an indication of an uplink modulation and coding scheme (MCS); hybrid automatic repeat request (HARQ) information—which may include a new data indicator (NDI), a HARQ identifier (HARQ ID), and a redundancy version (RV); and, optionally, a scheduling request (SR). The A-PUCCH may be transmitted without receiving an uplink grant, and aspects of the A-PUCCH (e.g., a frequency interlace for the A-PUCCH, a demodulation reference signal (DMRS) associated with the transmitting UE, and orthogonal cover code (OCC) sequences, etc.) may be configured by a base station through radio resource control (RRC) signaling. As will be described below, the configuration of the A-PUCCH may use different waveforms and payloads.

In some examples, an A-PUCCH may utilize a waveform and payload similar to that of an enhanced PUCCH (ePUCCH). In these ePUCCH-like configurations, the first transmission time opportunity (TTI) (e.g., subframe) of an autonomous uplink burst may carry uplink control information for a full transmission opportunity (TxOP), and the A-PUCCH may not be transmitted in subsequent subframes. Unlike ePUCCH, however, A-PUCCH may be transmitted autonomous—i.e., without a prior request for resources. So while A-PUCCH may share certain aspects with ePUCCH (or other uplink control channels that facilitate interoperability), the autonomous nature of A-PUCCH transmissions give rise to timing and resource allocations for A-PUCCH which may give rise to novel challenges not contemplated in ePUCCH design. So as described herein, various novel approaches and A-PUCCH configurations may be employed.

For example A-PUCCH in the first TTI may be frequency division multiplexed with PUSCH. To indicate, within the uplink control information in the first TTI, MCS for multiple TTIs, different methods may be used, including indicating one MCS for the whole transmission opportunity, indicating an initial MCS for the first TTI and a MCS for subsequent TTIs, or using a bitmap to indicate MCS for each TTI.

Similar methods may be used to indicate HARQ information, such as, for example, a bitmap for each TTI or sequentially numbered identifiers.

In other examples, the A-PUCCH configuration may utilize a waveform and payload similar to that of a short PUCCH (sPUCCH). In such sPUCCH-like A-PUCCH configurations, the first TTI of an autonomous uplink burst may carry the uplink control information for the TxOP, and the A-PUCCH may not be transmitted in subsequent TTIs and data may be transmitted in symbols that follow the sPUCCH-like A-PUCCH. Additionally or alternatively, an A-PUCCH configuration may utilize a wideband-sPUCCH-like allocation, and may also include a smaller number of symbols for the uplink control channel. In the wideband allocation, the A-PUCCH may be included in a plurality of interlaces within a system bandwidth, rather than being allocated per-interlace. In some cases, the A-PUCCH configuration may utilize an alternate waveform, where the alternate waveform includes a wideband allocation of the control channel. The waveform may, for example, include a one symbol DMFS, a one symbol preamble which carrying uplink control information, and a guard period of one or more symbols. In such cases, a PUSCH may be subsequently transmitted following the guard period and subsequent TTIs may not include the A-PUCCH.

Wireless communications systems that support autonomous uplink coordination may use a listen-before-talk (LBT) procedure to resolve UE ambiguity and to mitigate potential for collisions that may arise in scenarios where un-scheduled wireless systems coexist with scheduled wireless systems (such as a MuLTEfire system). In the LBT procedure, a UE may monitor a medium for a defined time period to detect activity from other intra-cell UEs. If the UE does not detect any activity during the LBT procedure, the UE may transmit a busy signal until the next subframe, and may begin transmitting uplink data (e.g., using a physical uplink shared channel (PUSCH)) multiplexed with or shortly after an A-PUCCH.

Aspects of the disclosure introduced above are described below in the context of a wireless communications system. Further examples are then provided of control channel configurations and timelines associated with the transmission of various control channel configurations. Aspects of the disclosure are further illustrated by and described with reference to apparatus diagrams, system diagrams, and flowcharts that relate to various control channel configurations for autonomous uplink transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may be an example of a system that supports various control channel configurations for autonomous uplink transmissions by UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-PDM techniques. In some examples, the control information transmitted during a TTI of a downlink channel may be distributed between different control regions in a cascaded manner e.g., between a common control region and one or more UE-specific control regions). Base stations 105 may support autonomous uplink transmissions that employ the various autonomous control channel configurations described herein.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. UEs 115 may identify an autonomous uplink control channel configuration for unscheduled uplink transmissions and autonomously transmit uplink control information and data accordingly.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications, in other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown), in some examples, base stations 105 may be macro cells, small cells, hot spots, or the like. Base stations 105 may also be referred to as eNodeBs (eNBs) 105.

Aspects of wireless communications system 100 may be configured as a MultiFire network, and an access point (AP) may be configured as a Multi-Fire eNB or base station 105. Wireless communications system 100 may include aspects of an UE/UE-A network, a Wi-Fi network, a MultiFire network, a neutral host small cell network, or the like, operating with overlapping coverage areas. A MuLTEFire network may include APs and/or base stations 105 communicating with UEs 115 in unlicensed radio frequency spectrum band, e.g., without a licensed radio frequency anchor carrier. For example, the MulteFire network may operate without an anchor carrier in licensed radio frequency spectrum.

In some cases, UE 115 and base station 105 may operate in a shared radio frequency spectrum band, which may include licensed RF spectrum, unlicensed RE spectrum, or a combination of licensed and unlicensed RF spectrum. For example, wireless communications system 100 may employ UE License Assisted Access (UE-LAA) or LTE Unlicensed (LIE U) radio access technology or NR technology in an unlicensed band such as the 5 GHz industrial, Scientific, and Medical (ISM) band. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform an LBT procedure such as a clear channel assessment (CCA) prior to communicating in order to determine whether the shared channel is available. In some cases, grant-less PUSS H transmissions may follow similar LBT rules as used for grant-based uplink transmissions, such as category 4 LBT rules.

A CCA may include an energy detection or energy sensing procedure to determine whether there are any other active transmissions. For example, each UE 115 may randomly choose a backoff counter (with may be a certain duration or a number of symbols) and listen to a channel including resources the UEs 115 are contending for until the counter decrements to zero. If the counter reaches zero for a certain UE 115 and no other transmissions are detected, the UE 115 may start transmitting. If the counter does not reach zero before another signal is detected, the UE 115 has lost contention for resource and refrains from transmitting.

In some examples, a UE 115 may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. Although a base station 105 may generally refer to aspects of wireless wide area networks (WANs) and an AP may generally refer to aspects of WLANs, base station and AP may be used interchangeably. As discussed below, a base station 105 may identify conditions (e.g., number of hidden nodes) of a UE 115, and the core network 130, via base station 105, may configure the UE 115 accordingly.

UEs 115 and base stations 105 may employ a HARQ feedback mechanism, which may be a method of ensuring that data is received correctly over a communication link 125. HARQ may include a combination of error detection (e.g., using a cyclic redundancy check (CRC), forward error correction (FEC), and retransmission (e.g., automatic repeat request (ARQ)). HARQ may improve throughput at the media access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

In some examples, unscheduled PUSCH transmissions may use asynchronous HARQ processes, and certain retransmission options may be used. For example, a UE 115 may send a retransmission upon receipt of a NACK only, where a base station 105 may win contention for the medium to send the NACK feedback. Additionally or alternatively, retransmission may be based on receipt of NACK or a timer when no ACK/NACK feedback is received. In some cases, the timer may increase the chance of a PUSCH being received.

Bidirectional communications may use TDD (e.g., using paired spectrum resources) or TDD operation (e.g., using unpaired spectrum resources). Frame structures for TDD (e.g., frame structure type 1) and TDD (e.g., frame structure type 2) may be defined. For TDD frame structures, each subframe may carry uplink or downlink traffic, and special subframes may be used to switch between downlink and uplink transmission. Allocation of uplink and downlink subframes within radio frames may be symmetric or asymmetric and may be statically determined or may be reconfigured semi-statically. Special subframes may carry downlink or uplink traffic and may include a guard period (GP) between downlink and uplink traffic. Switching from uplink to downlink traffic may be achieved by setting a timing advance at the UE 115 without the use of special subframes or a guard period. Uplink downlink configurations with switch-point periodicity equal to the frame period (e.g., 10 ms) or half of the frame period (e.g., 5 ms) may also be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between uplink and downlink communications (e.g., interference between uplink and downlink communication from different base stations, interference between uplink and downlink communications from base stations and UEs, etc.). For example, where different base stations 105 serve different UEs 115 within overlapping coverage areas according to different TDD UL-DL configurations, a UE 115 attempting to receive and decode a downlink transmission from a serving base station 105 may experience interference from uplink transmissions from other, proximately located UEs 115.

In some cases, a UE 115 may be detectable by a central base station 105 (or AP), but not by other UEs 115 in the coverage area 110 of the central base station 105. For example, one UE 115 may be at one end of the coverage area 110 of the central base station 105 while another UE 115 may be at the other end (e.g., a hidden node). Thus, both UEs 115 may communicate with the base station 105, but may not receive the transmissions of the other. This may result in colliding transmissions for the two UEs 115 in a contention based environment (e.g., carrier sense multiple access with collision avoidance (CSMA/CA)) because the UEs 115 may not refrain from transmitting on top of each other. A UE 115 whose transmissions are not identifiable, but that is within the same coverage area 110 may be known as a hidden node. In some examples described herein, a UE 115 and base station 105 of interest may be referred to as a victim UE 115 or victim AP in the presence of a potentially interfering neighbor UE 115 or AP (e.g., a hidden node), which may be further referred to as an aggressor UE 115 or aggressor AP.

in some cases, intra-cell UE ambiguity and transmission collisions may result in decreased system performance (e.g. due to timing synchronization issues). Intra-cell UE ambiguity and/or transmission collisions may arise in scenarios where two or more UEs 115 are unable to detect each other (e.g. the hidden node issue described above). In some cases, a grant may be used by a base station 105 to allocate resources to UEs 115. In autonomous uplink (e.g., grant-less uplink), the base station 105 may detect the presence of the PUSCH and identify a UE 115 through a DMRS or scheduling request (SR). After one autonomous uplink UE 115 successfully contends the medium, the base station 105 may detect its PUSCH. However, since other intra-cell UEs 115 may not detect the DMRS and SR from this UE 115, another intra-cell UE (e.g., an aggressor) may also successfully contend the medium. As a result, the base station 105 may have a misaligned TDD configuration and frame start-timing, which may result in a collision between the transmissions from the two UEs 115.

Time intervals may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol may contain 2048 sample periods. However, in some cases as described below, symbols within wireless communications system 100 may also have different durations. In some cases the subframe may be the smallest scheduling unit, also known as a TTI. In other cases, a TTI may be shorter than a subframe or may be dynamically selected (e.g., in short TTI bursts or in selected component carriers using short TTIs).

Each frame may include ten 1 ms subframes numbered from 0 to 9; other frame structures may also be employed, as discussed below. A subframe may be further divided into two 0.5 ms slots, each of which contains 6 or 7 modulation symbol periods (depending on the length of the cyclic prefix prepended to each symbol). A resource element may consist of one symbol period and one subcarrier (a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements.

Excluding the cyclic prefix, each symbol may contain 2048 sample periods. In some cases the subframe may be the smallest scheduling unit, also known as a transmission time interval. In other cases, a TTI may be shorter than a subframe or may be dynamically selected (e.g, in short TTI bursts or in selected component carriers using short TTIs). A subframe may have different structures depending on the type and direction of information to be transmitted. A subframe type may be an uplink subframe, a downlink subframe, or a special (S) subframe. Special subframes may facilitate a switch from downlink to uplink transmission. Further the structure of a subframe may vary in terms of length. Other frame structures may also be employed in wireless communications system 100. In some cases, wireless communications system 100 may be organized by transmission opportunities (TxOPs), which may be organized according to the frame structure described above and which a may be separated by periods of time during which the wireless medium may be unavailable for devices (e.g., UEs 115 or base stations 105) within wireless communications system 100.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LIE Unlicensed (LTE U) radio access technology or NR technology in an unlicensed hand such as the 5 GHz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 115 may benefit from operating in an autonomous (i.e., unscheduled) uplink mode. When operating in an autonomous uplink mode, UEs 115 may use an autonomous control channel (e.g., A-PUCCH) configuration as described herein. These A-PUCCH configurations may be configured according to UE 115 or system needs or constraints in various examples.

In some cases, wireless communications system 100 may support different uplink transmission configurations for different UEs 115 (e.g., mixed mode scheduling). That is, a first UE 115 may operate using unscheduled uplink transmissions (which may be used in addition to scheduled uplink transmissions) and other UEs 115 may only use scheduled uplink transmissions. Such mixed-mode scheduling may be associated with enhanced communications performance within the system. As a result, configurations for UEs 115 that may operate using unscheduled and/or scheduled uplink transmissions may be determined by, a serving base station 105.

For example, a base station 105 may signal uplink transmission configurations for different UEs 115 using RRC or PDCCH. In some cases, a configuration sent using RRC may be less complex, and may be associated with relatively long time-scale (e.g., slow) configuration or reconfiguration procedures. Additionally, a configuration sent using PDCCH (or C-PDCCH) may be associated with relatively short time-scale (e.g., fast) configuration or reconfiguration procedures. The choice of how the configuration is transmitted (e.g., using RRC or PDCCH) may be determined based on system parameters or details. In some examples, rules may be defined and used by a base station 105 to restrict unscheduled uplink transmissions so that these transmissions do not coincide with discovery reference signal (DRS) measurement timing configuration (DMTC) operations, RACH operations, or the like.

As discussed above, the A-PUCCH configuration may use a waveform and payload similar to that of, for example, short PUCCH (sPDCCH). When the PUCCH is configured according to sPUCCH, the A-PUCCH may, for instance, be transmitted over four symbols, with a transmission in the special subframe. An sPUCCH configuration may support small payloads, and have a user multiplexing capability configurable up to 12 users. The base station may dynamically trigger the sPUCCH based on the presence of a pending ACK or NACK. The base station may trigger the sPUCCH over a common PDCCH (C-PDCCH), where the common PUCCH may carry the subframe configuration.

Additionally or alternatively, the A-PUCCH configuration may use a waveform and payload defined according to that of, for example, enhanced PUCCH (ePUCCH). When the PUCCH is configured according to ePUCCH, the PUCCH may be transmitted over 14 symbols, and may be polled by the base station, or triggered by an uplink grant. A sPUCCH configuration may support a larger payload, and have a user multiplexing capability configurable up to five users per interlace. The base station may trigger the ePUCCH in the uplink grant to a UE 115, or in the transmitted uplink grant.

Various techniques may be used to detect the presence of a PUSCH. In one technique, the base station may detect a UE-specific DMRS through blind detection. In this first technique, the base station may blindly detect the presence of PUSCH identify a UE 115 based on detecting a UE-specific DMRS sequence identification. However, in this first technique, the actual performance of UE-specific DMRS detection may be unknown, as DMRS may be designed primarily for channel estimation rather than UE-specific DMRS detection. Further, in the first technique, there may not be a large enough number of usable sequences for detection of a UE sequence for each UE identifier (ID). Yet further, it may be difficult to identify a short sequence ID if it is transmitted on a narrow bandwidth transmission.

A second technique may use SR based detection of the PUSCH. In the second technique, a UE-specific and resource-orthogonal SR may act as a PUSCH activation indicator, so the base station may not need to blindly detect the presence of the PUSCH. In this second technique, each UE 115 may be assigned an orthogonal SR resource, and when the base station detects the SR resource, the base station may then start channel estimation based DMRS and data decoding. In this second technique, however, SR may no longer be used for scheduling requests for UEs 115 operating according to autonomous uplink coordination. UE identification may be based on a mapping between the UE ID and a UE-specific SR resource.

In some cases, intra-cell UE ambiguity and transmission collisions may result in decreased system performance, for example, due to timing synchronization issues. Intra-cell UE ambiguity or transmission collisions may arise in scenarios where two or more UEs are unable to detect each other (e.g., hidden nodes as described above). In autonomous uplink systems, the base station may detect the presence of the PUSCH and identify a UE 115 through a DMRS or SR.

By way of example, after one UE 115 operating according to an autonomous uplink successfully contends the medium, the base station may detect its PUSCH. However, because other intra-cell UEs may not detect the DMRS and SR from UE 115, another intra-cell UE (e.g., an aggressor) may also successfully contend the medium. As a result, the base station may have a misaligned TDD configuration and frame start timing, which may result in a collision between the transmissions from the two UEs 115. Wireless communications system may support autonomous uplink control channel configurations for use in unscheduled uplink transmissions. For example, a UE 115 may identify data to transmit to a base station 105, and may initiate an unscheduled uplink transmission (e.g., without first receiving a grant of resources from the base station 105). Accordingly, the UE 115 may identify an autonomous uplink control channel configuration for the uplink transmission, and transmit control information and data during an initial TTI of a TxOP according to the autonomous uplink control channel configuration.

As mentioned above, and as described in more detail below, an autonomous uplink control channel configuration control may include a number of different waveforms and payload configurations. For example, an autonomous uplink control channel configuration may include control information frequency division multiplexed with data and transmitted in a frequency interlace of a carrier bandwidth. The autonomous uplink control channel configuration may also include control information time division multiplexed with data and transmitted over a set of symbol periods of the initial TTI, where the control information and data may be transmitted in a frequency interlace or a set of frequency interlaces of a carrier bandwidth. Additionally or alternatively, the autonomous uplink control channel configuration may include a symbol period used for the receipt of a CTS signal from the base station followed by one or more symbols used as a guard period before the transmission of data.

Figure 2:
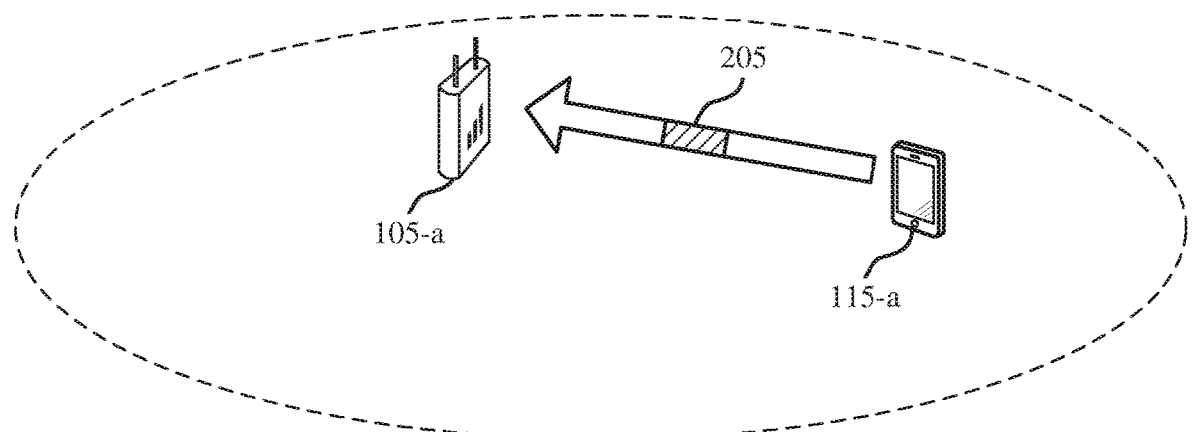
FIG. 2 illustrates an example of a wireless communications system that supports various control channel configurations for autonomous uplink in accordance with aspects of the present disclosure.

FIG. 2 illustrates an example of a wireless communications system 200 that supports various control channel configurations for autonomous uplink. Wireless communications system 200 may include a base station 105-*a* and UE 115-*a* that may be examples of the corresponding devices described with reference to FIG. 1. For example, UE 115-*a* may be time-synchronized with base station 105-*a*, and may be capable of unscheduled or autonomous uplink transmissions to base station 105-*a*. Accordingly, wireless communications system 200 may enable the use of different autonomous uplink control channel configurations by UE 115-*a* to send control information to base station 105-*a*.

In wireless communications system 200, autonomous uplink coordination may use a LBT procedure to resolve ambiguity between UEs 115 (e.g., including UE 115-*a*) and to mitigate potential for collisions that may arise in scenarios where un-scheduled wireless systems coexist with scheduled wireless systems. In the LBT procedure, UE 115-*a* may monitor or sense a medium for energy over a defined time period to detect activity from other intra-cell UEs 115 (not shown). When UE 115-*a* does not detect any other signals during the LBT procedure, UE 115-*a* may win contention for a set of resources used for transmitting data, meaning that the medium is clear. In some cases, if UE 115-*a* wins contention, it may transmit a busy signal until a subsequent TTI (e.g., a subframe, two-symbols, a slot, etc.).

In some examples, UE 115-*a* may perform a subsequent LBT procedure to determine whether base station 105-*a* is transmitting (e.g., an intra-cell LBT). For example, UE 115-*a* may, after sending the busy signal, monitor the medium for activity by base station 105-*a* which may include the transmission of CRSs, a PDSCH, or a PDCCH. UE 115-*a* may perform the intra-cell LBT procedure for a certain duration that may be relatively short, including, for example, a duration of one or two symbols, Should UE 115-*a* not detect a CRS (or PDSCH or PDCCH) during the intra-cell LBT, UE 115-*a* may begin transmitting uplink data (e.g., using a PUSCH) at a symbol period following the intra-cell LBT procedure.

In some cases with grant-less uplink transmissions, an autonomous PUCCH (A-PUCCH) may be utilized to carry uplink control information 205, including, for example: an indication of an uplink MCS; HARQ information which may include an NDI, a HARQ identifier (HARQ ID), and a RV; and, optionally, a SR. For the resource assignment of the A-PUCCH, the resource allocation may be configured on the frequency domain (i.e., each frequency interlace) according to RRC signaling received from base station 105-*a*. The resource allocation may have a resource block (RB)-level granularity, accordingly allocating resources for each RB independently. The resource allocation further introduce frequency hopping across the subframe to improve detection performance. The RRC may further configure the DMRS, and orthogonal cover code (OCC) to provide additional orthogonality, between layers.

As described in more detail below, the configuration of the autonomous uplink control channel may use different waveforms and payloads. In a first configuration, the A-PUCCH may utilize the waveform and payload similar to that of an ePUCCH. In a second configuration, the A-PUCCH may utilize the waveform and payload similar to that of an sPUCCH, being a per-interlace allocation. In a third configuration, the A-PUCCH may utilize a wideband-sPUCCH allocation, using a full-tone allocation where each interlace of the entire bandwidth may be allocated similarly. In a fourth configuration, the A-PUCCH may utilize an alternate waveform, where the alternate waveform includes a wideband allocation of all interlaces. Intra-cell LBT may be applied before each of the above configurations of the A-PUCCH.

Figure 3:
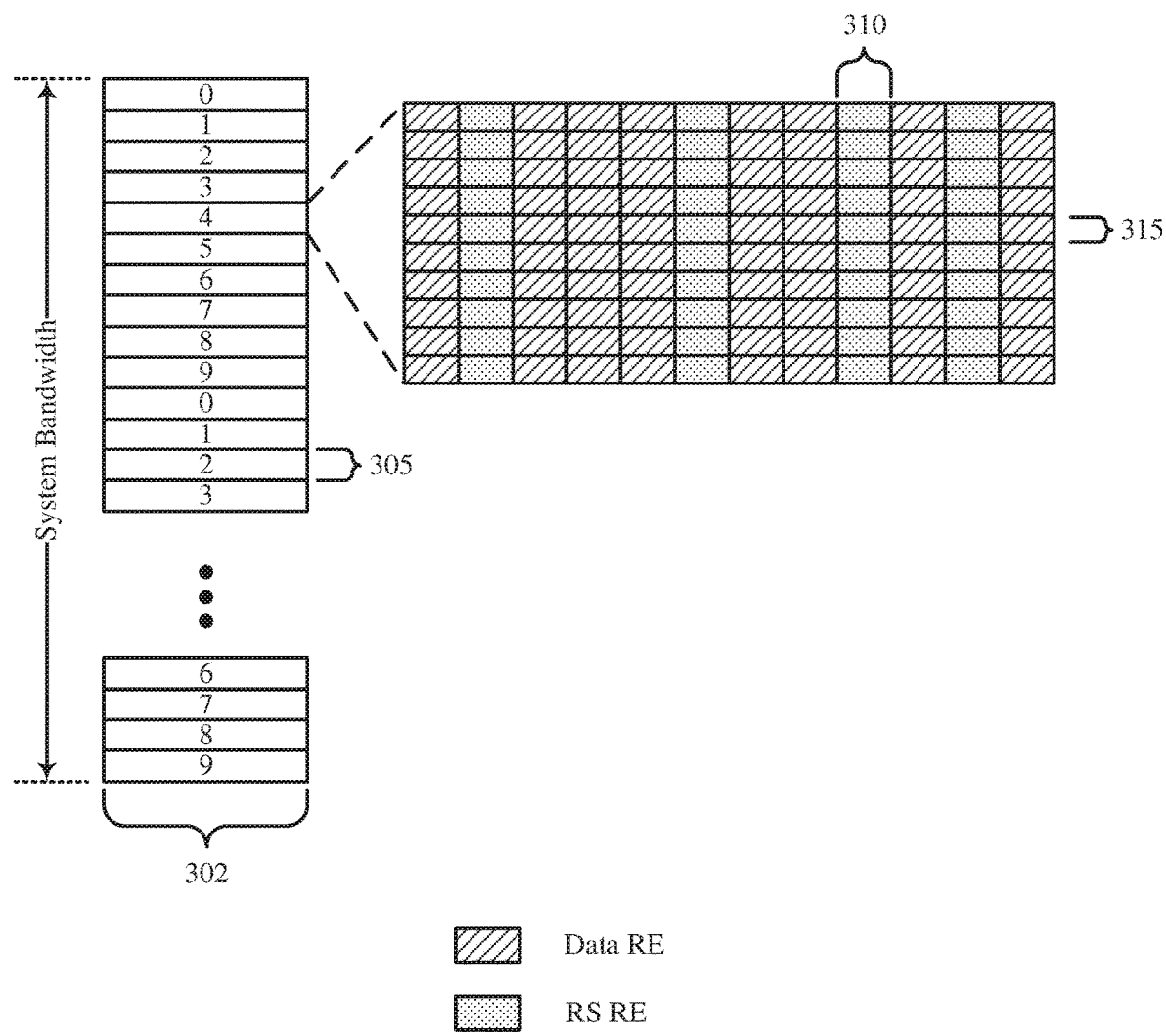
FIG. 3 illustrates an example of a first autonomous control channel configuration that supports autonomous uplink in accordance with aspects of the present disclosure.

FIG. 3 illustrates an example of a first autonomous control channel configuration 300 for autonomous uplink. The first autonomous control channel configuration 300 may be an example of a control channel used by a UE 115 for opportunistically transmitting uplink control and data to a base station 105 without receiving a prior grant of uplink resources. In some examples, the first autonomous control channel configuration 300 may have a similar payload and wave form as an ePUCCH, and may be transmitted over a single frequency interlace.

In TTI 302 (e.g., a first subframe) of a transmission opportunity, a system bandwidth may include one or more frequency interlaces 305. The TTI 302 may have a length or duration of, for example fourteen symbols 310 (e.g., OFDM symbols), and TTI 302 may be an initial TTI of a TxOP. In some examples, and as will be described below, after TTI 302, each subsequent TTI 302 of a TxOP may not include the first autonomous control channel configuration 300.

First autonomous control channel configuration 300 may be configured by RRC signaling received from a base station 105, and the resource allocation of first autonomous control channel configuration 300 may be configured independently for each interlace 305. Accordingly, each interlace 305 may include a resource block having one or more resource elements (REs) 315. The resource allocation for interlaces 305 may allocate resources independently for each resource block (RB).

Each RE 315 may consist of one symbol 310 and one subcarrier. For first autonomous control channel configuration 300, each interlace 305 may include, for example, fourteen symbols 310. Of the fourteen symbols 310, four may be allocated as reference signal (RSs) REs 315, for example DMRSs. The remaining ten symbols 310 may be allocated as data REs 315.

Figure 4:
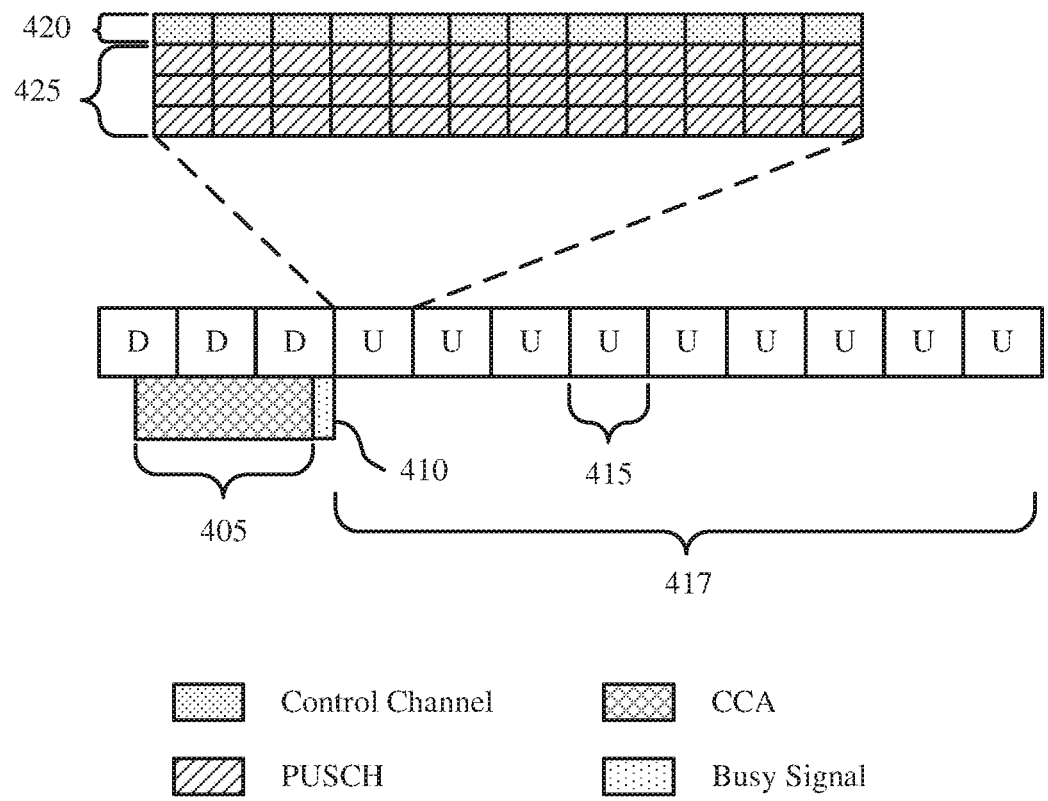
FIG. 4 illustrates an example of a timeline for an autonomous control channel transmission in a system that various control channel configurations for autonomous uplink in accordance with aspects of the present disclosure.

FIG. 4 illustrates an example of a timeline 400 for an autonomous control channel transmission in a system that supports various control channel configurations for autonomous uplink. Timeline 400 may be an example of a transmission of the first autonomous control channel configuration 300 as described with reference to FIG. 3.

In timeline 400, a UE 115 may initiate a CCA 405 to determine whether the transmission medium is available. If the channel is available, the UE 115 may transmit busy signal 410 to indicate that the channel is reserved by the UE 115 for the TxOP). Based on CCA 405, the UE 115 may initiate an uplink transmission. An initial TTI 415 (e.g., an initial uplink subframe of a TxOP 417) of an autonomous uplink burst may carry uplink control information for the whole TxOP, and control information may not be transmitted in subsequent TTIs 415, for example, beginning from a second uplink TTI 415 of TxOP 417. An autonomous uplink control channel 420 in the initial TTI 415 may be frequency division multiplexed with PUSCH 425. In some cases, an SR transmitted in the autonomous uplink control channel 420 may act as an activation indicator, or may be replaced with a UE-specific DMRS. In some examples, the autonomous uplink control channel 420 may have a similar payload and waveform to that of an ePUCCH.

To indicate, within uplink control information in the first TTI 415, MCS for multiple TTIs 415, different methods may be used. For example, one MCS may be indicated for the whole transmission opportunity (using, e.g., 5 bits), where the same MCS is used in all TTIs 415. Alternatively, an initial MCS may be indicated for the initial TTI 415 and a further MCS may be indicated for the remaining TTIs 415 (using e.g., a total of 10 bits), In this alternative, the PUSCH 425 of the initial TTI 415 may be multiplexed with the autonomous uplink control channel 420. As another alternative, a bitmap may be used to indicate MCS for each TTI 415 (using, e.g., 5*n bits, where the transmission opportunity has n TTIs 415).

Similar methods may be used to indicate uplink HARQ information for ePUCCH-like autonomous uplink control channels. However, one HARQ process may require more bits than MCS (e.g., 7 bits total, including 4 bits for HARQ ID, 2 bits for RV, and 1 bit for NDI). In a method, a bitmap may be used to indicate uplink HARQ information for each TTI 415 (using, e.g., 7*n bits, where the transmission opportunity has n uplink TTIs 415). Alternatively, sequentially numbered identifiers may be used to indicate the HARQ ID and the NDI. In this alternative, only HARQ ID and RV of the initial TTI 415 may be used, and may be numbered sequentially for each subsequent TTI 415. This alternative may further use a bitmap of the NDI for each TTI 415. This may use, for example, 6+n bits for a number n HARQ processes.

Figure 5:
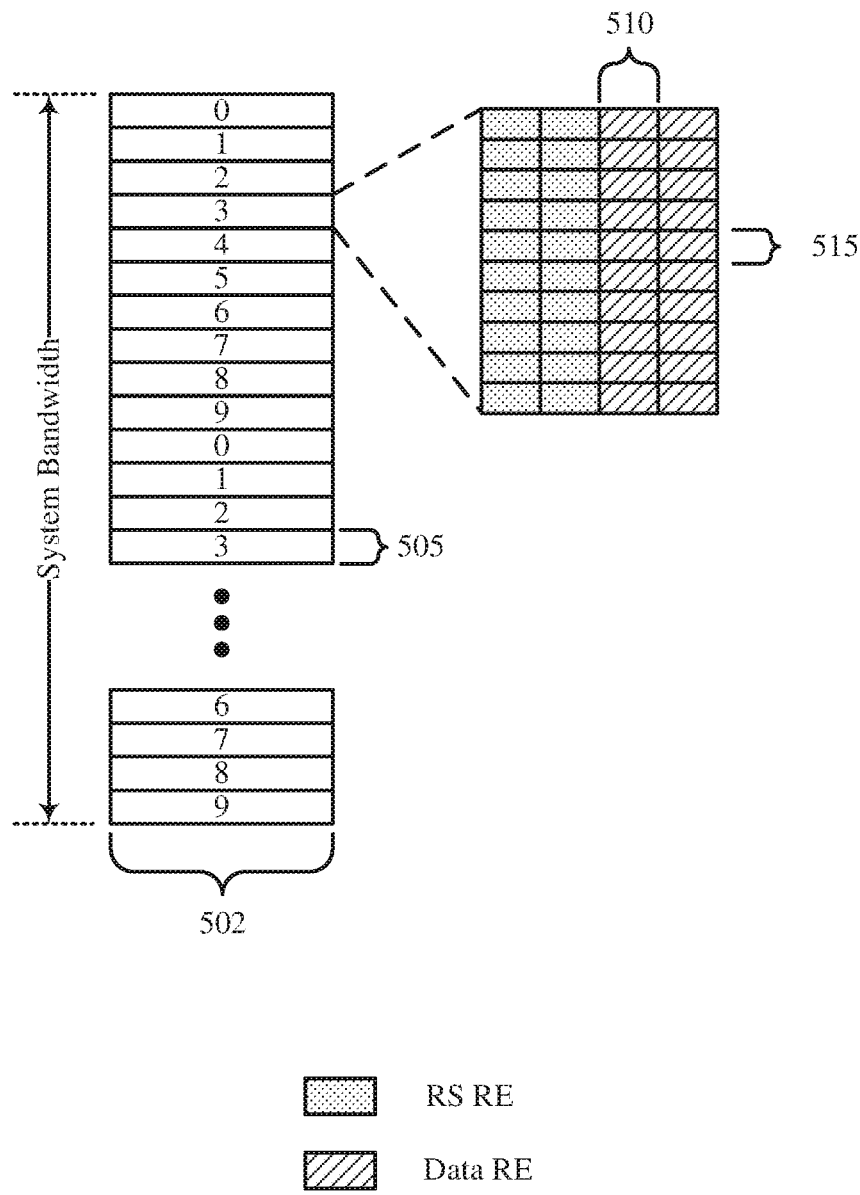
FIG. 5 illustrates an example of a second autonomous control channel configuration that supports autonomous uplink in accordance with aspects of the present disclosure.

FIG. 5 illustrates an example of a second autonomous control channel configuration 500 that supports autonomous uplink. The second autonomous control channel configuration 500 may be an example of a control channel used by a UE 115 for opportunistically transmitting uplink control and data to a base station 105 without receiving a prior grant of uplink resources. In some examples, the second autonomous control channel configuration 500 may have a similar payload and wave form as an sPUCCH and may be transmitted over a single frequency interlace.

In TTI 502 (e.g., a set of symbols within a subframe), a system bandwidth may include one or more interlaces 505, and TTI 502 may be an initial subframe of a TxOP, In some examples, the second autonomous control channel configuration 500 may include, for example, four symbols 510, with two symbols 510 used for DMRS, followed by two symbols 510 used as data symbols. After the TTI 502, each subsequent TTI 502 may have its own resource allocation and may not include second autonomous control channel configuration 500.

According to an RRC configuration received from a base station 105, the resource allocation of second autonomous control channel configuration 500 may be configured independently for each interlace 505. Each interlace 505 may include a resource block having one or more REs 515. The resource allocation for interlaces 505 may allocate resources independently for each RB. Each symbol 510 of the RB may be configured similarly to, for example in this case, sPUCCH.

Each RE 515 may consist of one symbol 510 and one subcarrier. For second autonomous control channel configuration 500, each interlace 505 may include, for example, four symbols 510. Of the four symbols 510, four may be allocated as RS REs 515, which may include a DMRS. The remaining two symbols 510 may be allocated as data REs.

Figure 6:
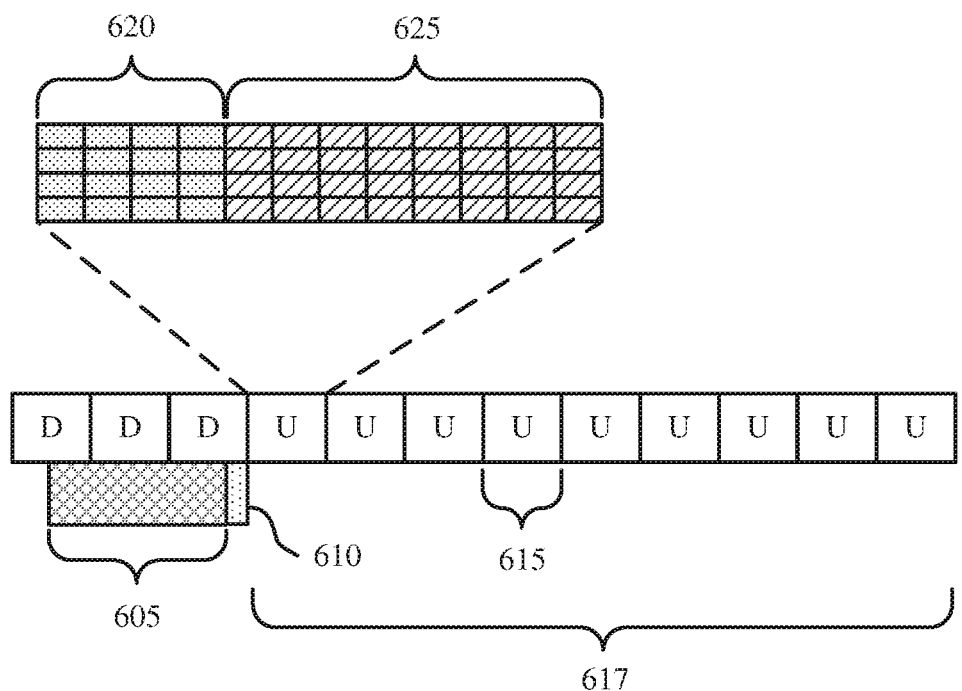
FIG. 6 illustrates an example of a timeline for an autonomous control channel transmission in a system that supports various control channel configurations for autonomous uplink in accordance with aspects of the present disclosure.

FIG. 6 illustrates an example of a timeline 600 for an autonomous control channel transmission in a system that supports various control channel configurations for autonomous uplink. Timeline 600 may be an example of a transmission of the second autonomous control channel configuration 500 as described with reference to FIG. 5.

In timeline 600, a UE 115 may initiate a CCA 605 to determine whether the transmission medium is available. If the channel is available, the UE 115 may transmit busy signal 610 to indicate that the channel is reserved for the transmission opportunity. Based on the CCA 605, the UE 115 may initiate an uplink transmission. An initial TTI 615 (e.g., an initial uplink subframe of a TxOP 617) of an autonomous uplink burst may carry uplink control information for the whole transmission opportunity, and control information may not be transmitted in subsequent TTIs 615 of TxOP 617, for example, beginning from a second uplink TTI 615. An autonomous uplink control channel 620 in the initial TTI 615 of TxOP 617 may be time division multiplexed with PUSCH 625, In some cases, an SR transmitted in the autonomous uplink control channel 620 may act as an activation indicator, or may be replaced with a UE-specific FAIRS. In some examples, the autonomous uplink control channel 620 may have a similar payload and waveform to that of an sPUCCH.

In such sPUCCH-like autonomous uplink control channel configurations, an initial TTI 615 of an automated uplink burst may carry the uplink control information for the whole TxOP, and the autonomous uplink control channel 620 may not be transmitted in subsequent TTIs 615, for example, beginning from the second TTI 615. An SR may act as an activation indicator, or may be replaced with a UE-specific DMRS. To indicate, within the uplink control information in the initial TTI 615, MCS for multiple TTIs 615, different methods may be used. For example, one MCS may be indicated for the whole transmission opportunity (using, e.g., 5 bits), where the same MCS is used in all TTI 615. Alternatively, an initial MCS may be indicated for the initial TTI 615 and a further MCS may be indicated for the remaining TTIs 415 (using e.g., a total of 10 bits). As another alternative, a bitmap may be used to indicate MCS for each TTI 415 (using, e.g., 5*n bits, where the transmission opportunity has n TTIs). For autonomous uplink control channel 620, the PUSCH 625 transmission may, for example, start from the fifth symbol of the initial TTI 615 of TxOP 617.

Figure 7:
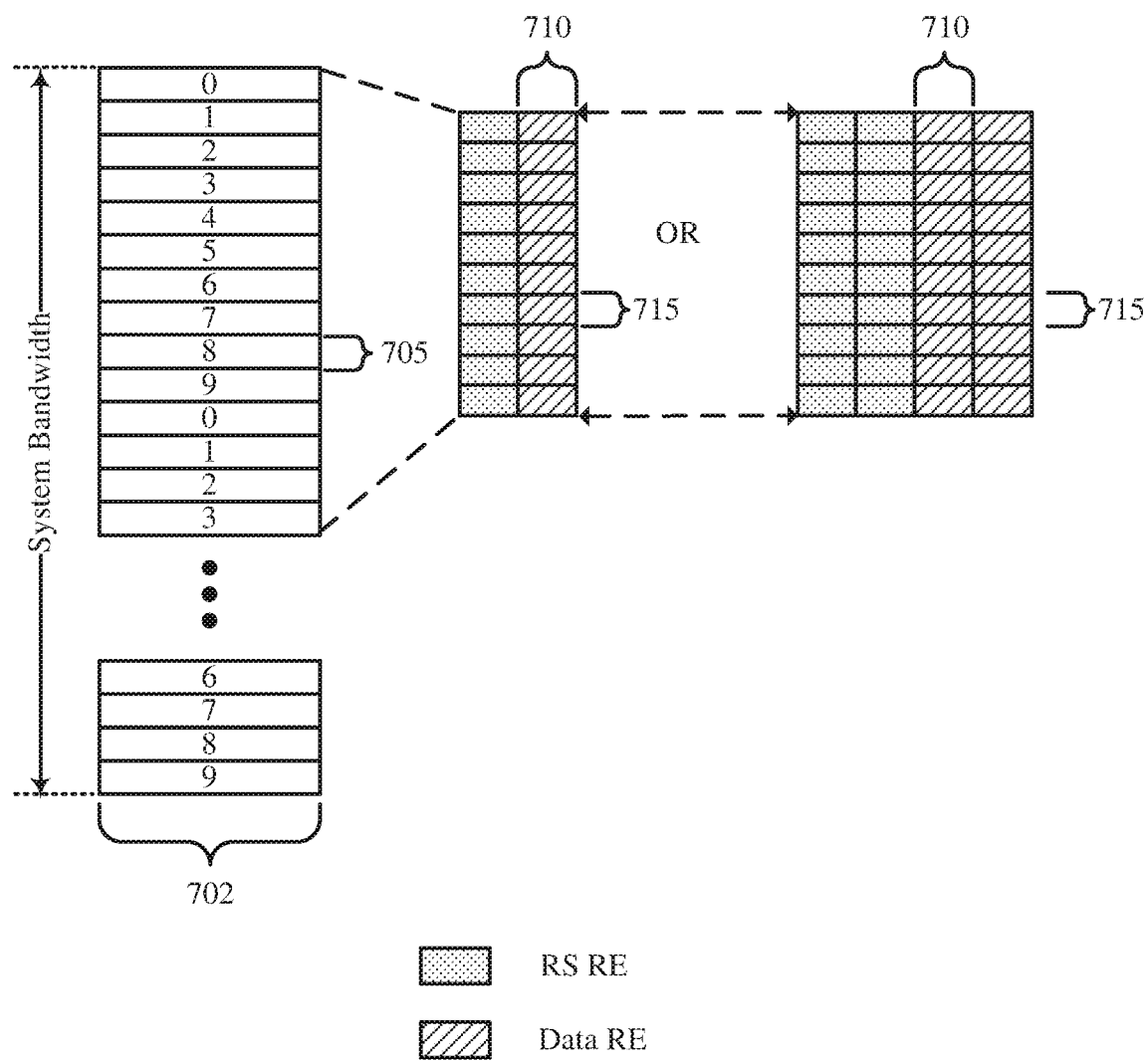
FIG. 7 illustrates an example of a third autonomous control channel configuration that supports for autonomous uplink in accordance with aspects of the present disclosure.

FIG. 7 illustrates an example of a third autonomous control channel configuration 700 that supports autonomous uplink. The third autonomous control channel configuration 700 may be an example of a control channel used by a UE 115 for opportunistically, transmitting uplink control and data to a base station 105 without receiving a prior grant of uplink resources. In some examples, the third autonomous control channel configuration 700 may have a similar payload and wave form as a sPUCCH, and may be transmitted over a set of frequency interlaces.

In a TTI 702 of a TxOP, a system bandwidth may include one or more frequency, interlaces 705. In some examples, third autonomous control channel configuration 700 may utilize a wideband resource allocation, where the third autonomous control channel configuration 700 is transmitted over a set of frequency interlaces 705. In such cases, the set of frequency interlaces 705 may include, for example, four symbols 710, with two symbols 710 used for DMRS, followed by two symbols 710 used as data symbols. Additionally or alternatively, third autonomous control channel configuration 700 may include, for example, two symbols 710, with one symbol 710 used for DMRS, followed by one symbol 710 used as a data symbol. In a wideband allocation, the REs 715 of each interlace 705 of the entire bandwidth may be allocated, rather than being allocated per-frequency interlace 705. Each interlace 705 may include a resource block having one or more REs 715, where the REs 715 are allocated similarly across the bandwidth. Each RE 515 may consist of one symbol 510 and one subcarrier.

Figure 8:
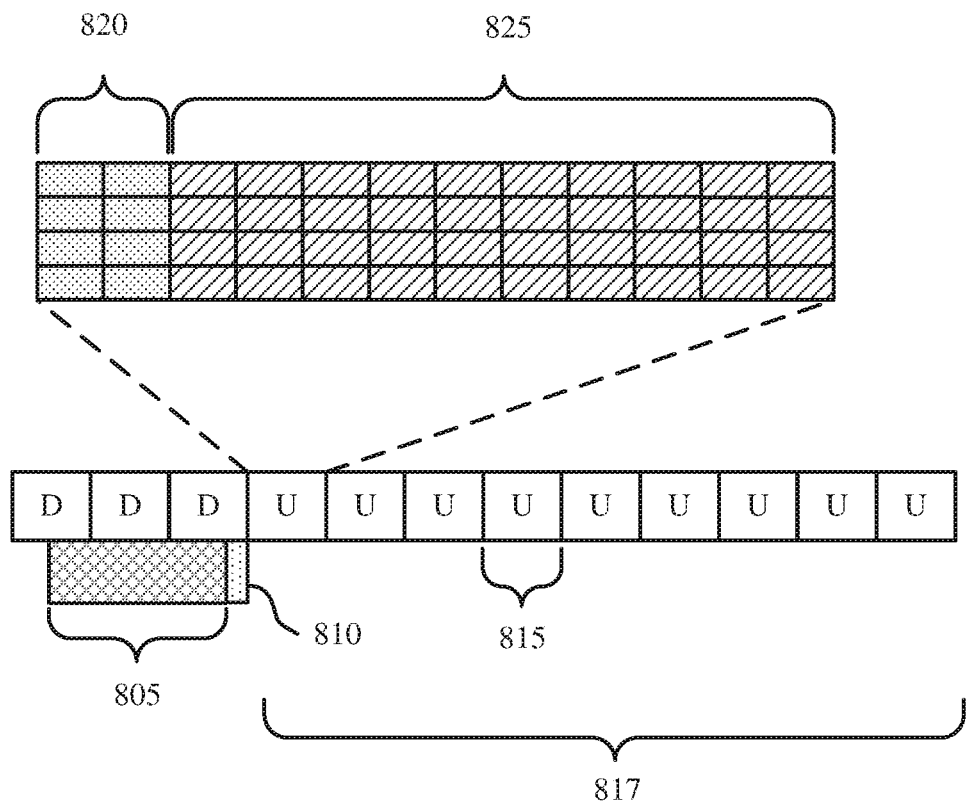
FIG. 8 illustrates an example of a timeline for an autonomous control channel transmission in a system that supports various control channel configurations for autonomous uplink in accordance with aspects of the present disclosure.

FIG. 8 illustrates an example of a timeline 800 for an autonomous control channel transmission in a system that supports various control channel configurations for autonomous uplink. Timeline 800 may be an example of a transmission of the third autonomous control channel configuration 700 as described with reference to FIG. 7.

In timeline 800, a UE 115 may initiate a CCA procedure 805 to determine whether the transmission medium is available. If the channel is available, the UE 115 may transmit busy signal 810 to indicate that the channel is reserved for the transmission opportunity. Based on CCA procedure 805, the UE 115 may initiate an uplink transmission. An initial TTI 815 (e.g., an initial uplink subframe of a TxOP 817) of an autonomous uplink burst may carry uplink control information for the whole transmission opportunity, and control information may not be transmitted in subsequent TTIs 815 of TxOP 817, for example, beginning from a second uplink TTI 815. In some cases, an autonomous uplink control channel 820 in the first TTI 815 may be time division multiplexed with PUSCH 825. In some cases, an SR transmitted in the autonomous uplink control channel 820 may act as an activation indicator, or may be replaced with a UE-specific DMRS. In some examples, the autonomous uplink control channel 820 may have a similar payload and waveform to that of an sPUCCH.

In such wideband-sPUCCH-like autonomous uplink control channel configurations, the first TTI 815 of an automated uplink burst may carry the uplink control information for the whole TxOP, and the A-PUCCH may not be transmitted in subsequent TTIs 815, for example, beginning from the second TTI 815. In the example shown in timeline 800, the PUSCH 825 transmission may start from the third symbol of the initial TTI 815. Additionally or alternatively, the PUSCH 825 transmission may start from the fifth symbol of the initial TTI 815 of TxOP 817, such as in the case where the autonomous uplink control channel 820 includes four modulation symbol periods.

Figure 9:
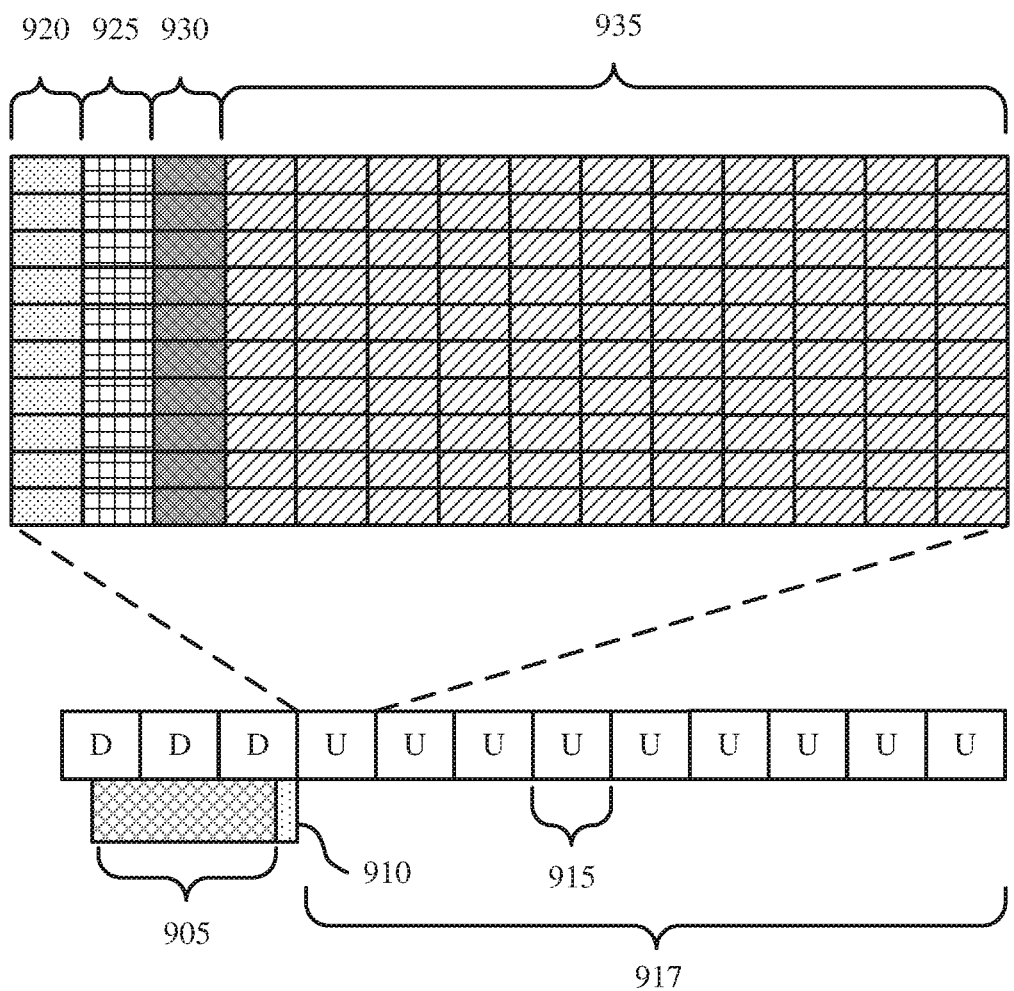
FIG. 9 illustrates an example of a fourth autonomous control channel configuration in a system that supports autonomous uplink in accordance with aspects of the present disclosure.
Figure 9:
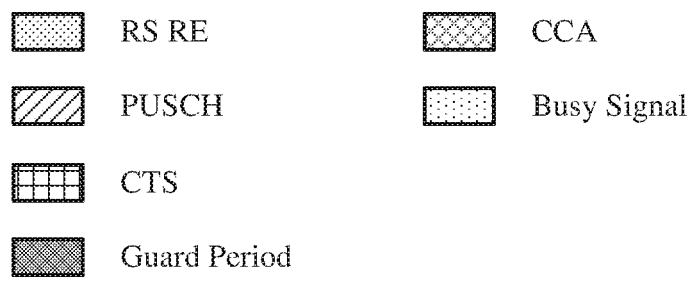

FIG. 9 illustrates an example of a fourth autonomous control channel configuration 900 that supports autonomous uplink. The fourth autonomous control channel configuration 900 may be an example of an waveform, which may include certain symbol periods used for CTS transmissions by a base station and a guard period prior to data transmissions by a UE 115. Additionally, the timeframe illustrated in FIG. 9 and associated with the transmission of the fourth autonomous control channel configuration 900 may be similar to those described above with reference to FIGS. 4, 6, and 8, and will not be repeated here for the sake of brevity.

In some cases, an autonomous uplink control channel configuration may utilize an alternate waveform, where the alternate waveform includes a wideband allocation of all frequency interlaces in a system bandwidth. The waveform may include a reference signal 920 transmission for all interlaces, which may include a DMRS that acts similar to a request-to-send (RTS) signal. The base station may identify a UE ID through DMRS sequence detection. The reference signal 920 may be followed by a one symbol preamble 925 for all interlaces, which may carry the uplink control information, where the preamble 925 may act similarly to a CTS. The preamble 925 may reserve the medium, or clean up the medium of conflicting transmissions.

The preamble 925 may further resolve contentions from hidden nodes, with which the UE 115 is contending for access to the unlicensed radio frequency spectrum band, and intra-cell UE collisions. The above described methods for signaling MCS and uplink HARQ information may similarly be applied for autonomous uplink control channels utilizing the fourth autonomous control channel configuration 900. The preamble 925 may then be followed by a guard period 930 of one or more symbol periods for transition from downlink transmissions to uplink transmissions. In some cases, the length of the guard period 930 may be configured through RRC. A PUSCH 935 may be subsequently transmitted following the guard period 930 and subsequent TTIs 915 of TxOP 917 may not include an autonomous uplink control channel.

Figure 10:
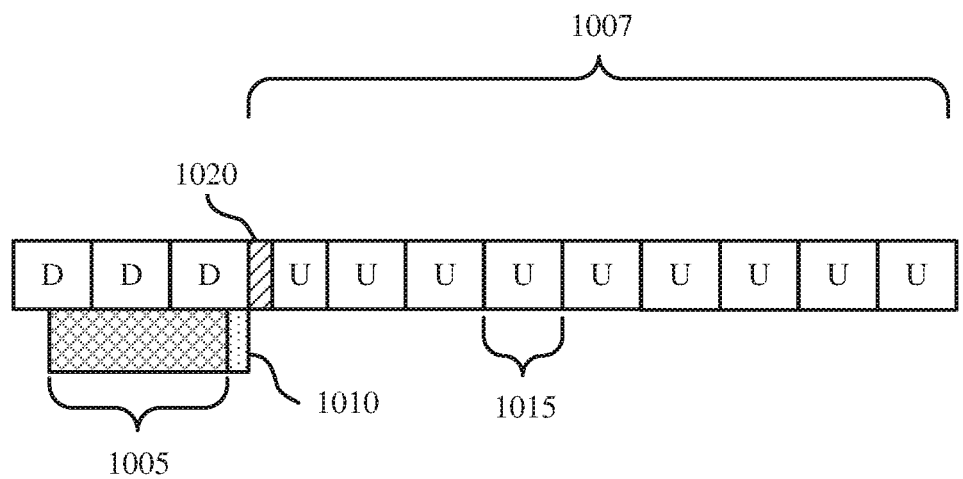
FIG. 10 illustrates an example of an intra-cell listen-before-talk (LBT) procedure that supports various control channel configurations for autonomous uplink in accordance with aspects of the present disclosure.

FIG. 10 illustrates an example of an intra-cell LBT procedure 1000 in a system that supports various control channel configurations for autonomous uplink. For example, intra-cell LBT procedure may be used by a UE 115 for unscheduled uplink transmissions to a base station 105. Intra-cell LBT procedure may be used to mitigate base station-UE or downlink-uplink collisions within a wireless system.

When utilizing intra-cell LBT procedure 1000, a UE 115 may perform a CCA procedure 1005 prior to a TxOP 1007 that the UE 115 intends to use for transmitting data. Should the UE 115 determine that no signals were transmitted during the CCA procedure 1005, the UE 115 may transmit a busy signal 1010 up to an initial TTI of the TxOP 1007. After transmitting busy signal 1010, the UE 115 may perform intra-cell LBT procedure 1020. In intra-cell LBT procedure 1020, the UE 115 may monitor the medium for a defined time period to detect activity from other intra-cell UEs 115 where detected activity may include, for example, CRS, a PDSCH, or a PDCCH. The defined time period for intra-cell LBT procedure 1020 to detect activity may be, for example, a duration of one or two modulation symbols (e.g., OFDM symbols).

The case in which the UF 115 does not detect a CRS or other activity for the defined duration may be referred to as a "win," meaning that medium is clear and the UE 115 may begin transmitting data during TxOP 1007. That is, if the UE 115 "wins" the intra-cell LBT procedure, i.e., does not detect any activity during, intra-cell LBT procedure 1020, the UE 115 may begin transmitting uplink data (e.g., using a PUSCH). The UE 115 may thus begin transmitting uplink data at, for example, symbol 2 or 3, after the defined time period for intra-cell LBT procedure 1020.

A base station may receive a PUSCH from the UE 115, and may determine whether the PUSCH was received successfully. As a result, the base station 105 may transmit ACK/NACK feedback associated with the received PUSCH. In some cases, the base station 105 may acknowledge receipt of the of uplink transmissions using a DCI format (e.g., DCI format 0A, 0B, 4A, 4B, etc.), which, for example, may not schedule any additional transmissions. For instance, a PUSCH trigger bit in DCI may indicate that the bit is used for ACK/NACK feedback of autonomous uplink transmissions from the UE 115, and no uplink transmissions may be scheduled. Additionally or alternatively, a certain combination of bits (e.g., MCS and a number of TTIs) may be used to indicate ACK/NACK feedback of autonomous uplink transmissions from a UE 115. In some cases, an NDI bit may be used to indicate ACK/NACK feedback, and information associated with a HARQ identifier and RV may be indicated in bits corresponding to a HARQ process number bit and RV, respectively.

Figure 11:
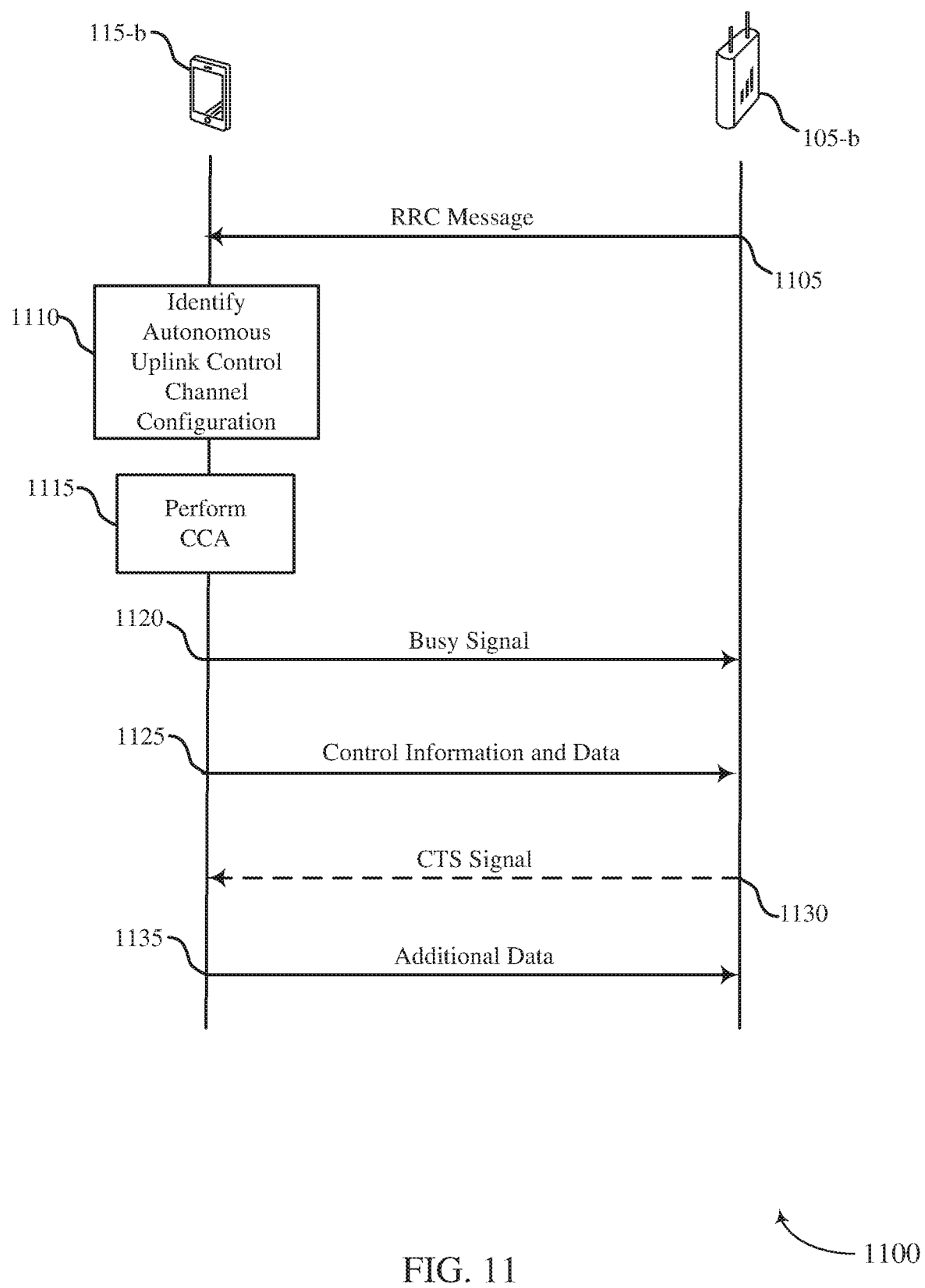
FIG. 11 illustrates an example of a process flow in a system that supports various control channel configurations for autonomous uplink in accordance with aspects of the present disclosure.

FIG. 11 illustrates an example of a process flow 1100 in a system that supports various control channel configurations for autonomous uplink. Process flow 1100 may include a UE 115-*b* and base station 105-*b*, which may be respective examples of a UE 115 and a base station 105 as described herein with reference to FIGS. 1-2. Process flow 1100 may be an example of the use of different autonomous uplink control channel configurations, where UE 115-*b* may opportunistically transmit uplink data without receiving a prior grant of uplink resources.

At 1105, base station 105-*h* may transmit to UE 115-*b*, and UE 115-*b* may receive from base station 105-*b*, an RRC message. The RRC message, or RRC signaling, may, indicate a periodic resource allocation in the frequency domain for uplink transmissions in an unlicensed radio frequency spectrum band. The resource allocation may have a resource block (RB) level granularity, accordingly allocating resources for each RB. The resource allocation further introduce frequency hopping across the subframe to improve detection performance. The RRC may further indicate a DMRS configuration and an OCC sequence.

At 1110, UE 115-*b* may identify an autonomous uplink control channel configuration for unscheduled uplink transmissions in an unlicensed radio frequency spectrum band. The control channel information may include an SR, a MCS, and HARQ information. The HARQ information may include a HARQ ID, a RV, and a NDI associated with each TTI (e.g., each subframe) of the transmission opportunity. UE 115-*b* may further identify a narrow bandwidth portion of the unlicensed radio frequency spectrum band for transmission of control information. The narrow bandwidth portion of the frequency spectrum may include one or more particular frequency interlace of the carrier bandwidth. UE 115-*b* may further identify one or more modulation symbol periods of an initial TTI, An initial modulation symbol period may be used for DMRS.

The control channel configuration may define a payload and waveform similar to that of ePUCCH. In this case, the control channel configuration may use, for example, fourteen modulation symbol periods. Four of the modulation symbol periods may be used for DMRS, and ten modulation symbol periods may be used for data transmissions.

Alternatively, the control channel configuration may define a payload and waveform similar to that of sPUCCR in this case, the control channel configuration may use, for example, four modulation symbol periods. Two modulation symbol periods may be used for DMRS, and two modulation symbol periods may be used for data transmissions. Alternatively, the control channel configuration may use, for example, two modulation symbol periods, where the first modulation symbol period may be used for DMRS, and the second modulation symbol period may be used for data transmissions.

At 1115, UE 115-*b* may perform a CCA UE 115-*b* may identify a CCA format for the autonomous uplink mode and perform a CCA procedure in the unlicensed radio frequency spectrum band prior to transmitting an uplink message using the identified CCA format. The CCA procedure may be performed, for example, during a TTI preceding the transmission opportunity. UE 115-*b* may further identify a guard period between the modulation symbol period that includes the CTS signal and the data. The guard period may be time division multiplexed with any of the control information, the CTS signal, and the data.

At 1120, UE 115-*b* may transmit to base station 105-*b*, and base station 105-*b* may receive from UE 115-*b*, a busy signal indicating that a portion of the unlicensed radio frequency spectrum band is reserved for transmission of the uplink message. Transmitting the busy signal may be based at least in part on UE 115-*b* identifying that the portion of the unlicensed radio frequency spectrum band is available based on the CCA. The busy signal may be transmitted in the unlicensed radio frequency spectrum band upon completing the CCA procedure and for the remaining duration of the preceding TTI.

At 1125, UE 115-*b* may transmit to base station 105-*b*, and base station 105-*b* may receive from UE 115-*b*, control information multiplexed with data according to the autonomous uplink control channel configuration in the unlicensed radio frequency spectrum band. The control information may be transmitted during an initial TTI of a transmission opportunity. Additionally or alternatively, the control information and data may be transmitted during the identified one or more modulation symbol periods, and the control information may be time division multiplexed with the data. The transmitted data may include an indication of a MCS for the initial TTI. The transmitted data may further include an indicator for the identifier HARQ ID, RV, and NDI for each TTI of the transmission opportunity. The control information and the data may be transmitted in the identified narrow bandwidth portion, including one or more frequency interlaces, of the unlicensed radio frequency spectrum band, and the control information may be frequency division multiplexed with the data.

Additionally or alternatively, UE 115-*b* may perform an LBT procedure in which UE 115-*b* may monitor the unlicensed radio frequency spectrum band for one or more modulation symbol periods of the initial TTI UE 115-*b* may then transmit the control information after the one or more modulation symbol periods of the initial TTI based at least in part on determining that no CRS may have been received from base station 105-*b* (or, a serving base station) during the one or more modulation symbol periods of the initial TTI.

At 1130, base station 105-*b* may transmit to UE 115-*b*, and UE 115-*b* may receive from base station 105-*b*, a CTS signal during a modulation symbol period of the initial TTI of the transmission opportunity. The CTS signal may be transmitted on one or more particular interlaces of the unlicensed radio frequency spectrum band. The CTS signal may be responsive to the transmitted control information.

At 1135, UE 115-*b* may transmit to base station 105-*b*, and base station 105-*b* may receive from UE 115-*b*, additional data in the unlicensed radio frequency spectrum band during one or more subsequent TTIs of the transmission opportunity. In the case of a sPUCCH-like control channel configuration, the additional data may, for example, be transmitted on one or more frequency interlaces during a subsequent modulation symbol period following the two or four modulation symbol periods. Alternatively, when the CCA has been performed, the additional data may be transmitted during a subsequent modulation symbol period following the guard period. The data in the initial TTI and the additional data may be transmitted with the same MCS. Alternatively, the data in the initial TTI may be transmitted with a first MCS, and the additional data may be transmitted with a second MCS, where the second MCS may be different from the first MCS. The additional transmitted data may include an indication of a MCS for each respective TTI of the transmission opportunity. The additional transmitted data may further include an additional HARQ ID and an additional indication of an RV based at least in pail on a sequential computation associated with each TTI of the transmission opportunity.

Figure 12:
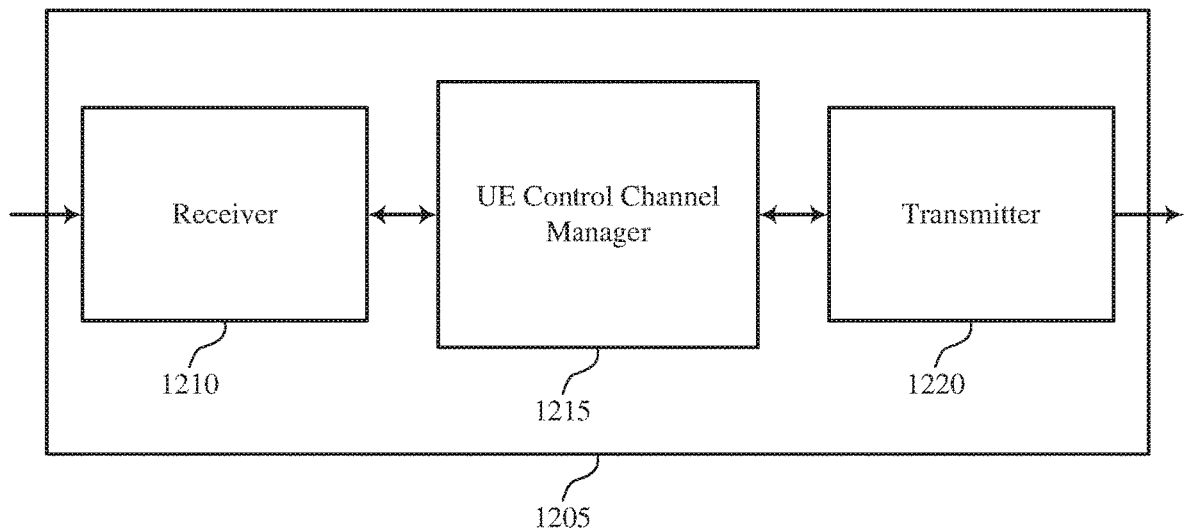
FIGS. 12 through 14 show block diagrams of a device or devices that support various control channel configurations for autonomous uplink in accordance with aspects of the present disclosure.

FIG. 12 shows a block diagram 1200 of a wireless device 1205 that supports various control channel configurations for autonomous uplink in accordance with various aspects of the present disclosure. Wireless device 1205 may be an example of aspects of a UE 115 as described with reference to FIG. 1. Wireless device 1205 may include receiver 1210, UE control channel manager 1215, and transmitter 1220. Wireless device 1205 may also include a processor. Each of these components may be in communication with one another (e.g., via one or more buses).

Receiver 1210 maybe receive information such as packets, user data, or control information associated with various information channels (e.g., control channels, data channels, and information related to various control channel configurations for autonomous uplink, etc.). Information may be passed on to other components of the device. The receiver 1210 may be an example of aspects of the transceiver 1535 described with reference to FIG. 15. UE control channel manager 1215 may be an example of aspects of the UE control channel manager 1515 described with reference to FIG. 15.

UE control channel manager 1215 or at least some of its various sub-components may be implemented in hardware, software executed by a processor, firmware, or any combination thereof. If implemented in software executed by a processor, the functions of the UE control channel manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE control channel manager 1215 or at least some of its various sub-components may be physically located at various positions, including being distributed such that portions of functions are implemented at different physical locations by one or more physical devices. In some examples, UE control channel manager 1215 or at least some of its various sub-components may be a separate and distinct component in accordance with various aspects of the present disclosure. In other examples, UE control channel manager 1215 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE control channel manager 1215 may identify an autonomous uplink control channel configuration for unscheduled uplink transmissions in an unlicensed radio frequency spectrum band, transmit control information multiplexed with data according to the autonomous uplink control channel configuration in the unlicensed radio frequency spectrum band during an initial TTI of a TxOP, and transmit additional data in the unlicensed radio frequency spectrum band during one or more subsequent TTIs of the TxOP.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
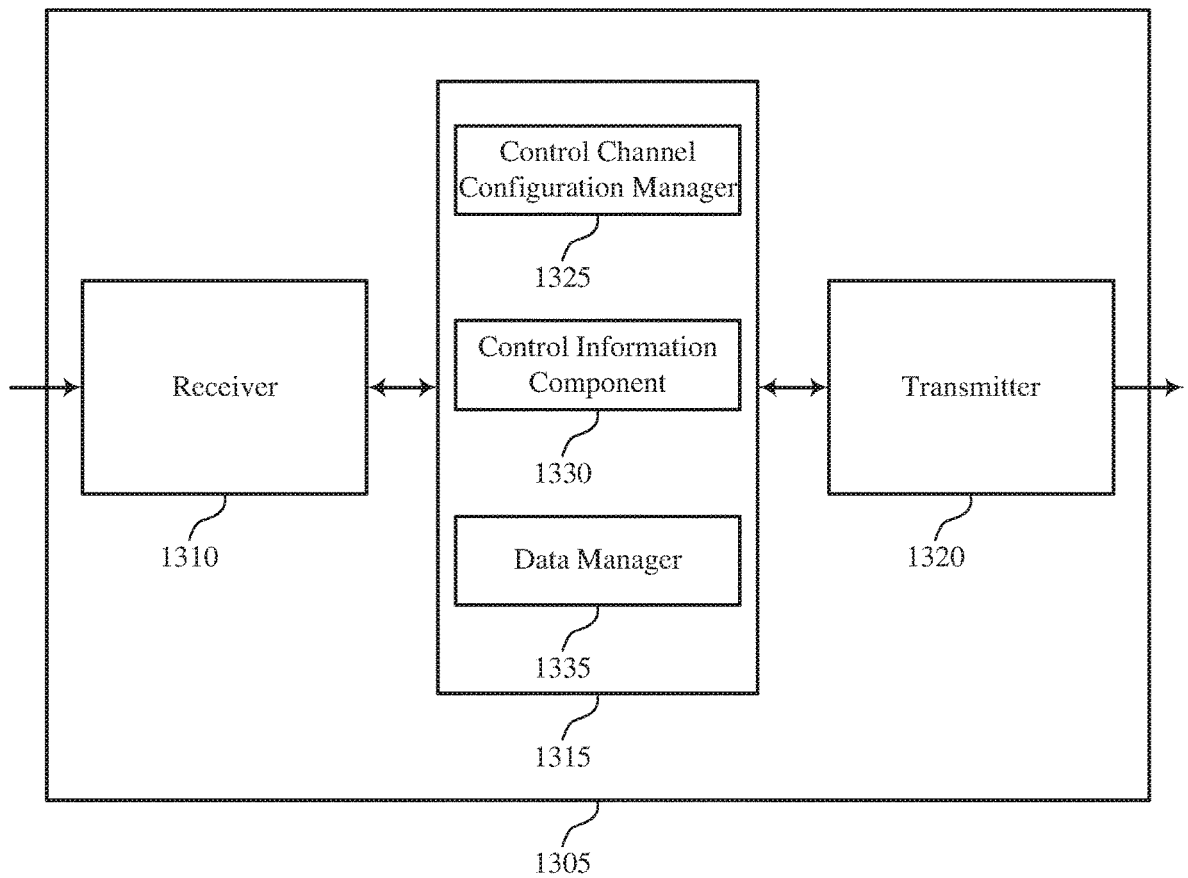

FIG. 13 shows a block diagram 1300 of a wireless device 1305 that supports various control channel configurations for autonomous uplink in accordance with various aspects of the present disclosure. Wireless device 1305 may be an example of aspects of a wireless device 1205 or a UE 115 as described with reference to FIGS. 1 and 12. Wireless device 1305 may include receiver 1310, UE control channel manager 1315, and transmitter 1320. Wireless device 1305 may also include a processor. Each of these components may be in communication with one another (e.g, via one or more buses).

Receiver 1310 may receive information such as packets, user data, or control information associated with various information channels (e.g., control channels, data channels, and information related to various control channel configurations for autonomous uplink, etc.). Information may be passed on to other components of the device. The receiver 1310 may be an example of aspects of the transceiver 1535 described with reference to FIG. 15.

UE control channel manager 1315 may be an example of aspects of the UE control channel manager 1515 described with reference to FIG. 15. UE control channel manager 1315 may also include control channel configuration manager 1325, control information component 1330, and data manager 1335.

Control channel configuration manager 1325 may identify an autonomous uplink control channel configuration for unscheduled uplink transmissions in an unlicensed radio frequency spectrum band. In some cases, identifying the autonomous uplink control channel configuration may include identifying one or more modulation symbol periods of the initial TTI, where the control information is transmitted during the one or more modulation symbol periods and the control information is time division multiplexed with the data during the initial TTI of the TxOP. Identifying the autonomous uplink control channel configuration may also include identifying a narrow bandwidth portion of the unlicensed radio frequency spectrum band, where the control information is transmitted in the narrow bandwidth portion and the control information is frequency division multiplexed with the data during the initial TTI of the TxOP.

In some cases, the autonomous uplink control channel configuration includes an initial modulation symbol period associated with a DMRS, in some cases, the narrow bandwidth portion includes a frequency interlace of a carrier bandwidth. In some cases, the autonomous uplink control channel configuration includes fourteen modulation symbol periods, the fourteen modulation symbol periods including four modulation symbol periods associated with a DMRS and ten modulation symbol periods associated with data transmissions. Additionally or alternatively, the autonomous uplink control channel configuration includes a payload and a waveform that correspond to an ePUCCH. In some cases, the autonomous uplink control channel configuration includes a payload and a waveform that correspond to a sPUCCH.

In some cases, the autonomous uplink control channel configuration includes four modulation symbol periods, the four modulation symbol periods including two modulation symbol periods associated with a DMRS and two modulation symbol periods associated with data transmissions. In some examples, the autonomous uplink control channel configuration includes two modulation symbol periods, the two modulation symbol periods including a first modulation symbol periods associated with a DMRS and a second modulation symbol associated with data transmissions. In some cases, the autonomous uplink control channel configuration includes four modulation symbol periods, the four modulation symbol periods including two modulation symbol periods associated with a DMRS and two modulation symbol periods associated with data transmissions.

Control information component 1330 may transmit control information multiplexed with data according to the autonomous uplink control channel configuration in the unlicensed radio frequency spectrum band during an initial TTI of a TxOP. In some cases, the control information and the data in the initial TTI are transmitted in a narrow bandwidth portion of the unlicensed radio frequency spectrum band. In some cases, the narrow bandwidth portion includes a frequency interlace of a carrier bandwidth. In some cases, the control information and the data in the initial TTI are transmitted in a set of frequency interlaces of the unlicensed radio frequency spectrum band. In some cases, the control information and the data in the initial TTI are transmitted and the CTS signal is received in a set of interlaces of the unlicensed radio frequency spectrum band. In some cases, the control information includes at least one of a SR, an indication of a MCS, or HARQ information, or a combination thereof.

Data manager 1335 may transmit additional data in the unlicensed radio frequency spectrum band during one or more subsequent TTIs of the TxOP. In some cases, transmitting the additional data includes: transmitting the additional data during a subsequent modulation symbol period following the four modulation symbol periods, in some cases, transmitting the additional data includes: transmitting the additional data during a subsequent modulation symbol period following the four modulation symbol periods within the set of frequency interlaces. In some cases, transmitting the additional data includes transmitting the additional data during a subsequent modulation symbol period following the two modulation symbol periods within the set of frequency interlaces. In some cases, transmitting the additional data includes transmitting the additional data during a subsequent modulation symbol period following the guard period. In some cases, the data in the initial TTI of the TxOP and the additional data in the one or more subsequent TTIs of the TxOP are transmitted with a same MCS. In some cases, the data in the initial TTI of the TxOP is transmitted with a first MCS and the additional data in the one or more subsequent TTIs of the TxOP is transmitted with a second MCS that is different from the first MCS. In some cases, the data transmitted in the initial TTI of the TxOP includes an indication of a MCS for the initial TTI and the additional data transmitted in the one or more subsequent TTIs of the TxOP include an indication of an MCS for each respective ITT of the TxOP.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
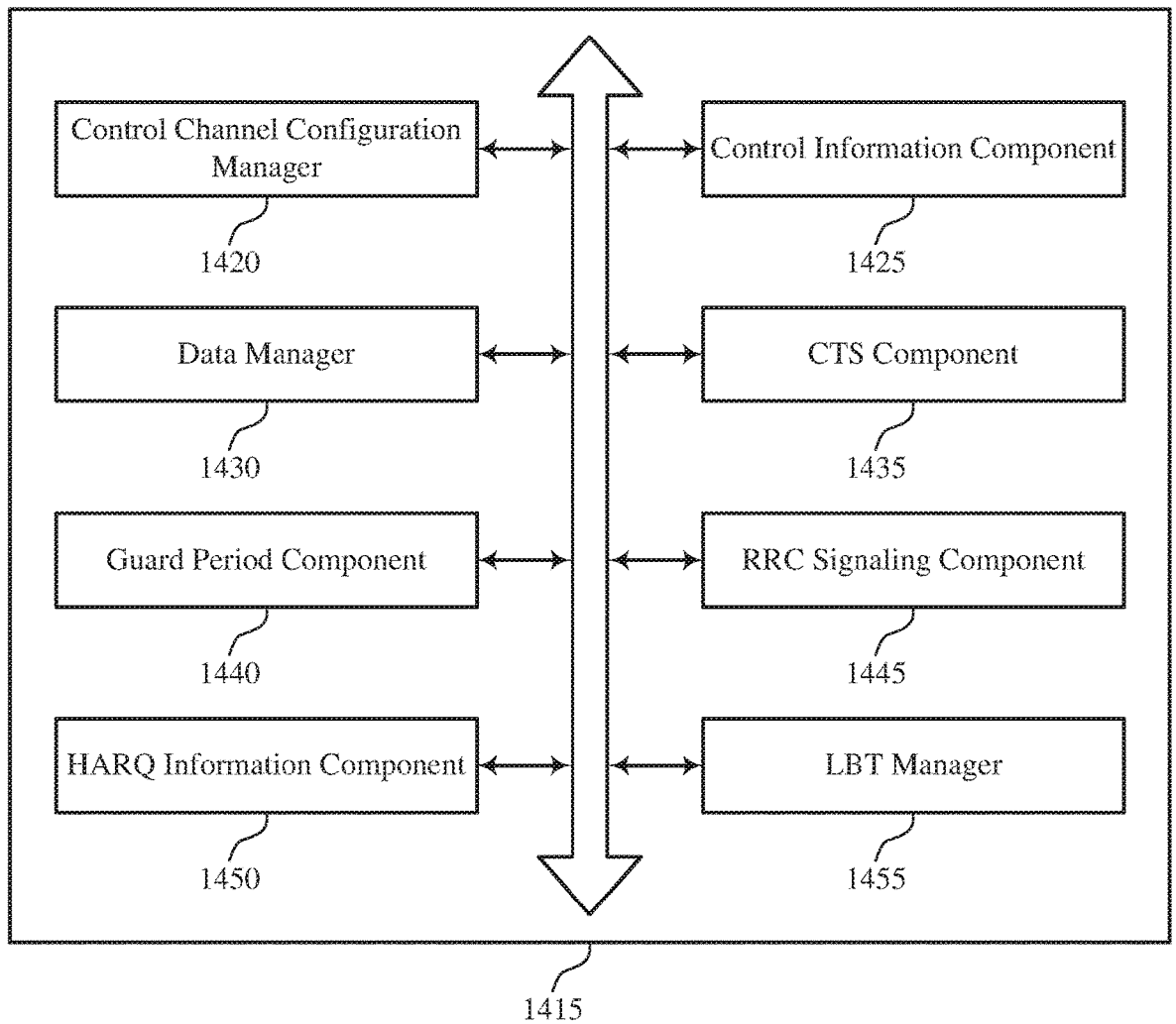

FIG. 14 shows a block diagram 1400 of a UE control channel manager 1415 that supports various control channel configurations for autonomous uplink in accordance with various aspects of the present disclosure. The UE control channel manager 1415 may be an example of aspects of a UE control channel manager 1215, a UE control channel manager 1315, or a UE control channel manager 1515 described with reference to FIGS. 12, 13, and 15. The UE control channel manager 1415 may include control channel configuration manager 1420, control information component 1425, data manager 1430, CTS component 1435, guard period component 1440, radio resource control (RRC) signaling component 1445, HARQ information component 1450, and listen-before-talk (LBT) manager 1455. Each of these modules may communicate, directly or indirectly, with one another (e.g., via one or more buses).

Control channel configuration manager 1420 may identify an autonomous uplink control channel configuration for unscheduled uplink transmissions in an unlicensed radio frequency spectrum band. In some cases, identifying the autonomous uplink control channel configuration may include identifying one or more modulation symbol periods of the initial TTI, where the control information is transmitted during one or more modulation symbol periods and control information is time division multiplexed with the data during the initial TTI of the TxOP. In some cases, identifying the autonomous uplink control channel configuration includes identifying a narrow bandwidth portion of the unlicensed radio frequency spectrum band, where the control information is transmitted in the narrow bandwidth portion and the control information is frequency division multiplexed with the data during the initial TTI of the TxOP. In some cases, the narrow bandwidth portion includes a frequency interlace of a carrier bandwidth.

In some cases, the autonomous uplink control channel configuration includes a payload and a waveform that correspond to an ePUCCH. Additionally or alternatively, the autonomous uplink control channel configuration includes a payload and a waveform that correspond to a sPUCCH. In some cases, the autonomous uplink control channel configuration includes fourteen modulation symbol periods, where the fourteen modulation symbol periods including four modulation symbol periods associated with a DMRS and ten modulation symbol periods associated with data transmissions. The autonomous uplink control channel configuration may, for example, include a payload and a waveform that correspond to a sPUCCH. In some examples, the autonomous uplink control channel configuration includes four modulation symbol periods, the four modulation symbol periods including two modulation symbol periods associated with a DMRS and two modulation symbol periods associated with data transmissions.

In some cases, the autonomous uplink control channel configuration includes two modulation symbol periods, the two modulation symbol periods including a first modulation symbol periods associated with a DMRS and a second modulation symbol associated with data transmissions. In some examples, the autonomous uplink control channel configuration includes four modulation symbol periods, the four modulation symbol periods including two modulation symbol periods associated with a DMRS and two modulation symbol periods associated with data transmissions. Additionally or alternatively, the autonomous uplink control channel configuration includes an initial modulation symbol period associated with a DMRS.

Control information component 1425 may transmit control information multiplexed with data according to the autonomous uplink control channel configuration in the unlicensed radio frequency spectrum band during an initial TTI of a TxOP. In some cases, the control information and the data in the initial TTI are transmitted in the narrow bandwidth portion of the unlicensed radio frequency spectrum band. In some cases, the narrow bandwidth portion includes a frequency interlace of a carrier bandwidth. In some cases, the control information and the data in the initial TTI are transmitted in a set of frequency interlaces of the unlicensed radio frequency spectrum band. In some cases, the control information and the data in the initial TTI are transmitted, and a CTS signal is received, in a set of interlaces of the unlicensed radio frequency spectrum band. In some cases, the control information includes at least one of a SR, an indication of a MCS, or HARQ information, or a combination thereof.

Data manager 1430 may transmit additional data in the unlicensed radio frequency spectrum band during one or more subsequent TTIs of the TxOP. In some cases, transmitting the additional data includes: transmitting the additional data during a subsequent modulation symbol period following the four modulation symbol periods. In some cases, transmitting the additional data includes transmitting the additional data during a subsequent modulation symbol period following the four modulation symbol periods within the set of frequency interlaces. In some examples, transmitting the additional data includes: transmitting the additional data during a subsequent modulation symbol period following the two modulation symbol periods within the set of frequency interlaces. Additionally or alternatively, transmitting the additional data includes: transmitting the additional data during a subsequent modulation symbol period following the guard period.

In some cases, the data in the initial TTI of the TxOP and the additional data in the one or more subsequent TTIs of the TxOP are transmitted with a same MCS. In some cases, the data in the initial TTIs of the TxOP is transmitted with a first MCS and the additional data in the one or more subsequent TTIs of the TxOP is transmitted with a second MCS that is different from the first MCS. Additionally or alternatively, the data transmitted in the initial TTI of the TxOP includes an indication of a MCS for the initial TTI and the additional data transmitted in the one or more subsequent TTIs of the TxOP include an indication of an MCS for each respective TTI of the TxOP.

CTS component 1435 may receive a CTS signal from a base station during a modulation symbol period of the initial TTI of the TxOP, where the CTS signal is responsive to the control information, Guard period component 1440 may identify a guard period between the modulation symbol period that includes the CTS signal and the data, where the guard period is time division multiplexed with the control information, the CTS signal, and the data. RRC signaling component 1445 may receive RRC signaling indicative of the autonomous uplink control channel configuration, where the autonomous uplink control channel configuration is identified based on the RRC signaling. In some cases, the RRC signaling includes an indication of at least one of a frequency domain allocation, a DMRS configuration, or an OCC sequence, or any combination thereof.

HARQ information component 1450 may identify a HARQ identifier, an indication of a RV, and a NDI associated with each TTI of the TxOP and may transmit an indication of the identified HARQ identifier, indication of the RV, and NDI for each TTI during the initial TTI of the TxOP. In some examples, HARQ information component 1450 may identify an NDI associated with each TTI of the TxOP, transmit an indication of the identified NDI associated with each TTI during the initial TTI of the TxOP, and transmit a HARQ identifier and an indication of a RV during the initial TTI of the TxOP.

LBT manager 1455 may perform a CCA procedure in the unlicensed radio frequency spectrum band during a preceding TTI before the TxOP and transmit a busy signal in the unlicensed radio frequency spectrum band upon completing the CCA procedure and for a remaining duration of the preceding TTI. In some cases, LBT manager 1455 may monitor the unlicensed radio frequency spectrum band for one or more modulation symbol periods of the initial TTI, where the control information is transmitted after the one or more modulation symbol periods of the initial TTI. In some examples, LBT manager 1455 may determine that no CRS is received from a serving base station during the one or more modulation symbol periods of the initial TTI, where the control information is transmitted based on the determination that no CRS is received.

Figure 15:
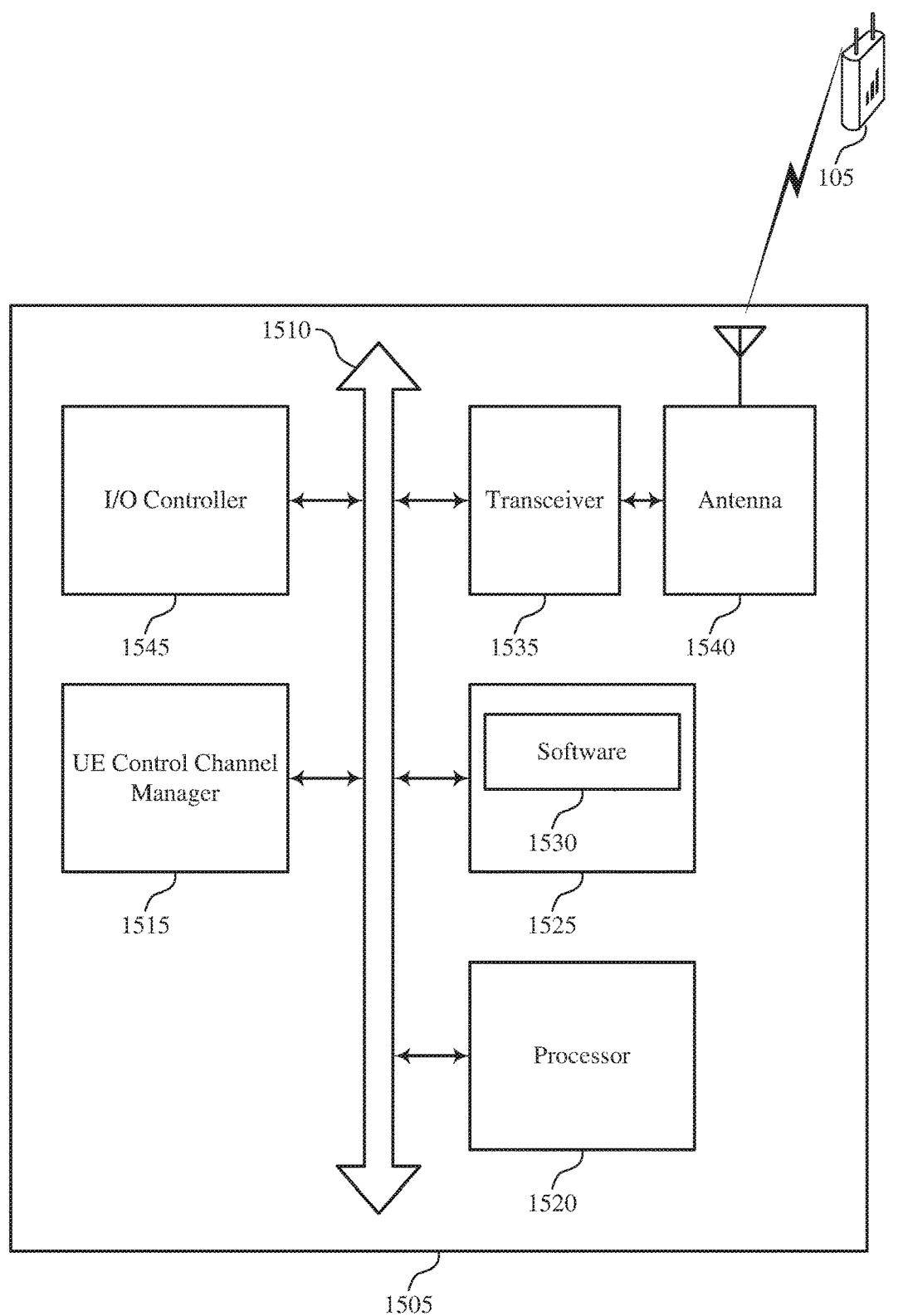
FIG. 15 illustrates a block diagram of a system, including a UE, that supports various control channel configurations for autonomous uplink in accordance with aspects of the present disclosure.

FIG. 15 shows a diagram of a system 1500 including a device 1505 that supports various control channel configurations for autonomous uplink in accordance with various aspects of the present disclosure. Device 1505 may be an example of or include the components of wireless device 1205, wireless device 1305, or a UE 115 as described above, e.g., with reference to FIGS. 1, 12 and 13. Device 1505 may include components for bi-directional voice and data communications including components for transmitting and receiving communications, including UE control channel manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting various control channel configurations for autonomous uplink).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware and/or software operation such as the interaction with peripheral components or devices.

Software 1530 may include code to implement aspects of the present disclosure, including code to support various control channel configurations for autonomous uplink. Software 1530 may be stored in a non-transitory computer-readable medium such as system memory or other memory. In some cases, the software 1530 may not be directly executable by the processor but may cause a computer (e.g, when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
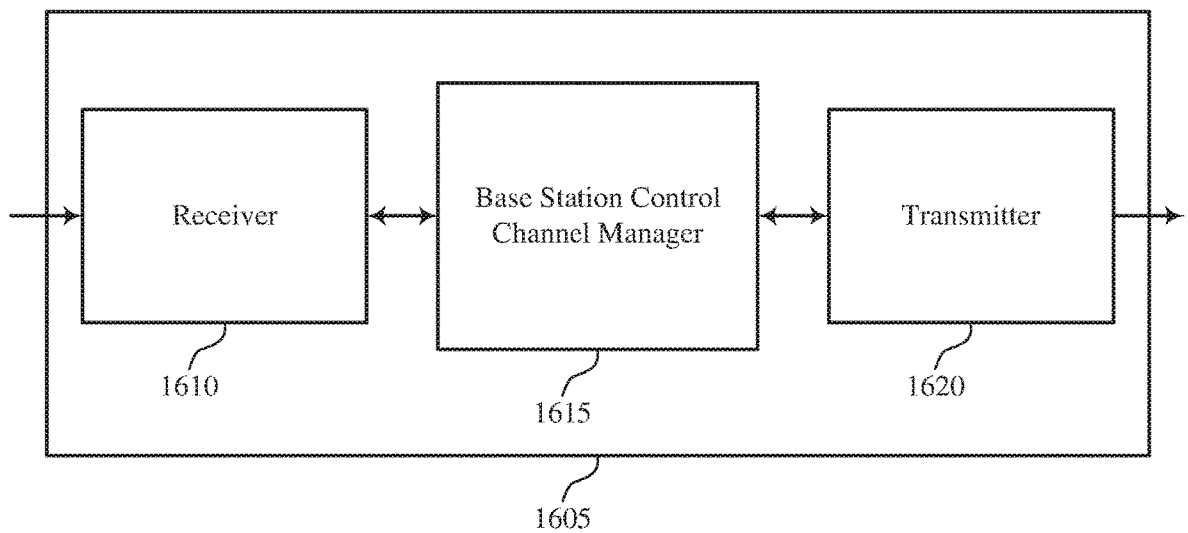
FIGS. 16 through 18 show block diagrams of a device or devices that support various control channel configurations for autonomous uplink in accordance with aspects of the present disclosure.

FIG. 16 shows a block diagram 1600 of a wireless device 1605 that supports various control channel configurations for autonomous uplink in accordance with various aspects of the present disclosure. Wireless device 1605 may be an example of aspects of a base station 105 as described with reference to FIG. 1. Wireless device 1605 may include receiver 1610, base station control channel manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to various control channel configurations for autonomous uplink, etc.). Information may be passed on to other components of the device. The receiver 1610 may be an example of aspects of the transceiver 1935 described with reference to FIG. 19.

Base station control channel manager 1615 may be an example of aspects of the base station control channel manager 1915 described with reference to FIG. 19. Base station control channel manager 1615 or at least some of its various sub-components may be implemented in hardware, software executed by a processor, firmware, or any combination thereof. If implemented in software executed by a processor, the functions of the base station control channel manager 1615 or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station control channel manager 1615 or at least some of its various sub-components may be physically located at various positions, including being distributed such that portions of functions are implemented at different physical locations by one or more physical devices.

In some examples, base station control channel manager 1615 or at least some of its various sub-components may be a separate and distinct component in accordance with various aspects of the present disclosure. In other examples, base station control channel manager 1615 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station control channel manager 1615 may identify: an autonomous uplink control channel configuration for unscheduled uplink transmissions in an unlicensed radio frequency spectrum band, receive control information multiplexed with data according to the autonomous uplink control channel configuration in the unlicensed radio frequency spectrum band during an initial TTI of a TxOP, and receive additional data in the unlicensed radio frequency spectrum band during one or more subsequent TTIs of the TxOP.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may include a single antenna, or it may include a set of antennas.

Figure 17:
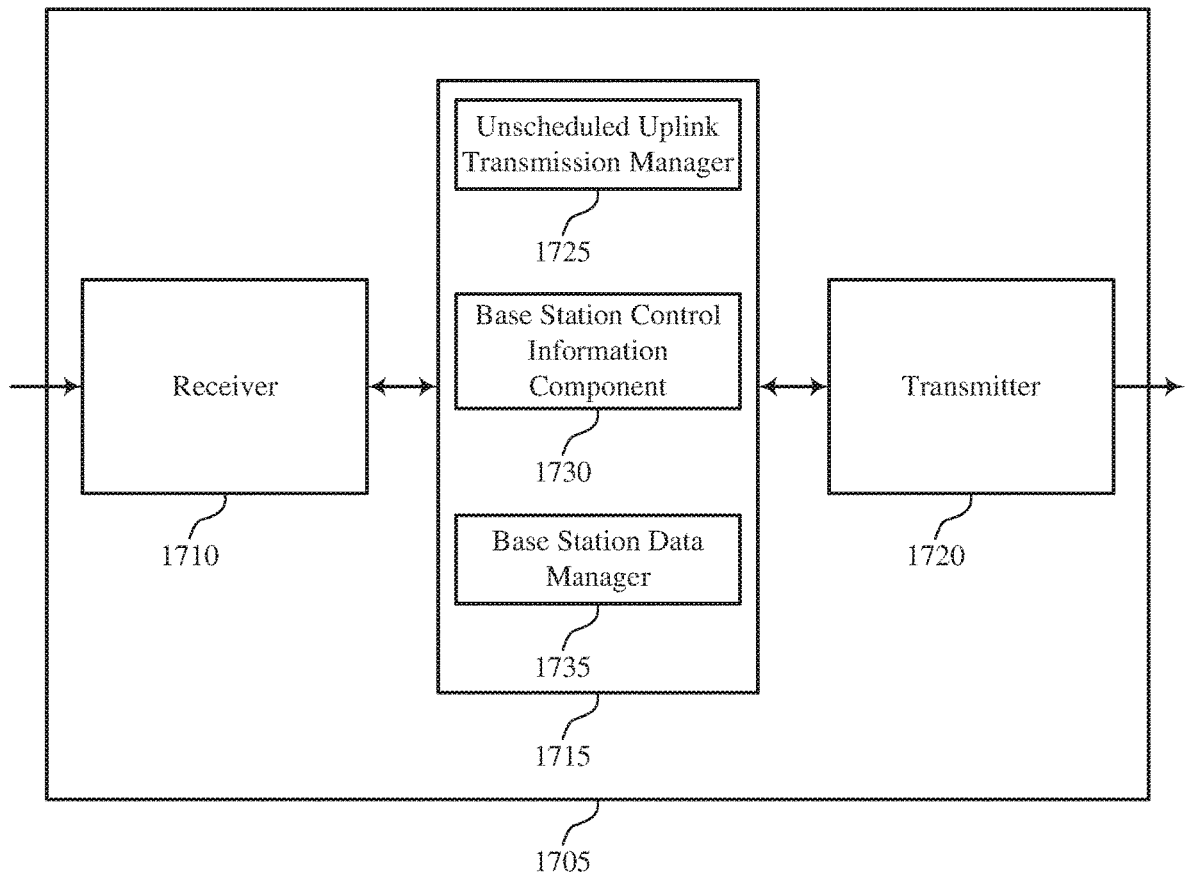

FIG. 17 shows a block diagram 1700 of a wireless device 1705 that supports various control channel configurations for autonomous uplink in accordance with various aspects of the present disclosure. Wireless device 1705 may be an example of aspects of a wireless device 1605 or a base station 105 as described with reference to FIGS. 1 and 16. Wireless device 1705 may include receiver 1710, base station control channel manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to various control channel configurations for autonomous uplink, etc.). Information may be passed on to other components of the device. The receiver 1710 may be an example of aspects of the transceiver 1935 described with reference to FIG. 19.

Base station control channel manager 1715 may be an example of aspects of the base station control channel manager 1915 described with reference to FIG. 19. Base station control channel manager 1715 may also include unscheduled uplink transmission manager 1725, base station control information component 1730, and base station data manager 1735.

Unscheduled uplink transmission manager 1725 may identify an autonomous uplink control channel configuration for unscheduled uplink transmissions in an unlicensed radio frequency spectrum band. In some cases, identifying the autonomous uplink control channel configuration includes identifying one or more modulation symbol periods of the initial TTI, where the control information is transmitted during the one or more modulation symbol periods and the control information is time division multiplexed with the data during the initial TTI of the TxOP.

In some cases, the autonomous uplink control channel configuration includes fourteen modulation symbol periods, the fourteen modulation symbol periods including four modulation symbol periods associated with a DMRS and ten modulation symbol periods associated with data transmissions. In some cases, the autonomous uplink control channel configuration includes a payload and a waveform that correspond to an ePUCCH. In some examples, the autonomous uplink control channel configuration includes four modulation symbol periods, the four modulation symbol periods including two modulation symbol periods associated with a DMRS and two modulation symbol periods associated with data transmissions.

In some cases, the autonomous uplink control channel configuration includes a payload and a waveform that correspond to a sPUCCH. In some cases, the autonomous uplink control channel configuration includes four modulation symbol periods, the four modulation symbol periods including two modulation symbol periods associated with a DMRS and two modulation symbol periods associated with data transmissions. In some cases, the autonomous uplink control channel configuration includes two modulation symbol periods, the two modulation symbol periods including a first modulation symbol periods associated with a DMRS and a second modulation symbol associated with data transmissions. In some cases, the autonomous uplink control channel configuration includes an initial modulation symbol period associated with a DMRS.

Base station control information component 1730 may receive control information multiplexed with data according to the autonomous uplink control channel configuration in the unlicensed radio frequency spectrum band during an initial of a TxOP. In some cases, the control information and the data in the initial TTI are received in a narrow bandwidth portion of the unlicensed radio frequency spectrum hand. In some cases, the narrow bandwidth portion includes a frequency interlace of a carrier bandwidth. In some cases, the control information and the data in the initial TTI are received in a set of frequency interlaces of the unlicensed radio frequency spectrum hand. In some cases, the control information includes at least one of an SR, an indication of a MCS, or HARQ information, or a combination thereof. In some cases, the control information is received in a narrow bandwidth portion of the unlicensed radio frequency spectrum band including a frequency interlace of a carrier bandwidth.

Base station data manager 1735 may determine that the additional data will be transmitted from the UE 115 based on the received SR and receive additional data in the unlicensed radio frequency spectrum band during one or more subsequent TTFs of the TxOP. In some cases, receiving the additional data includes: receiving the additional data during a subsequent modulation symbol period following the four modulation symbol periods. In some cases, receiving the additional data includes: receiving the additional data during a subsequent modulation symbol period following the four modulation symbol periods within the set of frequency interlaces. In some cases, receiving the additional data includes: receiving the additional data during a subsequent modulation symbol period following the guard period. In some examples, base station data manager 1735 may determine whether the additional data has been successfully received, and transmit a feedback message comprising an acknowledgment or negative acknowledgment message based at least in part on the determination. In some cases, the feedback message may be transmitted using a DCI format (e.g., DCI format 0A, 0B, 4A, 4B, etc.).

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may include a single antenna, or it may include a set of antennas.

Figure 18:
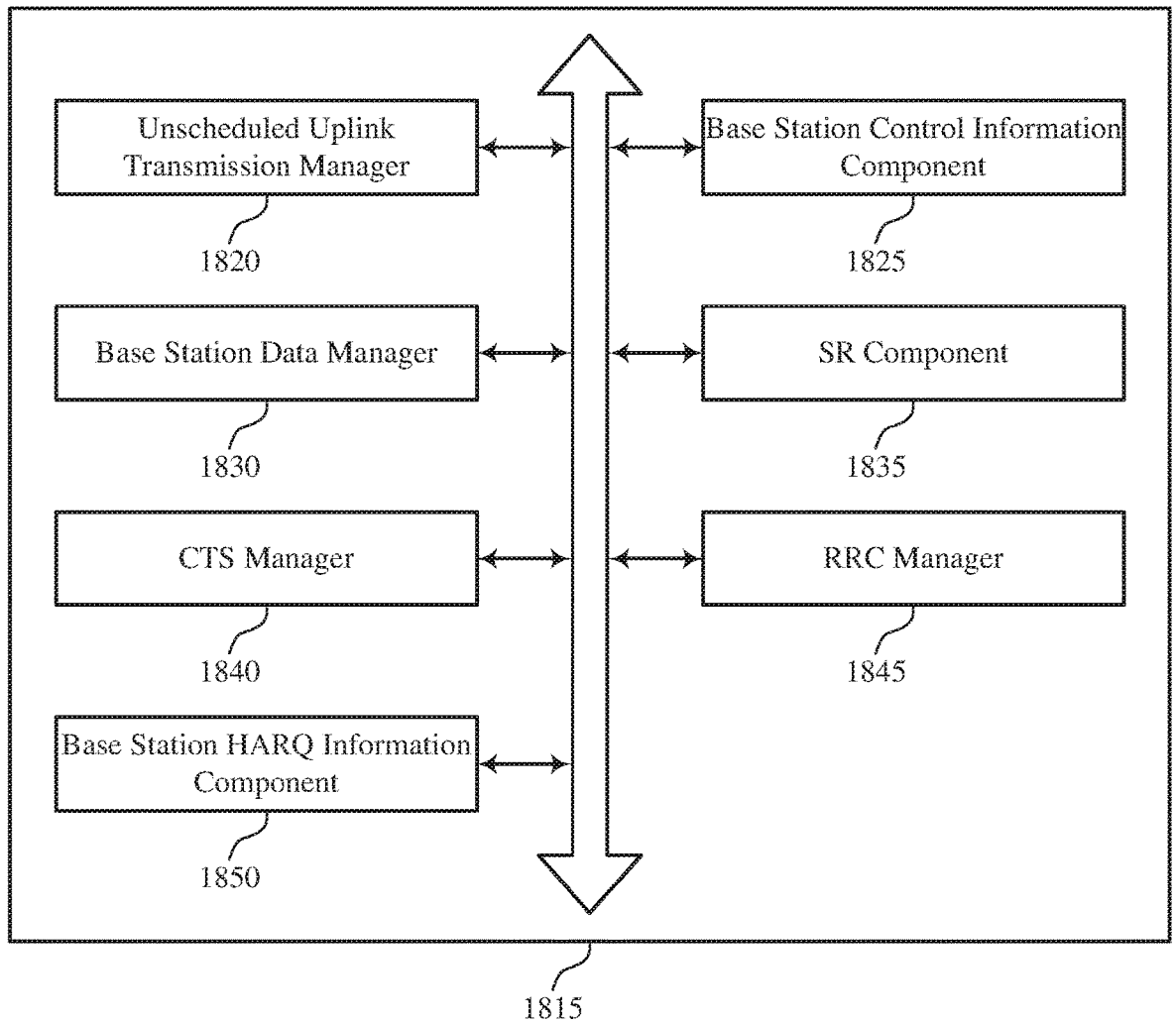

FIG. 18 shows a block diagram 1800 of a base station control channel manager 1815 that supports various control channel configurations for autonomous uplink in accordance with various aspects of the present disclosure. The base station control channel manager 1815 may be an example of aspects of a base station control channel manager 1915 described with reference to FIGS. 16, 17, and 19. The base station control channel manager 1815 may include unscheduled uplink transmission manager 1820, base station control information component 1825, base station data manager 1830, SR component 1835, CTS manager 1840, RRC manager 1845, and base station HARQ information component 1850. Each of these modules may communicate, directly or indirectly, with one another (e.g., via one or more buses).

Unscheduled uplink transmission manager 1820 may identify an autonomous uplink control channel configuration for unscheduled uplink transmissions in an unlicensed radio frequency spectrum band. In some cases, identifying the autonomous uplink control channel configuration may include identifying one or more modulation symbol periods of the initial TTI, where the control information is transmitted during the one or more modulation symbol periods and the control information is time division multiplexed with the data during the initial TTI of the TxOP. In some cases, the autonomous uplink control channel configuration includes a payload and a waveform that correspond to a sPUCCH. Additionally or alternatively, the autonomous uplink control channel configuration may include a payload and a waveform that correspond to an ePUCCH.

In some cases, the autonomous uplink control channel configuration includes four modulation symbol periods, the four modulation symbol periods including two modulation symbol periods associated with a DMRS and two modulation symbol periods associated with data transmissions. The autonomous uplink control channel configuration may, in some examples, include four modulation symbol periods, the four modulation symbol periods including two modulation symbol periods associated with a demodulation reference signal DMRS and two modulation symbol periods associated with data transmissions. In some cases, the autonomous uplink control channel configuration includes two modulation symbol periods, the two modulation symbol periods including a first modulation symbol periods associated with a DMRS and a second modulation symbol associated with data transmissions. In some examples, the autonomous uplink control channel configuration includes an initial modulation symbol period associated with a DMRS. In some cases, the autonomous uplink control channel configuration includes fourteen modulation symbol periods, the fourteen modulation symbol periods including four modulation symbol periods associated with a DMRS and ten modulation symbol periods associated with data transmissions.

Base station control information component 1825 may receive control information multiplexed with data according to the autonomous uplink control channel configuration in the unlicensed radio frequency spectrum band during an initial TTI of a TxOP. In some cases, the control information and the data in the initial TTI are received in a narrow bandwidth portion of the unlicensed radio frequency spectrum band, and the narrow bandwidth portion may include a frequency interlace of a carrier bandwidth. In some cases, the control information and the data in the initial TTI are received in a set of frequency interlaces of the unlicensed radio frequency spectrum band. In some cases, the control information includes at least one of an SR, an indication of a MCS, or HARQ information, or a combination thereof. In some cases, the control information is received in a narrow bandwidth portion of the unlicensed radio frequency spectrum band including a frequency interlace of a carrier bandwidth.

Base station data manager 1830 may determine that the additional data will be transmitted from the UE based on the received SR and receive additional data in the unlicensed radio frequency spectrum band during one or more subsequent TTIs of the TxOP. In some cases, receiving the additional data includes receiving the additional data during a subsequent modulation symbol period following the four modulation symbol periods. In some cases, receiving the additional data includes receiving the additional data during a subsequent modulation symbol period following the four modulation symbol periods within the set of frequency interlaces. Additionally or alternatively, receiving the additional data includes receiving the additional data during a subsequent modulation symbol period following the guard period. In some cases, receiving the additional data includes: receiving the additional data during a subsequent modulation symbol period following the two modulation symbol periods within the set of frequency interlaces. In some examples, base station data manager 1830 may determine whether the additional data has been successfully received, and transmit a feedback message comprising an acknowledgment or negative acknowledgment message based at least in part on the determination. In some cases, the feedback message may be transmitted using a DCI format (e.g., DCI format 0A, 0B, 4A, 4B, etc.). SR component 1835 may receive, within the control information, a SR associated with a UE 115.

CTS manager 1840 may transmit a CTS signal to a UE 115 during a modulation symbol period of the initial TTI of the TxOP, where the CTS signal is responsive to the control information and identify a guard period between the modulation symbol period that includes the CTS signal and the data, where the guard period is time division multiplexed with the control information, the CTS signal, and the data. In some cases, the control information and the data in the initial TTI are received and the CTS signal is transmitted in a set of interlaces of the unlicensed radio frequency spectrum band.

RRC manager 1845 may transmit RRC signaling indicative of the autonomous uplink control channel configuration, where the autonomous uplink control channel configuration is identified based on the RRC signaling. In some cases, the RRC signaling includes an indication of at least one of a frequency domain allocation, a DMRS configuration, or an OCC sequence, or any combination thereof.

Base station HARQ information component 1850 may receive, during the initial TTI of the TxOP, an indication of a HARQ identifier, an indication of a RV, and a NDI associated with each TTI of the TxOP, receive, during the initial TTI of the TxOP, an indication of a NDI associated with each TTI of the TxOP, receive a HARQ identifier and an indication of a RV during the initial TTI of the TxOP, and determine a HARQ identifier and an indication of an RV associated with each of the one or more subsequent TTIs of the TxOP, wherein determining the HARQ identifier and the indication of the RV is based at least in part on a sequential computation associated with the HARQ identifier and the indication of the RV received during the initial TTI of the TxOP.

Figure 19:
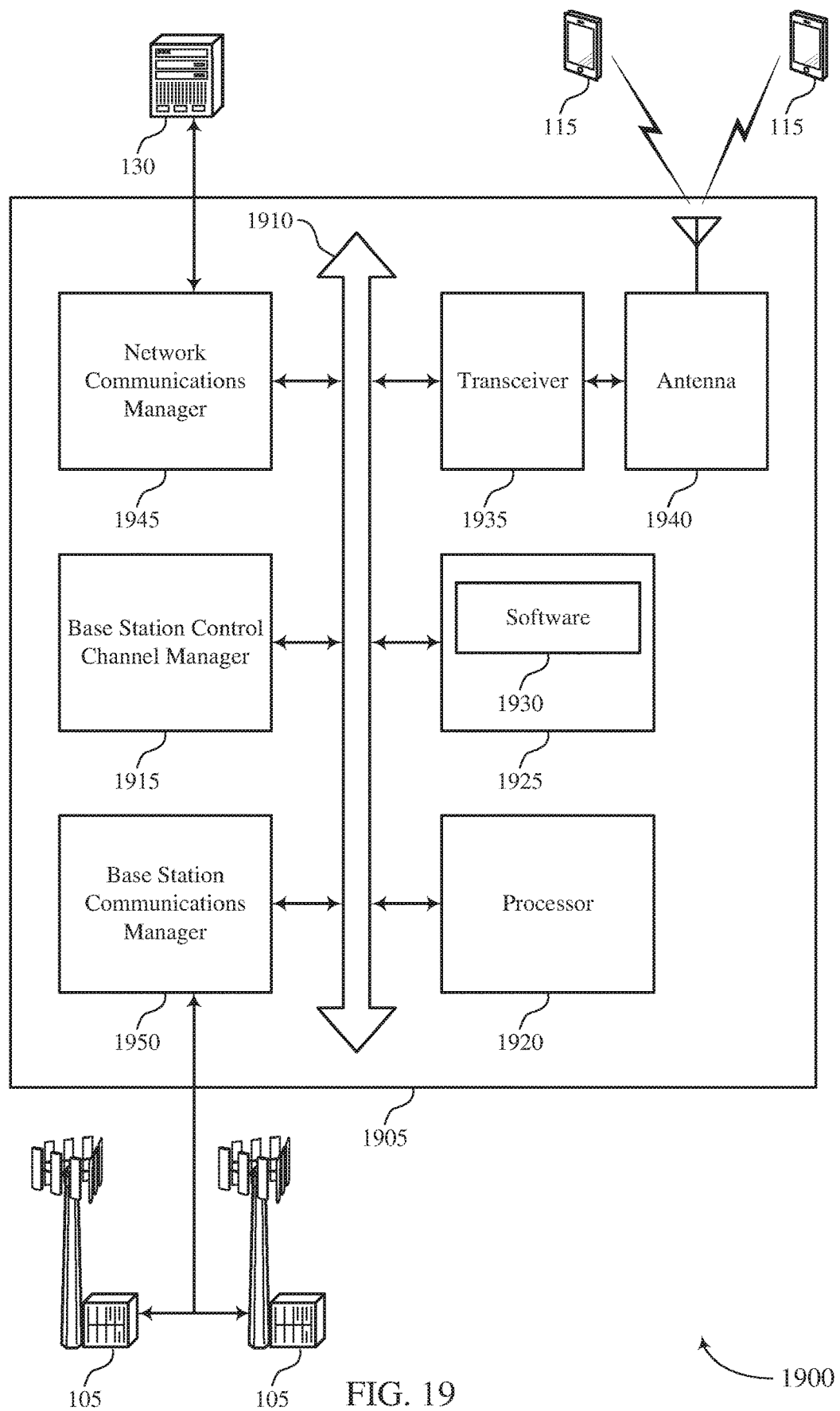
FIG. 19 illustrates a block diagram of a system, including a base station, that supports various control channel configurations for autonomous uplink in accordance with aspects of the present disclosure.

FIG. 19 shows a diagram of a system 1900 including a device 1905 that supports various control channel configurations for autonomous uplink in accordance with various aspects of the present disclosure. Device 1905 may be an example of or include the components of base station 105 as described above, e.g., with reference to FIG. 1. Device 1905 may include components for bi-directional voice and data communications including components for transmitting and receiving communications, including base station control channel manager 1915, processor 1920, memory 1925, software 1930, transceiver 1935, antenna 1940, network communications manager 1945, and base station communications manager 1950. These components may be in electronic communication via one or more busses (e.g., bus 1910). Device 1905 may communicate wirelessly with one or more UEs 115.

Processor 1920 may include an intelligent hardware device, (e.g, a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g, functions or tasks supporting various control channel configurations for autonomous uplink).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware and/or software operation such as the interaction with peripheral components or devices.

Software 1930 may include code to implement aspects of the present disclosure, including code to support various control channel configurations for autonomous uplink, Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions. Network communications manager 1945 may manage communications with the core network (e.g., via one or more wired backhaul links). For example, the network communications manager 1945 may manage the transfer of data communications for client devices, such as one or more UEs 115.

Base station communications manager 1950 may manage communications with other base station 105, and may include a controller or scheduler for controlling communications with UEs 115 in cooperation with other base stations 105. For example, the base station communications manager 1950 may coordinate scheduling for transmissions to UEs 115 for various interference mitigation techniques such as beamforming or joint transmission. In some examples, base station communications manager 1950 may provide an X2 interface within an Long Term Evolution (LTE)/LTE-A wireless communication network technology to provide communication between base stations 105.

Figure 20:
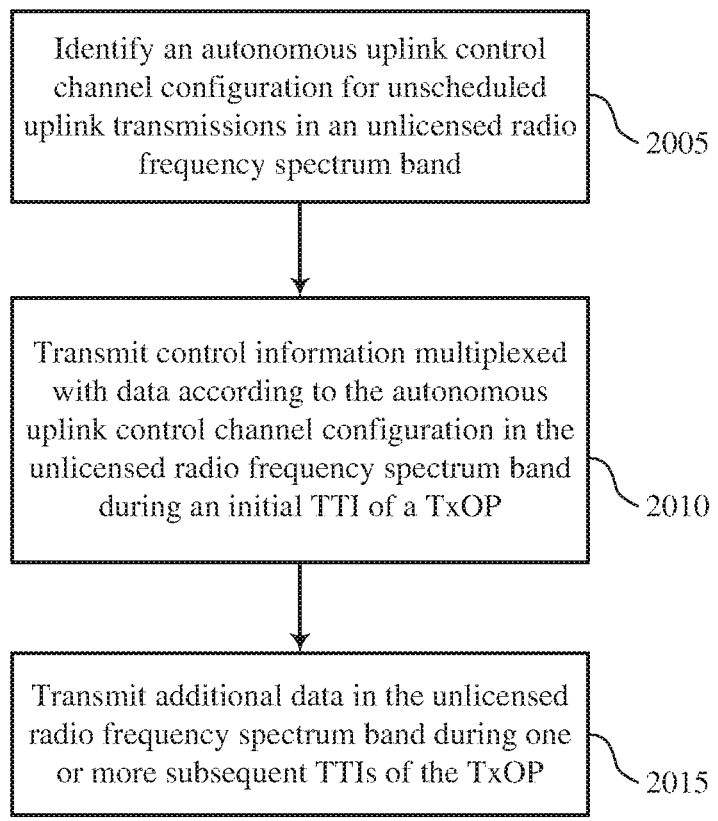
FIGS. 20 through 27 illustrate methods for communication using various control channel configurations for autonomous uplink in accordance with aspects of the present disclosure.

FIG. 20 shows a flowchart illustrating a method 2000 for communications using various control channel configurations for autonomous uplink in accordance with various aspects of the present disclosure. The operations of method 2000 may be implemented by a UE 115 or its components as described herein. For example, the operations of method 2000 may be performed by a UE control channel manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may identify an autonomous uplink control channel configuration for unscheduled uplink transmissions in an unlicensed radio frequency spectrum band. The operations of block 2005 may be performed according to the methods described with reference to FIGS. 1 through 11. In certain examples, aspects of the operations of block 2005 may be performed by a control channel configuration manager as described with reference to FIGS. 12 through 15.

At block 2010 the UE 115 may transmit control information multiplexed with data according to the autonomous uplink control channel configuration in the unlicensed radio frequency spectrum band during an initial TTI of a TxOP. The operations of block 2010 may be performed according to the methods described with reference to FIGS. 1 through 11. In certain examples, aspects of the operations of block 2010 may be performed by a control information component as described with reference to FIGS. 12 through 15.

At block 2015 the UE 115 may transmit additional data in the unlicensed radio frequency spectrum band during one or more subsequent TTIs of the TxOP. The operations of block 2015 may be performed according to the methods described with reference to FIGS. 1 through 11. In certain examples, aspects of the operations of block 2015 may be performed by a data manager as described with reference to FIGS. 12 through 15.

Figure 21:
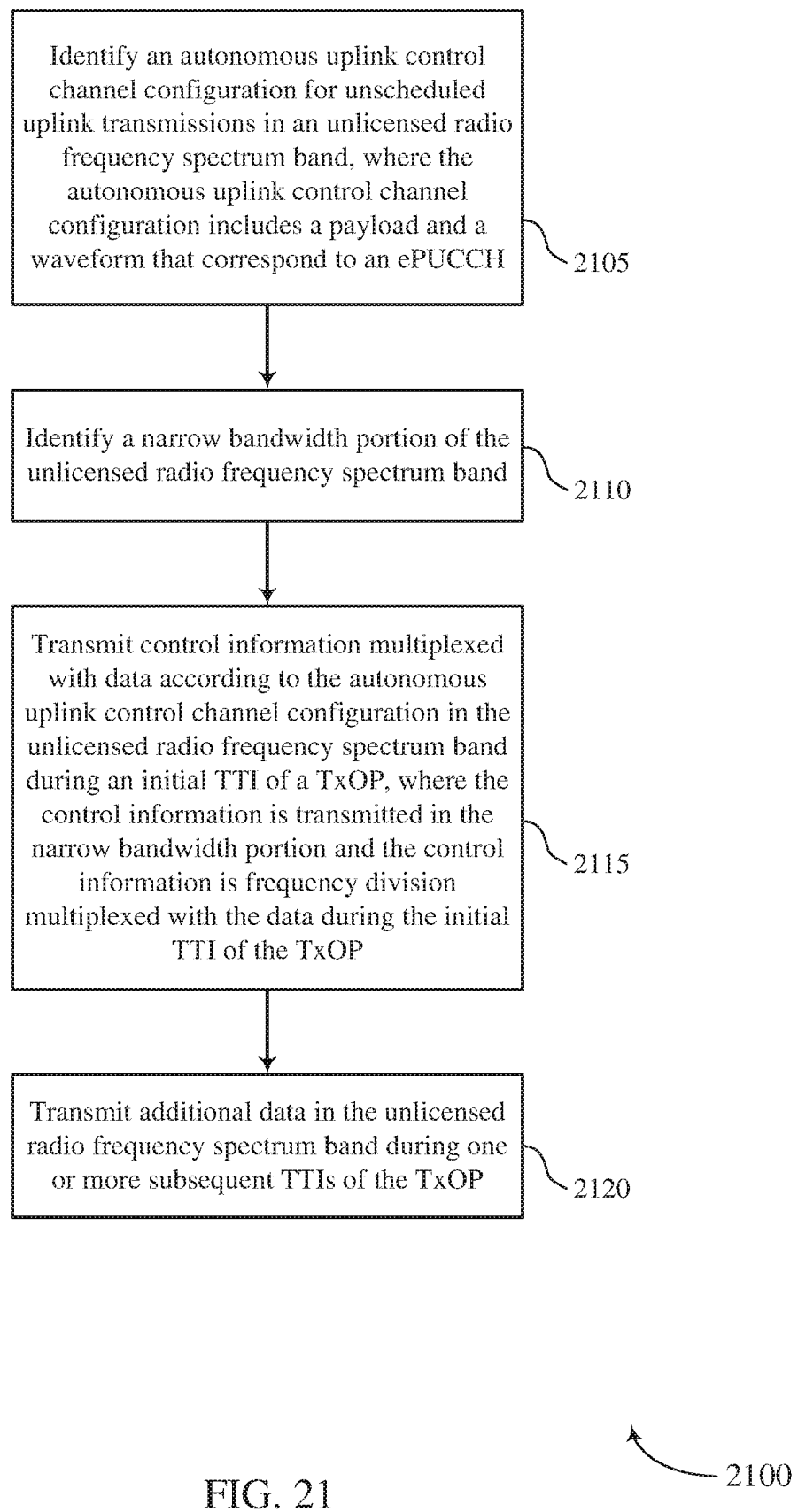

FIG. 21 shows a flowchart illustrating a method 2100 for communications using various control channel configurations for autonomous uplink in accordance with various aspects of the present disclosure. The operations of method 2100 may be implemented by a UE 115 or its components as described herein. For example, the operations of method 2100 may be performed by a UE control channel manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may identify an autonomous uplink control channel configuration for unscheduled uplink transmissions in an unlicensed radio frequency spectrum band, where the autonomous uplink control channel configuration may include, for example, a payload and a waveform that correspond to an ePUCCH. The operations of block 2105 may be performed according to the methods described with reference to FIGS. 1 through 11. In certain examples, aspects of the operations of block 2105 may be performed by a control channel configuration manager as described with reference to FIGS. 12 through 15.

At block 2110 the UE 115 may identify a narrow bandwidth portion of the unlicensed radio frequency spectrum band. The operations of block 2110 may be performed according to the methods described with reference to FIGS. 1 through 11. In certain examples, aspects of the operations of block 2110 may be performed by a control channel configuration manager as described with reference to FIGS. 12 through 15.

At block 2115 the UE 115 may transmit control information multiplexed with data according to the autonomous uplink control channel configuration in the unlicensed radio frequency spectrum band during an initial TTI of a TxOP, where the control information may be transmitted in the narrow bandwidth portion and frequency division multiplexed with the data during the initial TTI of the TxOP. The operations of block 2115 may be performed according to the methods described with reference to FIGS. 1 through 11. In certain examples, aspects of the operations of block 2115 may be performed by a control information component as described with reference to FIGS. 12 through 15.

At block 2115 the UE 115 may transmit additional data in the unlicensed radio frequency spectrum band during one or more subsequent Ills of the TxOP. The operations of block 2115 may be performed according to the methods described with reference to FIGS. 1 through 11. In certain examples, aspects of the operations of block 2115 may be performed by a data manager as described with reference to FIGS. 12 through 15.

In some cases, identifying the autonomous uplink control channel configuration comprises: identifying a narrow bandwidth portion of the unlicensed radio frequency spectrum band, wherein the control information is transmitted in the narrow bandwidth portion and the control information is frequency division multiplexed with the data during the initial TTI of the TxOP.

Figure 22:
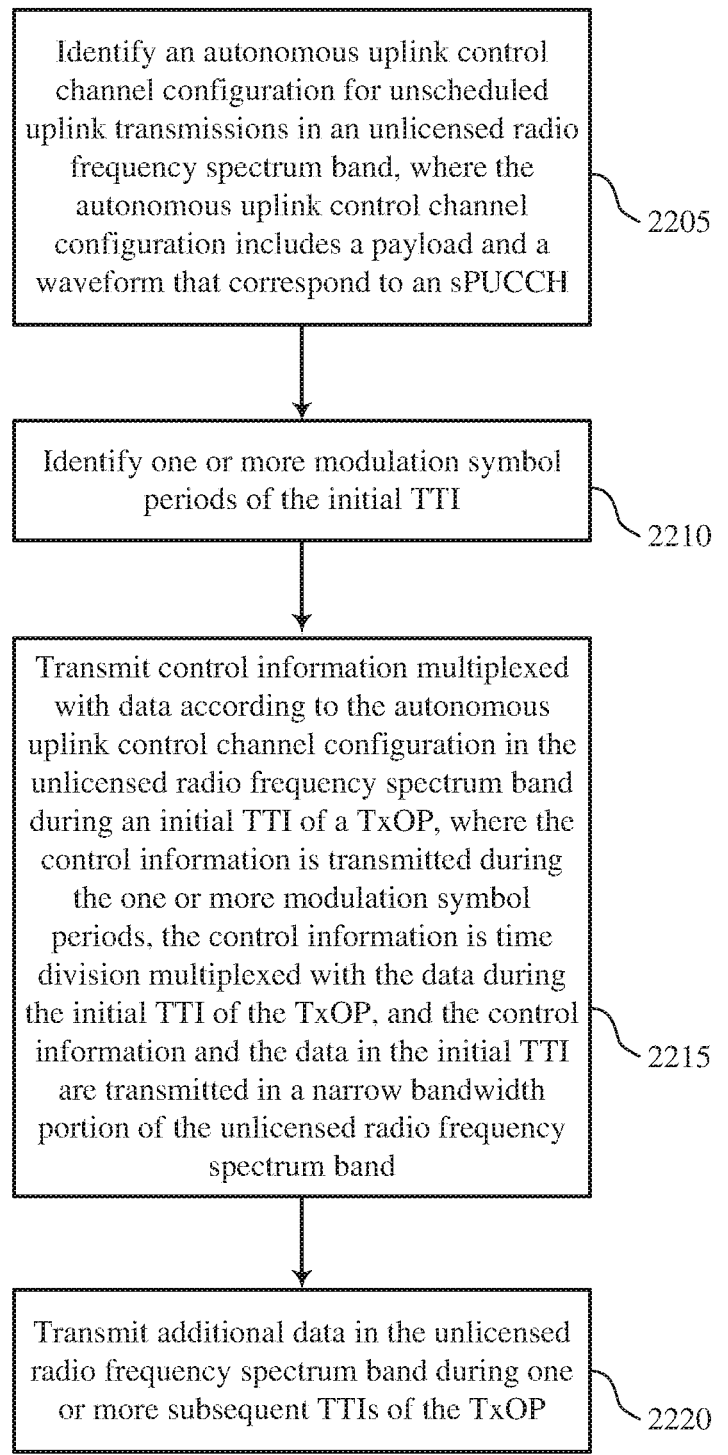

FIG. 22 shows a flowchart illustrating a method 2200 for communications using various control channel configurations for autonomous uplink in accordance with various aspects of the present disclosure. The operations of method 2200 may be implemented by a UE 115 or its components as described herein. For example, the operations of method 2200 may be performed by a UE control channel manager as described with reference to FIGS. 12 through 15, in some examples, a UE 115 may execute a set of codes to control the functional elements of the device to perform the functions described below. Additionally or alternatively, the UE 115 may perform aspects of the functions described below using special-purpose hardware.

At block 2205 the UE 115 may identify an autonomous uplink control channel configuration for unscheduled uplink transmissions in an unlicensed radio frequency spectrum hand, where the autonomous uplink control channel configuration may include, for example, a payload and a waveform that correspond to an sPUCCH. The operations of block 2205 may be performed according to the methods described with reference to FIGS. 1 through 11. In certain examples, aspects of the operations of block 2205 may be performed by a control channel configuration manager as described with reference to FIGS. 12 through 15.

At block 2210 the UE 115 may identify one or more modulation symbol periods of the initial TTI. The operations of block 2210 may be performed according to the methods described with reference to FIGS. 1 through 11. In certain examples, aspects of the operations of block 2210 may be performed by a control channel configuration manager as described with reference to FIGS. 12 through 15.

At block 2215 the UE 115 may transmit control information multiplexed with data according to the autonomous uplink control channel configuration in the unlicensed radio frequency spectrum hand during an initial TTI of a TxOP. In some examples, the control information is transmitted during the one or more modulation symbol periods and may be time division multiplexed with the data during the initial TTI of the TxOP. In some cases, the control information and the data in the initial TTI are transmitted in a narrow bandwidth portion of the unlicensed radio frequency spectrum band. The operations of block 2215 may be performed according to the methods described with reference to FIGS. 1 through 11. In certain examples, aspects of the operations of block 2215 may be performed by a control information component as described with reference to FIGS. 12 through 15.

At block 2220 the UE 115 may transmit additional data in the unlicensed radio frequency spectrum band during one or more subsequent TTIs of the TxOP. The operations of block 2220 may be performed according to the methods described with reference to FIGS. 1 through 11. In certain examples, aspects of the operations of block 2220 may be performed by a data manager as described with reference to FIGS. 12 through 15.

Figure 23:
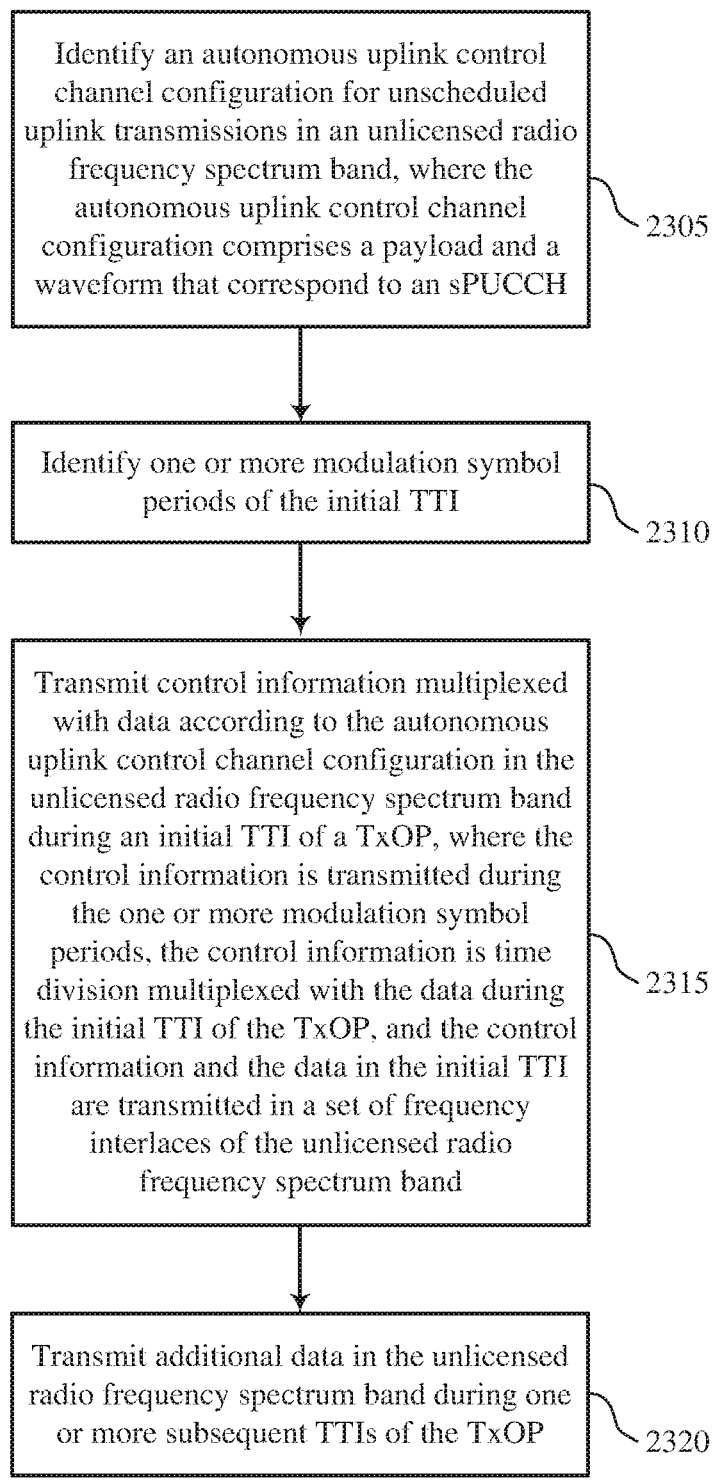

FIG. 23 shows a flowchart illustrating a method 2300 for communications using various control channel configurations for autonomous uplink in accordance with various aspects of the present disclosure. The operations of method 2300 may be implemented by a UE 115 or its components as described herein. For example, the operations of method 2300 may be performed by a UE control channel manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may identify an autonomous uplink control channel configuration for unscheduled uplink transmissions in an unlicensed radio frequency spectrum band, where the autonomous uplink control channel configuration may include, for example, a payload and a waveform that correspond to an sPUCCH. The operations of block 2305 may be performed according to the methods described with reference to FIGS. 1 through 11. In certain examples, aspects of the operations of block 2305 may be performed by a control channel configuration manager as described with reference to FIGS. 12 through 15.

At block 2310 the UE 115 may identify one or more modulation symbol periods of the initial TTI. The operations of block 2310 may be performed according to the methods described with reference to FIGS. 1 through 11. In certain examples, aspects of the operations of block 2310 may be performed by a control channel configuration manager as described with reference to FIGS. 12 through 15.

At block 2315 the UE 115 may transmit control information multiplexed with data according to the autonomous uplink control channel configuration in the unlicensed radio frequency spectrum band during an initial TTI of a TxOP, where the control information is transmitted during the one or more modulation symbol periods. In some cases, the control information may be time division multiplexed with the data during the initial TTI of the TxOP, and the control information and the data in the initial TTI may be transmitted in a set of frequency interlaces of the unlicensed radio frequency spectrum band. The operations of block 2315 may be performed according to the methods described with reference to FIGS. 1 through 11. In certain examples, aspects of the operations of block 2315 may be performed by a control information component as described with reference to FIGS. 12 through 15.

At block 2320 the UE 115 may transmit additional data in the unlicensed radio frequency spectrum band during one or more subsequent TTIs of the TxOP. The operations of block 2320 may be performed according to the methods described with reference to FIGS. 1 through 11. In certain examples, aspects of the operations of block 2320 may be performed by a data manager as described with reference to FIGS. 12 through 15.

Figure 24:
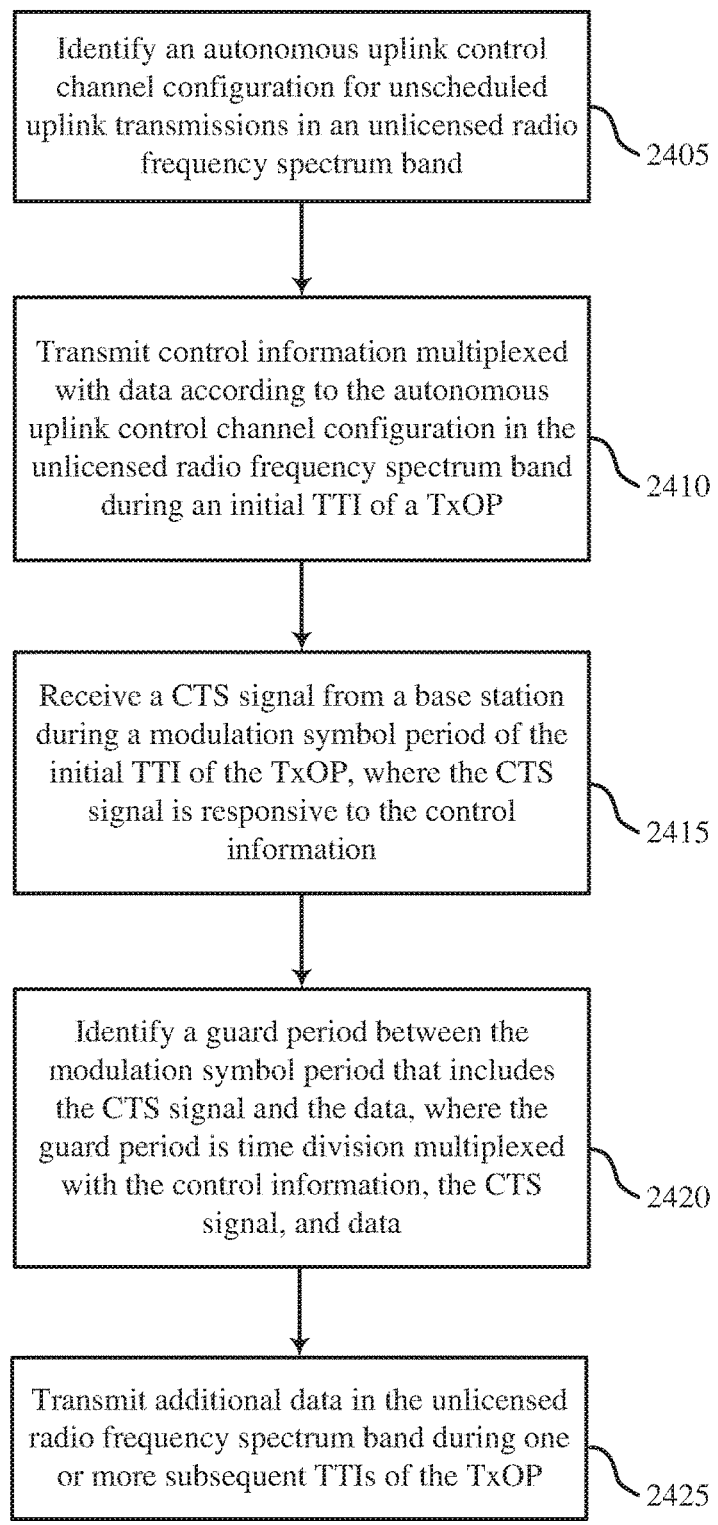
Figure 25:
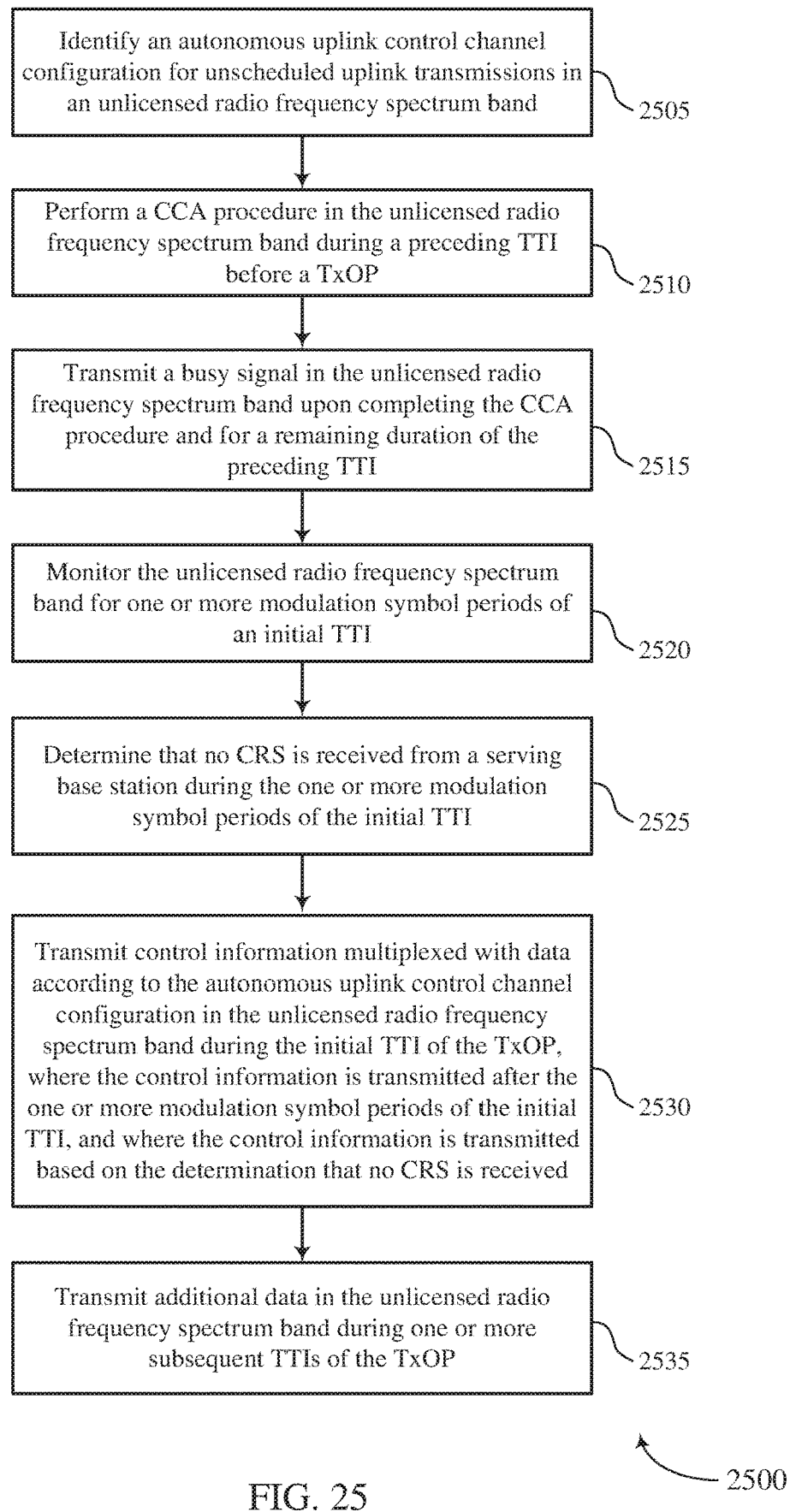

FIG. 24 shows a flowchart illustrating a method 2400 for communications using various control channel configurations for autonomous uplink in accordance with various aspects of the present disclosure. The operations of method 2400 may be implemented by a UE 115 or its components as described herein. For example, the operations of method 2400 may be performed by a UE control channel manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2405 the UE 115 may identify an autonomous uplink control channel configuration for unscheduled uplink transmissions in an unlicensed radio frequency spectrum band. The operations of block 2405 may be performed according to the methods described with reference to FIGS. 1 through 11. In certain examples, aspects of the operations of block 2405 may be performed by a control channel configuration manager as described with reference to FIGS. 12 through 15.

At block 2410 the UE 115 may transmit control information multiplexed with data according to the autonomous uplink control channel configuration in the unlicensed radio frequency spectrum band during an initial TTI of a TxOP. The operations of block 2410 may be performed according to the methods described with reference to FIGS. 1 through 11. In certain examples, aspects of the operations of block 2410 may be performed by a control information component as described with reference to FIGS. 12 through 15.

At block 2415 the UE 115 may receive a CTS signal from a base station during a modulation symbol period of the initial TTI of the TxOP, wherein the CTS signal is responsive to the control information. The operations of block 2415 may be performed according to the methods described with reference to FIGS. 1 through 11. In certain examples, aspects of the operations of block 2415 may be performed by a CTS component as described with reference to FIGS. 12 through 15.

At block 2420 the UE 115 may identify a guard period between the modulation symbol period that includes the CTS signal and the data, wherein the guard period is time division multiplexed with the control information, the CTS signal, and the data. The operations of block 2420 may be performed according to the methods described with reference to FIGS. 1 through 11. In certain examples, aspects of the operations of block 2420 may be performed by a guard period component as described with reference to FIGS. 12 through 15.

At block 2425 the UE 115 may transmit additional data in the unlicensed radio frequency spectrum band during one or more subsequent TTIs of the TxOP. The operations of block 2425 may be performed according to the methods described with reference to FIGS. 1 through 11. In certain examples, aspects of the operations of block 2425 may be performed by a data manager as described with reference to FIGS. 12 through 15, FIG. 25 shows a flowchart illustrating a method 2500 for communications using various control channel configurations for autonomous uplink in accordance with various aspects of the present disclosure. The operations of method 2500 may be implemented by a UE 115 or its components as described herein. For example, the operations of method 2500 may be performed by a UE control channel manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2505 the UE 115 may identify an autonomous uplink control channel configuration for unscheduled uplink transmissions in an unlicensed radio frequency spectrum band. The operations of block 2505 may be performed according to the methods described with reference to FIGS. 1 through 11. In certain examples, aspects of the operations of block 2505 may be performed by a control channel configuration manager as described with reference to FIGS. 12 through 15.

At block 2510 the UE 115 may perform a CCA procedure in the unlicensed radio frequency spectrum band during a preceding TTI before a TxOP. The operations of block 2510 may be performed according to the methods described with reference to FIGS. 1 through 11, In certain examples, aspects of the operations of block 2510 may be performed by a LBT manager as described with reference to FIGS. 12 through 15.

At block 2515 the UE 115 may transmit a busy signal in the unlicensed radio frequency spectrum band upon completing the CCA procedure and for a remaining duration of the preceding TTI. The operations of block 2515 may be performed according to the methods described with reference to FIGS. 1 through 11. In certain examples, aspects of the operations of block 2515 may be performed by a LBT manager as described with reference to FIGS. 12 through 15.

At block 2520 the UE 115 may monitor the unlicensed radio frequency spectrum band for one or more modulation symbol periods of an initial TTI. The operations of block 2520 may be performed according to the methods described with reference to FIGS. 1 through 11. In certain examples, aspects of the operations of block 2520 may be performed by a LBT manager as described with reference to FIGS. 12 through 15.

At block 2525 the UE 115 may determine that no CRS is received from a serving base station during the one or more modulation symbol periods of the initial TTI. The operations of block 2525 may be performed according to the methods described with reference to FIGS. 1 through 11. In certain examples, aspects of the operations of block 2525 may be performed by a LBT manager as described with reference to FIGS. 12 through 15.

At block 2530 the UE 115 may transmit control information multiplexed with data according to the autonomous uplink control channel configuration in the unlicensed radio frequency spectrum band during the initial TTI of the TxOP, where the control information is transmitted after the one or more modulation symbol periods of the initial TTI, and where the control information is transmitted based on the determination that no CRS is received. The operations of block 2530 may be performed according to the methods described with reference to FIGS. 1 through 11. In certain examples, aspects of the operations of block 2530 may be performed by a control information component as described with reference to FIGS. 12 through 15.

At block 2535 the UE 115 may transmit additional data in the unlicensed radio frequency spectrum band during one or more subsequent TTIs of the TxOP. The operations of block 2535 may be performed according to the methods described with reference to FIGS. 1 through 11. In certain examples, aspects of the operations of block 2535 may be performed by a data manager as described with reference to FIGS. 12 through 15.

Figure 26:
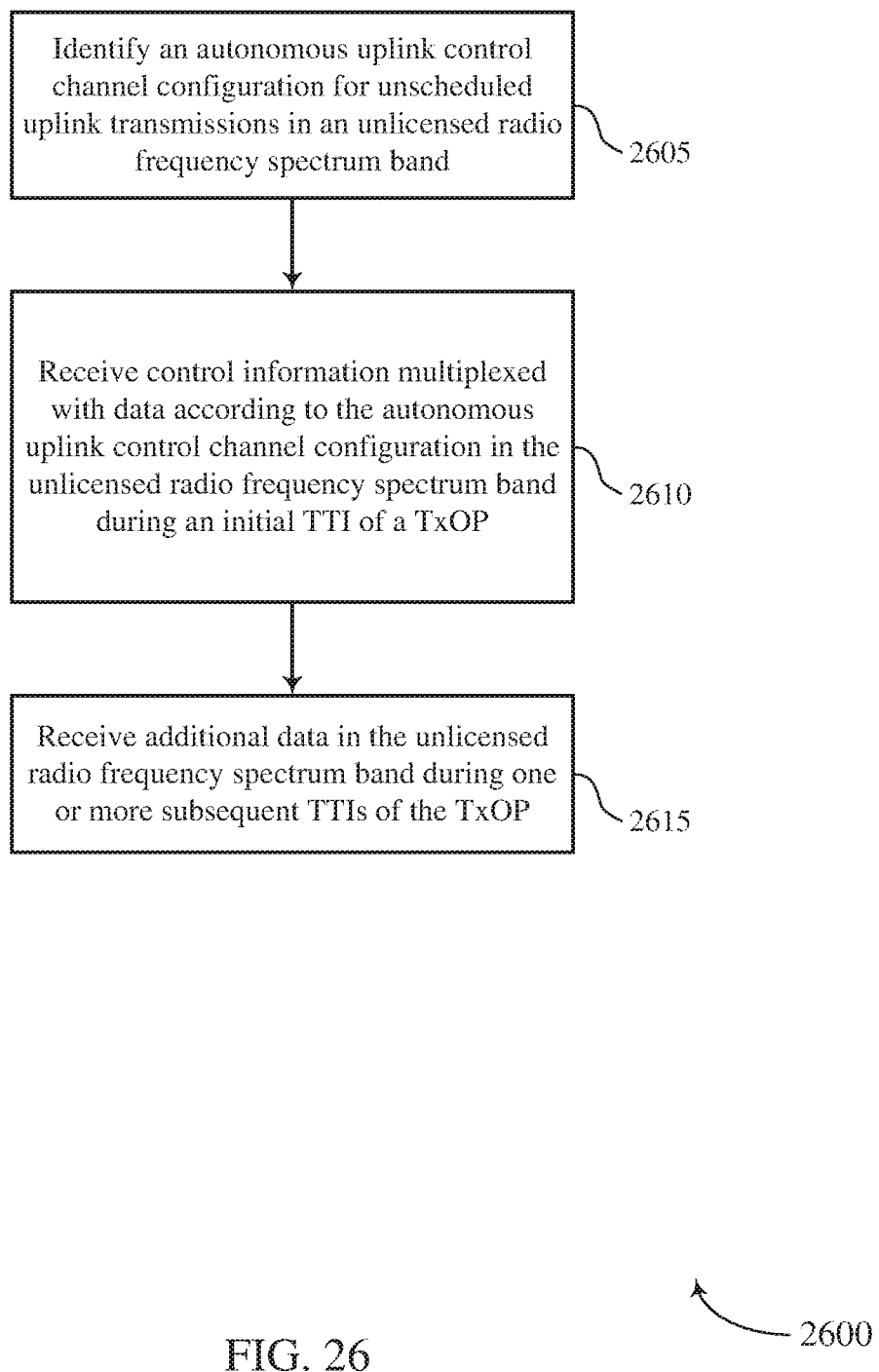

FIG. 26 shows a flowchart illustrating a method 2600 for communications using various control channel configurations for autonomous uplink in accordance with various aspects of the present disclosure. The operations of method 2600 may be implemented by a base station 105 or its components as described herein. For example, the operations of method 2600 may be performed by a base station control channel manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2605 the base station 105 may identify an autonomous uplink control channel configuration for unscheduled uplink transmissions in an unlicensed radio frequency spectrum band. The operations of block 2605 may be performed according to the methods described with reference to FIGS. 1 through 11. In certain examples, aspects of the operations of block 2605 may be performed by a unscheduled uplink transmission manager as described with reference to FIGS. 16 through 19.

At block 2610 the base station 105 may receive control information multiplexed with data according to the autonomous uplink control channel configuration in the unlicensed radio frequency spectrum band during an initial TTI of a TxOP. The operations of block 2610 may be performed according to the methods described with reference to FIGS. 1 through 11. In certain examples, aspects of the operations of block 2610 may be performed by a base station control information component as described with reference to FIGS. 16 through 19.

At block 2615 the base station 105 may receive additional data in the unlicensed radio frequency spectrum band during one or more subsequent TTIs of the TxOP. The operations of block 2615 may be performed according to the methods described with reference to FIGS. 1 through 11. In certain examples, aspects of the operations of block 2615 may be performed by a base station data manager as described with reference to FIGS. 16 through 19.

Figure 27:
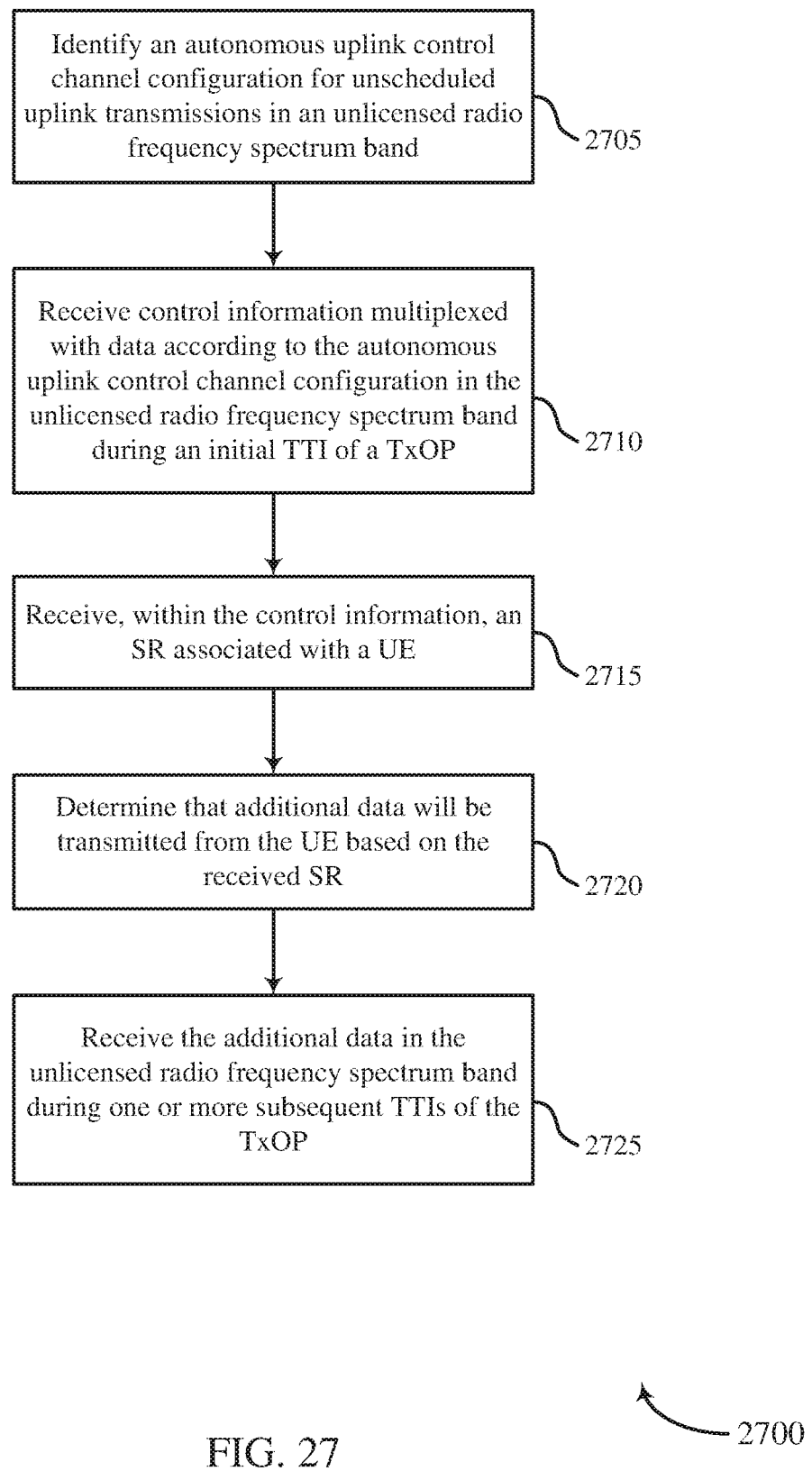

FIG. 27 shows a flowchart illustrating a method 2700 for communications using various control channel configurations for autonomous uplink in accordance with various aspects of the present disclosure. The operations of method 2700 may be implemented by a base station 105 or its components as described herein. For example, the operations of method 2700 may be performed by a base station control channel manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2705 the base station 105 may identify an autonomous uplink control channel configuration for unscheduled uplink transmissions in an unlicensed radio frequency spectrum band. The operations of block 2705 may be performed according to the methods described with reference to FIGS. 1 through 11. In certain examples, aspects of the operations of block 2705 may be performed by a unscheduled uplink transmission manager as described with reference to FIGS. 16 through 19.

At block 2710 the base station 105 may receive control information multiplexed with data according to the autonomous uplink control channel configuration in the unlicensed radio frequency spectrum band during an initial TTI of a TxOP. The operations of block 2710 may be performed according to the methods described with reference to FIGS. 1 through 11. In certain examples, aspects of the operations of block 2710 may be performed by a base station control information component as described with reference to FIGS. 16 through 19.

At block 2715 the base station 105 may receive, within the control information, SR associated with a UE. The operations of block 2715 may be performed according to the methods described with reference to FIGS. 1 through 11. In certain examples, aspects of the operations of block 2715 may be performed by a SR component as described with reference to FIGS. 16 through 19.

At block 2720 the base station 105 may determine that additional data will be transmitted from the UE based at least in part on the received SR. The operations of block 2720 may be performed according to the methods described with reference to FIGS. 1 through 11. In certain examples, aspects of the operations of block 2720 may be performed by a base station data manager as described with reference to FIGS. 16 through 19.

At block 2725 the base station 105 may receive the additional data in the unlicensed radio frequency spectrum band during one or more subsequent TTIs of the TxOP. The operations of block 2725 may be performed according to the methods described with reference to FIGS. 1 through 11. In certain examples, aspects of the operations of block 2725 may be performed by a base station data manager as described with reference to FIGS. 16 through 19.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (TDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDNIA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, UTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying an autonomous uplink control channel configuration for unscheduled uplink transmissions in an unlicensed radio frequency spectrum band;
transmitting control information multiplexed with data according to the autonomous uplink control channel configuration in the unlicensed radio frequency spectrum band during an initial transmission time interval (TTI) of a transmission opportunity (TxOP); and
transmitting additional data in the unlicensed radio frequency spectrum band during one or more subsequent TTIs of the TxOP, wherein the data in the initial TTI of the TxOP and the additional data in the one or more subsequent TTIs of the TxOP are transmitted with a same modulation and coding scheme (MCS).

2. The method of claim 1, wherein identifying the autonomous uplink control channel configuration comprises:
identifying a narrow bandwidth portion of the unlicensed radio frequency spectrum band, wherein the control information is transmitted in the narrow bandwidth portion and the control information is frequency division multiplexed with the data during the initial TTI of the TxOP.

3. The method of claim 2, wherein the narrow bandwidth portion comprises a frequency interlace of a carrier bandwidth.

4. The method of claim 2, wherein the autonomous uplink control channel configuration comprises fourteen modulation symbol periods, the fourteen modulation symbol periods comprising four modulation symbol periods associated with a demodulation reference signal (DMRS) and ten modulation symbol periods associated with data transmissions.

5. The method of claim 4, wherein the autonomous uplink control channel configuration comprises a payload and a waveform that correspond to an enhanced physical uplink control channel (ePUCCH).

6. The method of claim 1, wherein identifying the autonomous uplink control channel configuration comprises:
identifying one or more modulation symbol periods of the initial TTI, wherein the control information is transmitted during the one or more modulation symbol periods and the control information is time division multiplexed with the data during the initial TTI of the TxOP.

7. The method of claim 6, wherein the control information and the data in the initial TTI are transmitted in a narrow bandwidth portion of the unlicensed radio frequency spectrum band.

8. The method of claim 7, wherein the narrow bandwidth portion comprises a frequency interlace of a carrier bandwidth.

9. The method of claim 8, wherein the autonomous uplink control channel configuration comprises four modulation symbol periods, the four modulation symbol periods comprising two modulation symbol periods associated with a demodulation reference signal (DMRS) and two modulation symbol periods associated with data transmissions.

10. The method of claim 9, wherein the autonomous uplink control channel configuration comprises a payload and a waveform that correspond to a short PUCCH (sPUCCH).

11. The method of claim 9, wherein transmitting the additional data comprises:
transmitting the additional data during a subsequent modulation symbol period following the four modulation symbol periods.

12. The method of claim 6, wherein the control information and the data in the initial TTI are transmitted in a plurality of frequency interlaces of the unlicensed radio frequency spectrum band.

13. The method of claim 12, wherein the autonomous uplink control channel configuration comprises four modulation symbol periods, the four modulation symbol periods comprising two modulation symbol periods associated with a demodulation reference signal (DMRS) and two modulation symbol periods associated with data transmissions.

14. The method of claim 13, wherein the autonomous uplink control channel configuration comprises a payload and a waveform that correspond to a short PUCCH (sPUCCH).

15. The method of claim 13, wherein transmitting the additional data comprises:
transmitting the additional data during a subsequent modulation symbol period following the four modulation symbol periods within the plurality of frequency interlaces.

16. The method of claim 12, wherein the autonomous uplink control channel configuration comprises two modulation symbol periods, the two modulation symbol periods comprising a first modulation symbol periods associated with a demodulation reference signal (DMRS) and a second modulation symbol associated with data transmissions.

17. The method of claim 16, wherein transmitting the additional data comprises:
transmitting the additional data during a subsequent modulation symbol period following the two modulation symbol periods within the plurality of frequency interlaces.

18. The method of claim 6, further comprising:
receiving a clear-to-send (CTS) signal from a base station during a modulation symbol period of the initial TTI of the TxOP, wherein the CTS signal is responsive to the control information.

19. The method of claim 18, further comprising:
identifying a guard period between the modulation symbol period that includes the CTS signal and the data, wherein the guard period is time division multiplexed with the control information, the CTS signal, and the data.

20. The method of claim 19, wherein transmitting the additional data comprises:
transmitting the additional data during a subsequent modulation symbol period following the guard period.

21. The method of claim 18, wherein the control information and the data in the initial TTI are transmitted and the CTS signal is received in a plurality of interlaces of the unlicensed radio frequency spectrum band.

22. The method of claim 18, wherein the autonomous uplink control channel configuration comprises an initial modulation symbol period associated with a demodulation reference signal (DMRS).

23. The method of claim 1, wherein the control information comprises at least one of a scheduling request (SR), an indication of the MCS, or hybrid automatic repeat request (HARM) information, or a combination thereof.

24. The method of claim 1, further comprising:
receiving radio resource control (RRC) signaling indicative of the autonomous uplink control channel configuration, wherein the autonomous uplink control channel configuration is identified based at least in part on the RRC signaling.

25. The method of claim 24, wherein the RRC signaling comprises an indication of at least one of a frequency domain allocation, a demodulation reference signal (DMRS) configuration, or an orthogonal cover code (OCC) sequence, or any combination thereof.

26. The method of claim 1, further comprising:
transmitting data in an initial TTI of a second TxOP with a first MCS and additional data in the one or more subsequent TTIs of the second TxOP is transmitted with a second MCS that is different from the first MCS.

27. The method of claim 1, wherein the data transmitted in the initial TTI of the TxOP comprises an indication of the MCS for the initial TTI and the additional data transmitted in the one or more subsequent TTIs of the TxOP comprise an indication of the MCS for each respective TTI of the TxOP.

28. The method of claim 1, further comprising:
identifying a hybrid automatic repeat request (HARQ) identifier, an indication of a redundancy version (RV), and a new data indicator (NDI) associated with each TTI of the TxOP; and
transmitting an indication of the identified HARQ identifier, indication of the RV, and NDI for each TTI during the initial TTI of the TxOP.

29. The method of claim 1, further comprising:
identifying a new data indicator (NDI) associated with each TTI of the TxOP; and
transmitting an indication of the identified NDI associated with each TTI during the initial TTI of the TxOP.

30. The method of claim 29, further comprising:
transmitting a hybrid automatic repeat request (HARQ) identifier and an indication of a redundancy version (RV) during the initial TTI of the TxOP.

31. The method of claim 1, further comprising:
performing a clear channel assessment (CCA) procedure in the unlicensed radio frequency spectrum band during a preceding TTI before the TxOP; and
transmitting a busy signal in the unlicensed radio frequency spectrum band upon completing the CCA procedure and for a remaining duration of the preceding TTI.

32. The method of claim 31, further comprising:
monitoring the unlicensed radio frequency spectrum band for one or more modulation symbol periods of the initial TTI, wherein the control information is transmitted after the one or more modulation symbol periods of the initial TTI.

33. The method of claim 32, further comprising:
determining that no cell-specific reference signal (CRS) is received from a serving base station during the one or more modulation symbol periods of the initial TTI, wherein the control information is transmitted based at least in pan on the determination that no CRS is received.

34. A method for wireless communication, comprising:
identifying an autonomous uplink control channel configuration for unscheduled uplink transmissions in an unlicensed radio frequency spectrum band;
receiving control information multiplexed with data according to the autonomous uplink control channel configuration in the unlicensed radio frequency spectrum band during an initial transmission time interval (TTI) of a transmission opportunity (TxOP); and
receiving additional data in the unlicensed radio frequency spectrum band during one or more subsequent TTIs of the TxOP, wherein the data in the initial TTI of the TxOP and the additional data in the one or more subsequent TTIs of the TxOP are received with a same modulation and coding scheme (MCS).

35. The method of claim 34, further comprising:
determining whether the additional data has been successfully received; and
transmitting a feedback message comprising an acknowledgment or negative acknowledgment message based at least in part on the determination.

36. The method of claim 35, wherein the feedback message is transmitted using downlink control information (DCI) format OA, 0B, 4A, or 4B.

37. The method of claim 34, further comprising:
receiving, within the control information, a scheduling request (SR) associated with a user equipment (UE); and
determining that the additional data will be transmitted from the UE based at least in part on the received SR.

38. The method of claim 34, wherein identifying the autonomous uplink control channel configuration comprises:
identifying one or more modulation symbol periods of the initial TTL wherein the control information is transmitted during the one or more modulation symbol periods and the control information is time division multiplexed with the data during the initial TTI of the TxOP.

39. The method of claim 38, wherein the control information and the data in the initial TTI are received in a narrow bandwidth portion of the unlicensed radio frequency spectrum band.

40. The method of claim 39, wherein the narrow bandwidth portion comprises a frequency interlace of a carrier bandwidth.

41. The method of claim 40, wherein the autonomous uplink control channel configuration comprises four modulation symbol periods, the four modulation symbol periods comprising two modulation symbol periods associated with a demodulation reference signal (DMRS) and two modulation symbol periods associated with data transmissions.

42. The method of claim 41, wherein the autonomous uplink control channel configuration comprises a payload and a waveform that correspond to a short PUCCH (sPUCCH).

43. The method of claim 41, wherein receiving the additional data comprises:
receiving the additional data during a subsequent modulation symbol period following the four modulation symbol periods.

44. The method of claim 38, wherein the control information and the data in the initial TTI are received in a plurality of frequency interlaces of the unlicensed radio frequency spectrum band.

45. The method of claim 44, wherein the autonomous uplink control channel configuration comprises four modulation symbol periods, the four modulation symbol periods comprising two modulation symbol periods associated with a demodulation reference signal (DMRS) and two modulation symbol periods associated with data transmissions.

46. The method of claim 45, wherein the autonomous uplink control channel configuration comprises a payload and a waveform that correspond to a short PUCCH (sPUCCH).

47. The method of claim 45, wherein receiving the additional data comprises:
receiving the additional data during a subsequent modulation symbol period following the four modulation symbol periods within the plurality of frequency interlaces.

48. The method of claim 44, wherein the autonomous uplink control channel configuration comprises two modulation symbol periods, the two modulation symbol periods comprising a first modulation symbol periods associated with a demodulation reference signal (DMRS) and a second modulation symbol associated with data transmissions.

49. The method of claim 48, wherein receiving the additional data comprises:
receiving the additional data during a subsequent modulation symbol period following the two modulation symbol periods within the plurality of frequency interlaces.

50. The method of claim 38, further comprising:
transmitting a clear-to-send (CTS) signal to a user equipment (UE) during a modulation symbol period of the initial TTI of the TxOP, wherein the CTS signal is responsive to the control information.

51. The method of claim 50, further comprising:
identifying a guard period between the modulation symbol period that includes the CTS signal and the data, wherein the guard period is time division multiplexed with the control information, the CTS signal, and the data.

52. The method of claim 51, wherein receiving the additional data comprises:
receiving the additional data during a subsequent modulation symbol period following the guard period.

53. The method of claim 50, wherein the control information and the data in the initial TTI are received and the CTS signal is transmitted in a plurality of interlaces of the unlicensed radio frequency spectrum band.

54. The method of claim 50, wherein the autonomous uplink control channel configuration comprises an initial modulation symbol period associated with a demodulation reference signal (DMRS).

55. The method of claim 34, wherein the control information comprises at least one of a service request (SR), an indication of the MCS, or hybrid automatic repeat request (HARM) information, or a combination thereof.

56. The method of claim 34, further comprising:
transmitting radio resource control (RRC) signaling indicative of the autonomous uplink control channel configuration, wherein the autonomous uplink control channel configuration is identified based at least in part on the RRC signaling.

57. The method of claim 56, wherein the RRC signaling comprises an indication of at least one of a frequency domain allocation, a demodulation reference signal (DMRS) configuration, or an orthogonal cover code (OCC) sequence, or any combination thereof.

58. The method of claim 34, further comprising:
receiving, during the initial TTI of the TxOP, an indication of a hybrid automatic repeat request (HARQ) identifier, an indication of a redundancy version (RV), and a new data indicator (NDI) associated with each TTI of the TxOP.

59. The method of claim 34, further comprising:
receiving, during the initial TTI of the TxOP, an indication of a new data indicator (NDI) associated with each TTI of the TxOP.

60. The method of claim 59, further comprising:
receiving a hybrid automatic repeat request (HARQ) identifier and an indication of a redundancy version (RV) during the initial TTI of the TxOP; and
determining a HARQ identifier and an indication of an RV associated with each of the one or more subsequent TTIs of the TxOP, wherein determining the HARQ identifier and the indication of the RV is based at least in part on a sequential computation associated with the HARQ identifier and the indication of the RV received during the initial TTI of the TxOP.

61. The method of claim 34, wherein the control information is received in a narrow bandwidth portion of the unlicensed radio frequency spectrum band comprising a frequency interlace of a carrier bandwidth.

62. The method of claim 61, wherein the autonomous uplink control channel configuration comprises fourteen modulation symbol periods, the fourteen modulation symbol periods comprising four modulation symbol periods associated with a demodulation reference signal (DMRS) and ten modulation symbol periods associated with data transmissions.

63. The method of claim 62, wherein the autonomous uplink control channel configuration comprises a payload and a waveform that correspond to an enhanced physical uplink control channel (ePUCCH).

64. An apparatus for wireless communication, comprising:
means for identifying an autonomous uplink control channel configuration for unscheduled uplink transmissions in an unlicensed radio frequency spectrum band;
means for transmitting control information multiplexed with data according to the autonomous uplink control channel configuration in the unlicensed radio frequency spectrum band during an initial transmission time interval (TTI) of a transmission opportunity (TxOP); and
means for transmitting additional data in the unlicensed radio frequency spectrum band during one or more subsequent TTIs of the TxOP, wherein the data in the initial TTI of the TxOP and the additional data in the one or more subsequent TTIs of the TxOP are transmitted with a same modulation and coding scheme (MCS).

65. An apparatus for wireless communication, comprising:
means for identifying an autonomous uplink control channel configuration for unscheduled uplink transmissions in an unlicensed radio frequency spectrum band;
means for receiving control information multiplexed with data according to the autonomous uplink control channel configuration in the unlicensed radio frequency spectrum band during an initial transmission time interval (TTI) of a transmission opportunity (TxOP); and
means for receiving additional data in the unlicensed radio frequency spectrum band during one or more subsequent TTIs of the TxOP, wherein the data in the initial TTI of the TxOP and the additional data in the one or more subsequent TTIs of the TxOP are received with a same modulation and coding scheme (MCS).

66. An apparatus for wireless communication, comprising:
- a processor; memory in electronic communication with the processor; and
- instructions stored in the memory and operable, when executed by the processor, to cause the apparatus to:
  - identify an autonomous uplink control channel configuration for unscheduled uplink transmissions in an unlicensed radio frequency spectrum band;
  - transmit control information multiplexed with data according to the autonomous uplink control channel configuration in the unlicensed radio frequency spectrum band during an initial transmission time interval (TTI) of a transmission opportunity (TxOP); and
  - transmit additional data in the unlicensed radio frequency spectrum band during one or more subsequent TTIs of the TxOP, wherein the data in the initial TTI of the TxOP and the additional data in the one or more subsequent TTIs of the TxOP are transmitted with a same modulation and coding scheme (MCS).

67. The apparatus of claim 66, wherein the instructions are executable by the processor to cause the apparatus to:
- identify a narrow bandwidth portion of the unlicensed radio frequency spectrum band; and
- transmit the control information in the narrow bandwidth portion and frequency division multiplexed with the data during the initial TTI of the TxOP.

68. The apparatus of claim 67, wherein the narrow bandwidth portion comprises a frequency interlace of a carrier bandwidth.

69. The apparatus of claim 67, wherein the autonomous uplink control channel configuration comprises fourteen modulation symbol periods, the fourteen modulation symbol periods comprising four modulation symbol periods associated with a demodulation reference signal (DMRS) and ten modulation symbol periods associated with data transmissions.

70. The apparatus of claim 69, wherein the autonomous uplink control channel configuration comprises a payload and a waveform that correspond to an enhanced physical uplink control channel (ePUCCH).

71. The apparatus of claim 66, wherein the instructions are executable by the processor to cause the apparatus to:
- identify one or more modulation symbol periods of the initial TTI; and
- transmit the control information during the one or more modulation symbol periods and time division multiplexed with the data during the initial TTI of the TxOP.

72. The apparatus of claim 71, wherein the instructions are executable by the processor to cause the apparatus to:
- transmit the control information and the data in the initial TTI in a narrow bandwidth portion of the unlicensed radio frequency spectrum band.

73. The apparatus of claim 72, wherein the narrow bandwidth portion comprises a frequency interlace of a carrier bandwidth.

74. The apparatus of claim 73, wherein the autonomous uplink control channel configuration comprises four modulation symbol periods, the four modulation symbol periods comprising two modulation symbol periods associated with a demodulation reference signal (DMRS) and two modulation symbol periods associated with data transmissions.

75. The apparatus of claim 74, wherein the autonomous uplink control channel configuration comprises a payload and a waveform that correspond to a short PUCCH (sPUCCH).

76. The apparatus of claim 74, wherein the instructions are executable by the processor to cause the apparatus to transmit the additional data during a subsequent modulation symbol period following the four modulation symbol periods.

77. The apparatus of claim 71, wherein the instructions are executable by the processor to cause the apparatus to:
- transmit the control information and the data in the initial TTI in a plurality of frequency interlaces of the unlicensed radio frequency spectrum band.

78. The apparatus of claim 77, wherein the autonomous uplink control channel configuration comprises four modulation symbol periods, the four modulation symbol periods comprising two modulation symbol periods associated with a demodulation reference signal (DMRS) and two modulation symbol periods associated with data transmissions.

79. The apparatus of claim 78, wherein the autonomous uplink control channel configuration comprises a payload and a waveform that correspond to a short PUCCH (sPUCCH).

80. The apparatus of claim 78, wherein the instructions are executable by the processor to cause the apparatus to transmit the additional data during a subsequent modulation symbol period following the four modulation symbol periods within the plurality of frequency interlaces.

81. The apparatus of claim 77, wherein the autonomous uplink control channel configuration comprises two modulation symbol periods, the two modulation symbol periods comprising a first modulation symbol periods associated with a demodulation reference signal (DMRS) and a second modulation symbol associated with data transmissions.

82. The apparatus of claim 81, wherein the instructions are executable by the processor to cause the apparatus to:
- transmit the additional data during a subsequent modulation symbol period following the two modulation symbol periods within the plurality of frequency interlaces.

83. The apparatus of claim 71, wherein the instructions are executable by the processor to cause the apparatus to:
- receive a clear-to-send (CTS) signal from a base station during a modulation symbol period of the initial TTI of the TxOP, wherein the CTS signal is responsive to the control information.

84. The apparatus of claim 83, wherein the instructions are executable by the processor to cause the apparatus to:
- identify a guard period between the modulation symbol period that includes the CTS signal and the data, wherein the guard period is time division multiplexed with the control information, the CTS signal, and the data.

85. The apparatus of claim 84, wherein the instructions are executable by the processor to cause the apparatus to:
- transmit the additional data during a subsequent modulation symbol period following the guard period.

86. The apparatus of claim 83, wherein the control information and the data in the initial TTI are transmitted and the CTS signal is received in a plurality of interlaces of the unlicensed radio frequency spectrum band.

87. The apparatus of claim 83, wherein the autonomous uplink control channel configuration comprises an initial modulation symbol period associated with a demodulation reference signal (DMRS).

88. The apparatus of claim 66, wherein the control information comprises at least one of a scheduling request (SR), an indication of the MCS, or hybrid automatic repeat request (HARM) information, or a combination thereof.

89. The apparatus of claim 66, wherein the instructions are executable by the processor to cause the apparatus to:

receive radio resource control (RRC) signaling indicative of the autonomous uplink control channel configuration; and identify the autonomous uplink control channel configuration based at least in part on the RRC signaling.

90. The apparatus of claim 89, wherein the RRC signaling comprises an indication of at least one of a frequency domain allocation, a demodulation reference signal (DMRS) configuration, or an orthogonal cover code (OCC) sequence, or any combination thereof.

91. The apparatus of claim 66, wherein the instructions are executable by the processor to cause the apparatus to:
transmit data in an initial TTI of a second TxOP with a first MCS and additional data in the one or more subsequent TTIs of the second TxOP with a second MCS that is different from the first MCS.

92. The apparatus of claim 66, wherein the instructions are executable by the processor to cause the apparatus to:
transmit the data in the initial TTI of the TxOP with an indication of the MCS for the initial TTI and the additional data in the one or more subsequent TTIs of the TxOP with an indication of the MCS for each respective TTI of the TxOP.

93. The apparatus of claim 66, wherein the instructions are executable by the processor to cause the apparatus to:
identify a hybrid automatic repeat request (HARQ) identifier, an indication of a redundancy version (RV), and a new data indicator (NDI) associated with each TTI of the TxOP; and
transmit an indication of the identified HARQ identifier, indication of the RV, and NDI for each TTI during the initial TTI of the TxOP.

94. The apparatus of claim 66, wherein the instructions are executable by the processor to cause the apparatus to:
identify a new data indicator (NDI) associated with each TTI of the TxOP; and
transmit an indication of the identified NDI associated with each TTI during the initial TTI of the TxOP.

95. The apparatus of claim 94, wherein the instructions are executable by the processor to cause the apparatus to:
transmit a hybrid automatic repeat request (HARQ) identifier and an indication of a redundancy version (RV) during the initial TTI of the TxOP.

96. The apparatus of claim 66, wherein the instructions are executable by the processor to cause the apparatus to:
perform a dear channel assessment (CCA) procedure in the unlicensed radio frequency spectrum band during a preceding TTI before the TxOP; and
transmit a busy signal in the unlicensed radio frequency spectrum band upon completing the CCA procedure and for a remaining duration of the preceding TTI.

97. The apparatus of claim 96, wherein the instructions are executable by the processor to cause the apparatus to:
monitor the unlicensed radio frequency spectrum band for one or more modulation symbol periods of the initial TTI; and
transmit the control information after the one or more modulation symbol periods of the initial TTI.

98. The apparatus of claim 97, wherein the instructions are executable by the processor to cause the apparatus to:
determine that no cell-specific reference signal (CRS) is received from a serving base station during the one or more modulation symbol periods of the initial TTI; and
transmit the control information based at least in part on the determination that no CRS is received.

99. An apparatus for wireless communication, comprising:
a processor; memory in electronic communication with the processor; and
instructions stored in the memory and operable, when executed by the processor, to cause the apparatus to:
identify an autonomous uplink control channel configuration for unscheduled uplink transmissions in an unlicensed radio frequency spectrum band;
receive control information multiplexed with data according to the autonomous uplink control channel configuration in the unlicensed radio frequency spectrum band during an initial transmission time interval (TTI) of a transmission opportunity (TxOP); and
receive additional data in the unlicensed radio frequency spectrum band during one or more subsequent TTIs of the TxOP, wherein the data in the initial TTI of the TxOP and the additional data in the one or more subsequent TTIs of the TxOP are received with a same modulation and coding scheme (MCS).

100. The apparatus of claim 99, wherein the instructions are executable by the processor to cause the apparatus to:
determine whether the additional data has been successfully received; and
transmit a feedback message comprising an acknowledgment or negative acknowledgment message based at least in part on the determination.

101. The apparatus of claim 100, wherein the feedback message is transmitted using a downlink control information (DCI) format 0A, 0B, 4A, or 4B.

102. The apparatus of claim 99, wherein the instructions are executable by the processor to cause the apparatus to:
receive, within the control information, a scheduling request (SR) associated with a user equipment (UE); and
determine that the additional data will be transmitted from the UE based at least in part on the received SR.

103. The apparatus of claim 99, wherein the instructions are executable by the processor to cause the apparatus to:
identify one or more modulation symbol periods of the initial TTI; and
receive the control information during the one or more modulation symbol periods and time division multiplexed with the data during the initial TTI of the TxOP.

104. The apparatus of claim 103, wherein the instructions are executable by the processor to cause the apparatus to:
receive the control information and the data in the initial TTI in a narrow bandwidth portion of the unlicensed radio frequency spectrum band.

105. The apparatus of claim 104, wherein the narrow bandwidth portion comprises a frequency interlace of a carrier bandwidth.

106. The apparatus of claim 105, wherein the autonomous uplink control channel configuration comprises four modulation symbol periods, the four modulation symbol periods comprising two modulation symbol periods associated with a demodulation reference signal (DMRS) and two modulation symbol periods associated with data transmissions.

107. The apparatus of claim 106, wherein the autonomous uplink control channel configuration comprises a payload and a waveform that correspond to a short PUCCH (sPUCCH).

108. The apparatus of claim 106, wherein the instructions are executable by the processor to cause the apparatus to:

receive the additional data during a subsequent modulation symbol period following the four modulation symbol periods.

109. The apparatus of claim 103, wherein the instructions are executable by the processor to cause the apparatus to:
receive the control information and the data in the initial TTI are received in a plurality of frequency interlaces of the unlicensed radio frequency spectrum band.

110. The apparatus of claim 109, wherein the autonomous uplink control channel configuration comprises four modulation symbol periods, the four modulation symbol periods comprising two modulation symbol periods associated with a demodulation reference signal (DMRS) and two modulation symbol periods associated with data transmissions.

111. The apparatus of claim 110, wherein the autonomous uplink control channel configuration comprises a payload and a waveform that correspond to a short PUCCH (sPUCCH).

112. The apparatus of claim 110, wherein the instructions are executable by the processor to cause the apparatus to:
receive the additional data during a subsequent modulation symbol period following the four modulation symbol periods within the plurality of frequency interlaces.

113. The apparatus of claim 109, wherein the autonomous uplink control channel configuration comprises two modulation symbol periods, the two modulation symbol periods comprising a first modulation symbol periods associated with a demodulation reference signal (DMRS) and a second modulation symbol associated with data transmissions.

114. The apparatus of claim 113, wherein the instructions are executable by the processor to cause the apparatus to:
receive the additional data during a subsequent modulation symbol period following the two modulation symbol periods within the plurality of frequency interlaces.

115. The apparatus of claim 103, wherein the instructions are executable by the processor to cause the apparatus to:
transmit a clear-to-send (CTS) signal to a user equipment (UE) during a modulation symbol period of the initial TTI of the TxOP, wherein the CTS signal is responsive to the control information.

116. The apparatus of claim 115, wherein the instructions are executable by the processor to cause the apparatus to:
identify a guard period between the modulation symbol period that includes the CTS signal and the data, wherein the guard period is time division multiplexed with the control information, the CTS signal, and the data.

117. The apparatus of claim 116, wherein the instructions are executable by the processor to cause the apparatus to:
receive the additional data during a subsequent modulation symbol period following the guard period.

118. The apparatus of claim 115, wherein the instructions are executable by the processor to cause the apparatus to:
receive the control information and the data in the initial TTI; and
transmit the CTS signal in a plurality of interlaces of the unlicensed radio frequency spectrum band.

119. The apparatus of claim 115, wherein the autonomous uplink control channel configuration comprises an initial modulation symbol period associated with a demodulation reference signal (DMRS).

120. The apparatus of claim 99, wherein the control information comprises at least one of a service request (SR), an indication of the MCS, or hybrid automatic repeat request (HARM) information, or a combination thereof.

121. The apparatus of claim 99, wherein the instructions are executable by the processor to cause the apparatus to:
transmit radio resource control (RRC) signaling indicative of the autonomous uplink control channel configuration; and
identify the autonomous uplink control channel configuration based at least in part on the RRC signaling.

122. The apparatus of claim 121, wherein the RRC signaling comprises an indication of at least one of a frequency domain allocation, a demodulation reference signal (DMRS) configuration, or an orthogonal cover code (OCC) sequence, or any combination thereof.

123. The apparatus of claim 99, wherein the instructions are executable by the processor to cause the apparatus to:
receive, during the initial TTI of the TxOP, an indication of a hybrid automatic repeat request (HARQ) identifier, an indication of a redundancy version (RV), and a new data indicator (NDI) associated with each TTI of the TxOP.

124. The apparatus of claim 99, wherein the instructions are executable by the processor to cause the apparatus to:
receive, during the initial TTI of the TxOP, an indication of a new data indicator (NDI) associated with each TTI of the TxOP.

125. The apparatus of claim 124, wherein the instructions are executable by the processor to cause the apparatus to:
receive a hybrid automatic repeat request (HARQ) identifier and an indication of a redundancy version (RV) during the initial TTI of the TxOP; and
determine a HARQ identifier and an indication of an RV associated with each of the one or more subsequent TTIs of the TxOP, wherein determining the HARQ identifier and the indication of the RV is based at least in part on a sequential computation associated with the HARQ identifier and the indication of the RV received during the initial TTI of the TxOP.

126. The apparatus of claim 99, wherein the instructions are executable by the processor to cause the apparatus to:
receive the control information in a narrow bandwidth portion of the unlicensed radio frequency spectrum band comprising a frequency interlace of a carrier.

127. The apparatus of claim 126, wherein the autonomous uplink control channel configuration comprises fourteen modulation symbol periods, the fourteen modulation symbol periods comprising four modulation symbol periods associated with a demodulation reference signal (DMRS) and ten modulation symbol periods associated with data transmissions.

128. The apparatus of claim 127, wherein the autonomous uplink control channel configuration comprises a payload and a waveform that correspond to an enhanced physical uplink control channel (ePUCCH).

129. A non-transitory computer readable medium storing code for wireless communication, the code comprising instructions executable to:
identify an autonomous uplink control channel configuration for unscheduled uplink transmissions in an unlicensed radio frequency spectrum band;
transmit control information multiplexed with data according to the autonomous uplink control channel configuration in the unlicensed radio frequency spectrum band during an initial transmission time interval (TTI) of a transmission opportunity (TxOP); and
transmit additional data in the unlicensed radio frequency spectrum band during one or more subsequent TTIs of the TxOP, wherein the data in the initial TTI of the TxOP and the additional data in the one or more subsequent TTIs of the TxOP are transmitted with a same modulation and coding scheme (MCS).

130. A non-transitory computer readable medium storing code for wireless communication, the code comprising instructions executable to:
- identify an autonomous uplink control channel configuration for unscheduled uplink transmissions in an unlicensed radio frequency spectrum band;
- receive control information multiplexed with data according to the autonomous uplink control channel configuration in the unlicensed radio frequency spectrum band during an initial transmission time interval (TTI) of a transmission opportunity (TxOP); and
- receive additional data in the unlicensed radio frequency spectrum band during one or more subsequent TTIs of the TxOP, wherein the data in the initial TTI of the TxOP and the additional data in the one or more subsequent TTIs of the TxOP are received with a same modulation and coding scheme (MCS).

* * * * *